United States Patent
Yamamichi et al.

(10) Patent No.: US 9,002,724 B2
(45) Date of Patent: Apr. 7, 2015

(54) INCENTIVE PROVISION SYSTEM

(75) Inventors: Masato Yamamichi, Ota (JP); Masami Yamamichi, legal representative, Ota (JP); Satomi Yamamichi, legal representative, Ota (JP); Keiko Yamamichi, legal representative, Maebashi (JP); Motoji Ohmori, Hirakata (JP); Kazuhisa Watanabe, Yokohama (JP); Wataru Ikeda, Osaka (JP); Masaya Yamamoto, Arcadia, CA (US); Tomoyuki Okada, Nara (JP)

(73) Assignee: Panasonic Corporation, Osaka (JP)

(*) Notice: Subject to any disclaimer, the term of this patent is extended or adjusted under 35 U.S.C. 154(b) by 2420 days.

(21) Appl. No.: 10/788,000

(22) Filed: Feb. 27, 2004

(65) Prior Publication Data
US 2004/0186779 A1 Sep. 23, 2004

(30) Foreign Application Priority Data
Feb. 28, 2003 (JP) .................................. 2003-054133

(51) Int. Cl.
G06Q 30/02 (2012.01)

(52) U.S. Cl.
CPC ............ *G06Q 30/02* (2013.01); *G06Q 30/0222* (2013.01); *G06Q 30/0235* (2013.01); *G06Q 30/0225* (2013.01)

(58) Field of Classification Search
USPC .......... 725/110, 5; 705/26, 14, 27; 715/500.1; 380/24
See application file for complete search history.

(56) References Cited

U.S. PATENT DOCUMENTS

| | | | | |
|---|---|---|---|---|
| 5,621,797 A * | 4/1997 | Rosen | ............................. | 705/76 |
| 6,121,963 A * | 9/2000 | Ange | ............................. | 715/202 |
| 6,233,736 B1 * | 5/2001 | Wolzien | ........................ | 725/110 |
| 6,286,139 B1 * | 9/2001 | Decinque | ........................... | 725/5 |
| 6,950,804 B2 * | 9/2005 | Strietzel | ........................... | 705/26 |
| 6,975,836 B2 * | 12/2005 | Tashiro et al. | ................. | 455/3.01 |
| 7,080,030 B2 * | 7/2006 | Eglen et al. | .................. | 705/26.41 |
| 7,225,142 B1 * | 5/2007 | Apte et al. | ........................ | 705/14 |
| 2001/0005838 A1 | 6/2001 | So | | |
| 2004/0002904 A1 * | 1/2004 | Deas et al. | ........................ | 705/27 |

FOREIGN PATENT DOCUMENTS

| | | |
|---|---|---|
| JP | 2001-229652 | 8/2001 |
| JP | 2002-092237 | 3/2002 |
| JP | 2002-124027 | 4/2002 |
| JP | 2002-190867 | 7/2002 |
| JP | 2002-269428 | 9/2002 |
| JP | 2002-324256 | 11/2002 |
| JP | 2003-009129 | 1/2003 |
| JP | 2003-050889 | 2/2003 |

\* cited by examiner

*Primary Examiner* — Affaf Ahmed Osman Bilal Ahme
(74) *Attorney, Agent, or Firm* — Wenderoth, Lind & Ponack, L.L.P.

(57) ABSTRACT

An incentive provision system that contributes to expanded sales of a content service and includes a user terminal and a provision device. The provision device receives, from the user terminal, request information for requesting incentive information relating to the content service. If the request information is valid, then the provision device provides the incentive information to the user terminal. A user of the user terminal enjoys using the incentive information provided from the provision device, which, in turn, motivates the user to receive the content service.

22 Claims, 51 Drawing Sheets

FIG.3

| TITLE ID | EXPIRATION DATE | SHOP ID | SIGNATURE DATA 1 | THEATER ID | SIGNATURE DATA 2 |
|---|---|---|---|---|---|
| M001 | 2003/01/31 | S001 | SIGNATURE DATA OF S001 | C001 | SIGNATURE DATA OF C001 |
| M003 | 2003/02/14 | S002 | SIGNATURE DATA OF S002 | | |
| | | | ... | | |

T100 E-TICKET INFORMATION TABLE

FIG.4

T110 PURCHASE INCENTIVE INFORMATION TABLE

| TITLE ID | AUDIO DATA 1 | PACKAGE DISCOUNT DATA | EXCLUSIVE DATA 1 |
|---|---|---|---|
| M001 | M001 TRAILER AUDIO DATA NAME | 2,000 | http://www.abc.co.jp, user, password |
| M003 | M003 TRAILER AUDIO DATA NAME | 1,800 | |
| ... | | | |

FIG.5

T120 USE INCENTIVE INFORMATION TABLE

| TITLE ID | AUDIO DATA 2 | EXCLUSIVE DATA 2 | ADDITIONAL INFORMATION |
|---|---|---|---|
| M001 | M001 PACKAGE TRAILER AUDIO DATA NAME | LIMITED-EDITION CASE | SAMPLE PACKAGE |
| | | ... | |

FIG.9

T400 USER MANAGEMENT TABLE

| USER ID | TITLE ID | TICKET PURCHASE INFORMATION | | TICKET USE INFORMATION | | PACKAGE PURCHASE INFORMATION | |
|---|---|---|---|---|---|---|---|
| | | SHOP ID 1 | SELLING DATE 1 | THEATER ID | USE DATE | SHOP ID 2 | SELLING DATE 2 |
| U001 | M001 | S001 | 2003/01/05 | C001 | 2003/01/15 | S010 | 2003/01/29 |
| U003 | M002 | S003 | 2003/01/07 | C001 | 2003/01/15 | | |
| U001 | M003 | S002 | 2003/01/10 | | | | |
| ⋮ | | | | | | | |

FIG.11

T500 PURCHASE INCENTIVE MANAGEMENT TABLE

| TITLE ID | AUDIO DATA 1 | PACKAGE DISCOUNT DATA | EXCLUSIVE DATA 1 |
|---|---|---|---|
| M001 | M001 TRAILER AUDIO DATA NAME | 2,000 | http://www.abc.co.jp, user, password |
| M002 | M002 TRAILER AUDIO DATA NAME | 2,000 | http://www.efg.co.jp, user1, password1 |
| M003 | M003 TRAILER AUDIO DATA NAME | 1,800 | ... |

FIG.12

T510 E-TICKET MANAGEMENT TABLE

| TITLE ID | EXPIRATION DATE |
|---|---|
| M001 | 2003/01/31 |
| M002 | 2003/02/04 |
| M003 | 2003/02/14 |
| | ⋮ |

FIG.13

T520 E-TICKET BILLING TABLE

| USER ID | TITLE ID | SELLING DATE 1 | PRICE 1 | PAYMENT METHOD 1 |
|---------|----------|----------------|---------|------------------|
| U001 | M001 | 2003/01/05 | 1,800 | CASH |
| U003 | M002 | 2003/01/07 | 1,800 | CREDIT CARD |
| U001 | M003 | 2003/01/10 | 1,700 | CASH |
| ... | | | | |

FIG.16

T610 USE INCENTIVE MANAGEMENT TABLE

| TITLE ID | AUDIO DATA 2 | EXCLUSIVE DATA 2 | ADDITIONAL INFORMATION |
|---|---|---|---|
| M001 | M001 PACKAGE TRAILER AUDIO DATA NAME | LIMITED-EDITION CASE | SAMPLE PACKAGE |
| M002 | M002 PACKAGE TRAILER AUDIO DATA NAME | LIMITED-EDITION CASE | |
| M003 | M003 PACKAGE TRAILER AUDIO DATA NAME | ... | |

FIG.19

| USER ID | TITLE ID | SELLING DATE 2 | PRICE 2 | PAYMENT METHOD 2 |
|---|---|---|---|---|
| U001 | M001 | 2003/01/29 | 1,800 | CASH |
| | | ... | | |

T710 PACKAGE BILLING TABLE

FIG.38

T450 USER MANAGEMENT TABLE

| USER ID | TITLE ID | TICKET PURCHASE INFORMATION | | TICKET USE INFORMATION | | PACKAGE PURCHASE INFORMATION | | INCENTIVE PROVISION INFORMATION 1 | | | INCENTIVE PROVISION INFORMATION 2 | | |
|---|---|---|---|---|---|---|---|---|---|---|---|---|---|
| | | SHOP ID 1 | SELLING DATE 1 | THEATER ID | USE DATE | SHOP ID 2 | SELLING DATE 2 | PROVIDER ID 1 | PROVISION DATE 1 | | PROVIDER ID 2 | PROVISION DATE 2 | |
| U001 | M001 | S001 | 2003/01/05 | C001 | 2003/01/15 | S010 | 2003/01/29 | S100 | 2003/01/09 | | S110 | 2003/01/17 | |
| U003 | M002 | S003 | 2003/01/07 | C001 | 2003/01/15 | | | S100 | 2003/01/17 | | | | |
| U001 | M003 | S002 | 2003/01/10 | ... | | | | | | | | | |

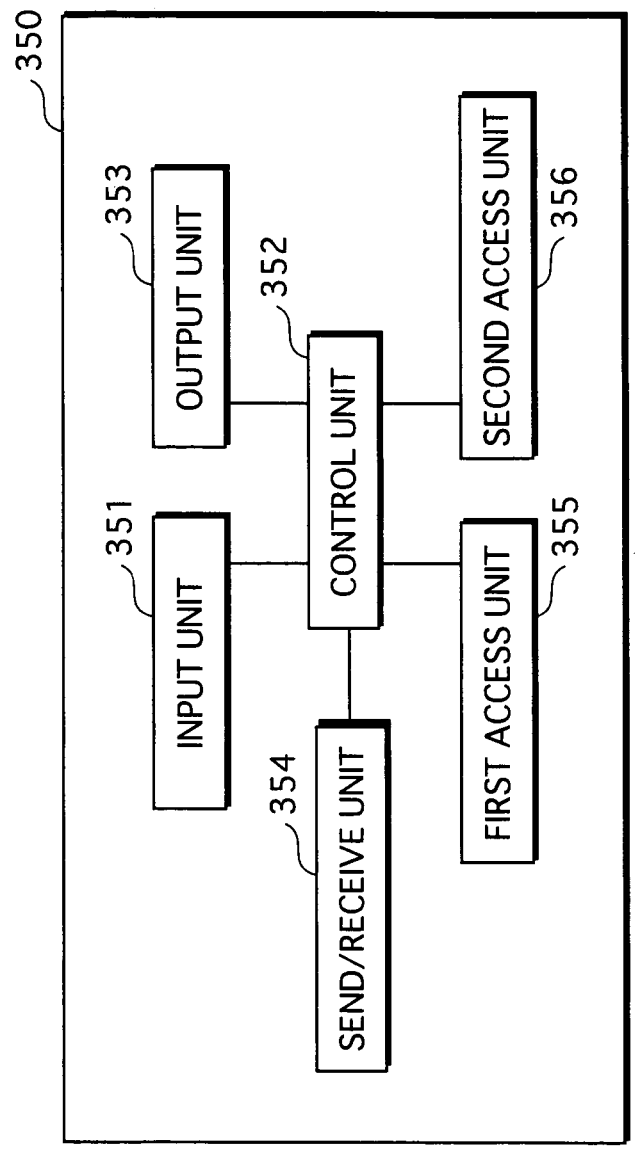

INCENTIVE PROVISION SYSTEM

This application is based on an application No. 2003-054133 filed in Japan, the contents of which are hereby incorporated by reference.

BACKGROUND OF THE INVENTION

1. Field of the Invention

The present invention relates to techniques of providing services using e-tickets.

2. Description of the Related Art

An electronic ticket (e-ticket) system for providing services using e-tickets is disclosed by Unexamined Japanese Patent Application Publication No. 2002-324256. Through the use of e-tickets, this system aims to eliminate a complicated manual procedure when offering a discount to a user of one service with use of another service as a necessary condition for the discount.

For example, this system may be applied in a situation where, if a person has a ticket stub of a movie at a movie theater, he or she can get a discount at a restaurant near the movie theater.

In such cases, however, though the restaurant can benefit from more customers and greater sales, a distributor of the movie does not have any benefits. In view of this, there are demands from content providers which provide content such as movies and storage media storing video information, for a system that contributes to expanded sales of a content service.

BRIEF SUMMARY OF THE INVENTION

In view of the above problem, the present invention aims to provide an incentive provision system that contributes to expanded sales of a content service. The invention also aims to provide a device, a method, a computer-readable program, and a computer-readable program storage medium for providing an incentive. The invention also aims to provide a package sales device, and a method, a computer-readable program, and a computer-readable program storage medium for deciding a selling price of a package. The invention further aims to provide a storage medium and a playback device.

The stated aim can be achieved by an incentive provision system including a user terminal and a provision device which provides incentive information relating to a content service. The provision device includes: an incentive storing unit storing the incentive information; a request receiving unit operable to receive request information for requesting the incentive information, from the user terminal; a judging unit operable to judge whether the received request information is valid; and a providing unit operable to read, if the judging unit judges the request information as being valid, the incentive information from the incentive storing unit and send the incentive information to the user terminal. Further, the user terminal includes: a request sending unit operable to send the request information to the provision device; an incentive receiving unit operable to receive the incentive information from the provision device; and an incentive retaining unit operable to retain the received incentive information.

According to this construction, a provider of the content service achieves expanded sales of the content service through the provision of the incentive information.

Here, the incentive retaining unit may include a portable storage medium and an incentive writing unit, wherein the incentive information is movie-related information which relates to a movie. The request information (a) indicates that a user of the user terminal purchases an e-ticket which entitles the user to see the movie, and (b) requests the movie-related information. The providing unit reads, if the judging unit judges the request information as being valid, the movie-related information from the incentive storing unit and sends the movie-related information to the user terminal, and the incentive writing unit writes the movie-related information to the storage medium.

According to this construction, the user receives the movie-related information as an incentive when purchasing the e-ticket for the movie. The user can enjoy this movie-related information, before seeing the movie using the e-ticket. Conventionally, a person who purchased an advance ticket for a movie must wait for a while for a theatrical release of the movie. During this time, he or she sometimes loses interest in seeing the movie. According to the invention, however, the user can enjoy the movie-related information before the theatrical release, which maintains the user's interest in the movie.

Here, the incentive retaining unit may include a portable storage medium and an incentive writing unit, wherein the incentive information includes movie-related information which relates to a movie and content-related information which relates to content that contains data of the movie. The request information (a) indicates that a user of the user terminal purchases an e-ticket which entitles the user to see the movie and also to obtain a package medium storing the content, and (b) requests the movie-related information and the content-related information. The providing unit reads, if the judging unit judges the request information as being valid, the movie-related information and the content-related information from the incentive storing unit and sends the movie-related information and the content-related information to the user terminal, and the incentive writing unit writes the movie-related information and the content-related information to the storage medium.

According to this construction, the user receives the movie-related information and the content-related information as an incentive when purchasing the e-ticket for the movie and for the package. The user can then enjoy the movie-related information and the content-related information. Conventionally, a person who purchased an advance ticket for a movie must wait for awhile for theatrical release of the movie. During this time, he or she sometimes loses interest in seeing the movie. According to the invention, however, the user can enjoy the movie-related information before theatrical release, which maintains the user's interest in the movie. Also, usually a package medium of DVD software or video software for the movie is released some time (e.g., two months) after the showing of the movie at movie theaters ends. During this time, the user may lose interest in obtaining the package. According to the invention, however, the user can enjoy the content-related information before release of the package medium, which maintains the user's interest in the package medium.

Here, the user terminal may be a portable storage medium that stores e-ticket information showing an e-ticket which entitles a user of the user terminal to see a movie, wherein the incentive information is content-related information which relates to content that contains data of the movie, when the user uses the e-ticket to see the movie, the request sending unit sends the e-ticket information to the provision device as the request information for requesting the content-related information. The provision device further includes: a changing unit operable to change, if the judging unit judges the e-ticket information as being valid, the e-ticket information to show the used e-ticket, and send the changed e-ticket information to the storage medium to replace the e-ticket information stored in the storage medium, and the providing unit reads, if the judging unit judges the e-ticket information as being valid, the content-related information from the incentive storing unit and sends the content-related information to the storage medium.

According to this construction, the user receives the content-related information as an incentive when using the e-ticket to see the movie. Usually a package medium of DVD software or video software for the movie is released some time (e.g., two months) after the showing of the movie at movie theaters ends. During this time, the user may lose interest in obtaining the package. According to the invention, however, the user can enjoy the content-related information before release of the package medium, which maintains the user's interest in the package medium.

Here, the user terminal may be a portable storage medium that stores e-ticket information showing an e-ticket which (a) entitles a user of the user terminal to see a movie and has not yet been used by the user, (b) entitles the user to see the movie and has already been used by the user, or (c) entitles the user to see the movie and also obtain a package medium storing content that contains data of the movie, wherein the request sending unit sends the e-ticket information to the provision device as the request information for requesting the incentive information, and the providing unit reads, if the judging unit judges the e-ticket information as being valid, the incentive information from the incentive storing unit and sends the incentive information to the storage medium.

According to this construction, the user can receive and enjoy the incentive information if the e-ticket is valid.

Here, the incentive provision system may further include a package sales device which sells a package medium storing content that contains data of a movie, wherein the user terminal stores e-ticket information showing an e-ticket which (a) entitles a user of the user terminal to see the movie and has not yet been used by the user, (b) entitles the user to see the movie and has already been used by the user, or (c) entitles the user to see the movie and also obtain the package medium. The package sales device includes: a ticket receiving unit operable to receive the e-ticket information from the user terminal; and a deciding unit operable to decide a selling price of the package medium according to the e-ticket information.

According to this construction, the user can purchase the package medium at the price that depends on the contents of the e-ticket information. This enhances user convenience.

Here, the incentive provision system may further include a playback device, wherein the user terminal is a portable storage medium, and the playback device includes: an incentive reading unit operable to read the incentive information from the storage medium; and a playback unit operable to play back the read incentive information.

According to this construction, the user can enjoy using the incentive information.

Here, the incentive provision system may further include a management device, wherein the provision device further includes: a user information generating unit operable to generate user information about a user of the user terminal provided with the incentive information, and operable to send the user information to the management device. Further, the management device includes: a user information receiving unit operable to receive the user information from the provision device; and a user information storing unit operable to store the received user information.

According to this construction, the provider of the content service can keep track of user behavior.

The stated aim can also be achieved by a provision device, which provides incentive information relating to a content service, including: an incentive storing unit storing the incentive information; a request receiving unit operable to receive request information for requesting the incentive information, from a user terminal; a judging unit operable to judge whether the received request information is valid; and a providing unit operable to read, if the judging unit judges the request information as being valid, the incentive information from the incentive storing unit and send the incentive information to the user terminal.

According to this construction, a provider of the content service achieves expanded sales of the content service through the provision of the incentive information.

Here, the incentive information may be movie-related information, which relates to a movie, wherein the request information (a) indicates that a user of the user terminal purchases an e-ticket which entitles the user to see the movie, and (b) requests the movie-related information. Further, the providing unit reads, if the judging unit judges the request information as being valid, the movie-related information from the incentive storing unit and sends the movie-related information to the user terminal.

According to this construction, the user receives the movie-related information as an incentive when purchasing the e-ticket for the movie. The user can enjoy this movie-related information, before seeing the movie using the e-ticket. Conventionally, a person who purchased an advance ticket for a movie must wait for a while for a theatrical release of the movie. During this time, he or she sometimes loses interest in seeing the movie. According to the invention, however, the user can enjoy the movie-related information before the theatrical release, which maintains the user's interest in the movie.

Here, the provision device may further include: a secret key storing unit storing a secret key; and a signature data generating unit operable to generate signature data by digitally-signing e-ticket information showing the e-ticket, using the secret key, wherein the providing unit further sends the signature data to the user terminal.

According to this construction, the provider of the content service can strengthen security.

Here, the incentive information may include movie-related information which relates to a movie and content-related information which relates to content that contains data of the movie, wherein the request information (a) indicates that a user of the user terminal purchases an e-ticket which entitles the user to see the movie and also to obtain a package medium storing the content, and (b) requests the movie-related information and the content-related information. Further, providing unit reads, if the judging unit judges the request information as being valid, the movie-related information and the content-related information from the incentive storing unit and sends the movie-related information and the content-related information to the user terminal.

According to this construction, the user receives the movie-related information and the content-related information as an incentive when purchasing the e-ticket for the movie and for the package. The user can then enjoy the movie-related information and the content-related information. Conventionally, a person who purchased an advance ticket for a movie must wait for a while for a theatrical release of the movie. During this time, he or she sometimes loses interest in seeing the movie. According to the invention, however, the user can enjoy the movie-related information before the theatrical release, which maintains the user's interest in the movie. Also, usually a package medium of DVD software or video software for the movie is released some time (e.g., two months) after the showing of the movie at movie theaters ends. During this time, the user may lose interest in obtaining the package. According to the invention, however, the user can enjoy the content-related information before release of the package medium, which maintains the user's interest in the package medium.

Here, the user terminal may be a portable storage medium that stores e-ticket information showing an e-ticket which entitles a user of the user terminal to see a movie, wherein the incentive information is content-related information which relates to content that contains data of the movie, when the user uses the e-ticket to see the movie, the request receiving unit receives the e-ticket information as the request information for requesting the content-related information. Further, the provision device further includes a changing unit operable to change, if the judging unit judges the e-ticket information as being valid, the e-ticket information to show the used e-ticket, and send the changed e-ticket information to the storage medium to replace the e-ticket information stored in the storage medium. Additionally, the providing unit reads, if the judging unit judges the e-ticket information as being valid, the content-related information from the incentive storing unit and sends the content-related information to the storage medium.

According to this construction, the user receives the content-related information as an incentive when using the e-ticket to see the movie. Usually a package medium of DVD software or video software for the movie is released some time (e.g., two months) after the showing of the movie at movie theaters ends. During this time, the user may lose interest in obtaining the package. According to the invention, however, the user can enjoy the content-related information before release of the package medium, which maintains the user's interest in the package medium.

Here, the e-ticket information may further show an expiration date of the e-ticket, wherein the provision device further includes an expiration checking unit operable to check whether the e-ticket has expired, based on the expiration date shown in the e-ticket information, and the judging unit judges the e-ticket information as being valid, if the expiration checking unit judges that the e-ticket has not expired.

According to this construction, the provision device checks the expiration date of the e-ticket to judge whether to provide the incentive information.

Here, the storage medium may further store signature data generated by digitally-signing the e-ticket information, wherein (i) the provision device further includes a public key storing unit storing a public key, (ii) the request receiving unit further receives the signature data from the storage medium, and verifies the signature data using the public key, and (iii) the judging unit judges the e-ticket information as being valid, if the expiration checking unit judges that the e-ticket has not expired and the request receiving unit verifies that the signature data is authentic.

According to this construction, the provision device checks the expiration date of the e-ticket and further verifies the signature data, to judge whether to provide the incentive information.

Here, the provision device may further include a secret key storing unit storing a secret key, wherein the changing unit further generates signature data by digitally-signing the changed e-ticket information using the secret key, and sends the signature data to the storage medium.

According to this construction, the provider of the content service can strengthen security.

Here, the user terminal may be a portable storage medium that stores e-ticket information showing an e-ticket which (a) entitles a user of the user terminal to see a movie and has not yet been used by the user, (b) entitles the user to see the movie and has already been used by the user, or (c) entitles the user to see the movie and also obtain a package medium storing content that contains data of the movie. In addition, the request receiving unit receives the e-ticket information as the request information for requesting the incentive information, and the providing unit reads, if the judging unit judges the e-ticket information as being valid, the incentive information from the incentive storing unit and sends the incentive information to the storage medium.

According to this construction, the user can receive and enjoy the incentive information if the e-ticket is valid.

Here, the incentive information may be such that (a) if the e-ticket entitles the user to see the movie and the user has not yet used the e-ticket, the incentive information is move-related information which relates to the movie, (b) if the e-ticket entitles the user to see the movie and the user has already used the e-ticket, the incentive information is content-related information which relates to the content, and (c) if the e-ticket entitles the user to see the movie and also obtain the package medium, the incentive information includes the movie-related information and the content-related information.

According to this construction, the provision device provides the movie-related information, the content-related information, or both of these information as an incentive, depending on the contents of the e-ticket information.

Here, the provision device may be connected with a management device which manages user information about a user of the user terminal provided with the incentive information. In addition, the provision device may further include a user information generating unit operable to generate the user information and send the user information to the management device.

According to this construction, the provision device outputs the user information to the management device.

The stated aim can also be achieved by a package sales device, which sells a package medium storing content that contains data of a movie, including: a ticket receiving unit operable to receive, from a user terminal, e-ticket information showing an e-ticket, which (a) entitles a user of the user terminal to see the movie and has not yet been used by the user, (b) entitles the user to see the movie and has already been used by the user, or (c) entitles the user to see the movie and also obtain the package medium; and a deciding unit operable to decide a selling price of the package medium according to the e-ticket information.

According to this construction, the user can purchase the package medium at the price that depends on the contents of the e-ticket information. This enhances user convenience.

Here, the package sales device may further include: an incentive storing unit storing incentive information to be provided to the user if the user purchases the package medium; a request receiving unit operable to receive a request for the package medium from the user terminal; and a providing unit operable to read, if the request receiving unit receives the request, the incentive information from the incentive storing unit and send the incentive information to the user terminal.

According to this construction, the provider of the content service can enhance user satisfaction.

Here, the package sales device may further include: a public key storing unit storing a public key, wherein the ticket receiving unit further receives signature data generated by digitally-signing the e-ticket information, from the user terminal, and the deciding unit verifies the signature data using the public key, and if the signature data is authentic, decides the selling price of the package medium according to the e-ticket information.

According to this construction, the package sales device judges the validity of the e-ticket based on the signature data.

Here, the package sales device may be connected with a management device which manages user information about the user provided with the incentive information, and may further include a user information generating unit operable to generate the user information and send the user information to the management device.

According to this construction, the package sales device outputs the user information to the management device.

The stated aim can also be achieved by a user terminal connected with a provision device, which provides incentive information relating to a content service, including: a request sending unit operable to send request information for requesting the incentive information, to the provision device; an incentive receiving unit operable to receive the incentive information from the provision device, if the provision device judges the request information as being valid; and an incentive retaining unit operable to retain the received incentive information.

According to this construction, the user can enjoy using the incentive information, which encourages the user to receive the content service. This contributes to expanded sales of the content service.

Here, the incentive retaining unit may include a portable storage medium and an incentive writing unit, wherein the incentive information is movie-related information which relates to a movie, the request information (a) indicates that a user of the user terminal purchases an e-ticket which entitles the user to see the movie, and (b) requests the movie-related information. Additionally, the incentive receiving unit receives the movie-related information from the provision device, if the provision device judges the request information as being valid, and the incentive writing unit writes the movie-related information to the storage medium.

According to this construction, the user receives the movie-related information as an incentive when purchasing the e-ticket for the movie. The user can enjoy this movie-related information, before seeing the movie using the e-ticket. Conventionally, a person who purchased an advance ticket for a movie must wait for a while for a theatrical release of the movie. During this time, he or she sometimes loses interest in seeing the movie. According to the invention, however, the user can enjoy the movie-related information before the theatrical release, which maintains the user's interest in the movie.

Here, the incentive retaining unit may include a portable storage medium and an incentive writing unit, wherein the incentive information includes movie-related information, which relates to a movie, and content-related information, which relates to content that contains data of the movie. In addition, the request information (a) indicates that a user of the user terminal purchases an e-ticket which entitles the user to see the movie and also to obtain a package medium storing the content, and (b) requests the movie-related information and the content-related information. Moreover, the incentive receiving unit receives the movie-related information and the content-related information from the provision device, if the provision device judges the request information as being valid, and the incentive writing unit writes the movie-related information and the content-related information to the storage medium.

According to this construction, the user receives the movie-related information and the content-related information as an incentive when purchasing the e-ticket for the movie and for the package. The user can then enjoy the movie-related information and the content-related information. Conventionally, a person who purchased an advance ticket for a movie must wait for a while for a theatrical release of the movie. During this time, he or she sometimes loses interest in seeing the movie. According to the invention, however, the user can enjoy the movie-related information before the theatrical release, which maintains the user's interest in the movie. Also, usually a package medium of DVD software or video software for the movie is released some time (e.g., two months) after the showing of the movie at movie theaters ends. During this time, the user may lose interest in obtaining the package. According to the invention, however, the user can enjoy the content-related information before release of the package medium, which maintains the user's interest in the package medium.

Here, the user terminal may be a portable storage medium that stores e-ticket information showing an e-ticket which entitles a user of the user terminal to see a movie, wherein the incentive information is content-related information, which relates to content that contains data of the movie, when the user uses the e-ticket to see the movie, the request sending unit sends the e-ticket information to the provision device as the request information for requesting the content-related information, and the incentive receiving unit receives the content-related information from the provision device, if the provision device judges the e-ticket information as being valid.

According to this construction, the user receives the content-related information as an incentive when using the e-ticket to see the movie. Usually a package medium of DVD software or video software for the movie is released some time (e.g., two months) after the showing of the movie at movie theaters ends. During this time, the user may lose interest in obtaining the package. According to the invention, however, the user can enjoy the content-related information before release of the package medium, which maintains the user's interest in the package medium.

Here, the user terminal may be a portable storage medium that stores e-ticket information showing an e-ticket which (a) entitles a user of the user terminal to see a movie and has not yet been used by the user, (b) entitles the user to see the movie and has already been used by the user, or (c) entitles the user to see the movie and also obtain a package medium storing content that contains data of the movie. Additionally, the request sending unit sends the e-ticket information to the provision device as the request information for requesting the incentive information, and the incentive receiving unit receives the incentive information from the provision device, if the provision device judges the e-ticket information as being valid.

According to this construction, the user can receive and enjoy the incentive information if the e-ticket is valid.

Here, the user terminal may further include: a password storing unit storing a first password; a password verifying unit operable to receive a second password, and compare the second password with the first password; and a permitting unit operable to permit access to the user terminal, if the second password matches the first password.

According to this construction, unauthorized use of the user terminal can be prevented.

Here, the user terminal may be a portable storage medium.

According to this construction, the user terminal can be realized by a portable storage medium.

The stated aim can also be achieved by a playback device in which a portable storage medium storing incentive information relating to a content service is inserted, including: an incentive reading unit operable to read the incentive information from the storage medium; and a playback unit operable to play back the read incentive information.

According to this construction, the user can enjoy using the incentive information.

Here, the incentive information may be first data which is one out of video data and audio data that correspond to each other, wherein the playback device further includes: a package reading unit operable to read second data which is the other one out of the video data and the audio data, from a package medium inserted in the playback device, and the playback unit combines the first data and the second data and plays back the combined data.

According to this construction, the user can enjoy using the incentive information.

Here, the playback device may be network-connected with a provision device which provides the incentive information, wherein the storage medium stores e-ticket information showing an e-ticket which (a) entitles a user of the storage medium to see a movie and has not yet been used by the user, (b) entitles the user to see the movie and has already been used by the user, or (c) entitles the user to see the movie and also obtain a package medium storing content that contains data of the movie. Additionally, the playback device further include: a ticket sending unit operable to obtain the e-ticket information from the storage medium and send the e-ticket information to the provision device; and an incentive receiving unit operable to receive the incentive information from the provision device and write the incentive information to the storage medium, if the provision device judges the e-ticket information as being valid.

According to this construction, the user can receive the latest incentive information from the provision device via a network, using the playback device.

Thus, the invention can be used recurrently and continuously in industries where one company provides a service and also sells merchandise relating to the service to consumers.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings:

FIG. 3 shows a data structure of an e-ticket information table in an e-ticket information storage unit shown in FIG. 2;

FIG. 4 shows a data structure of a purchase incentive information table in a purchase incentive information storage unit shown in FIG. 2;

FIG. 5 shows a data structure of a use incentive information table in a use incentive information storage unit shown in FIG. 2;

FIG. 9 shows a data structure of a user management table in a user information storage unit shown in FIG. 8;

FIG. 11 shows a data structure of a purchase incentive management table in a purchase incentive management information storage unit shown in FIG. 10;

FIG. 12 shows a data structure of an e-ticket management table in an e-ticket management information storage unit shown in FIG. 10;

FIG. 13 shows a data structure of an e-ticket billing table in an e-ticket billing information storage unit shown in FIG. 10;

FIG. 16 shows a data structure of a use incentive management table in a use incentive management information storage unit shown in FIG. 14;

FIG. 19 shows a data structure of a package billing table in a package billing information storage unit shown in FIG. 17;

FIG. 38 shows a data structure of a user management table in a user information storage unit shown in FIG. 37;

FIG. 51 is a block diagram showing a construction of a playback device which is a modification to the first embodiment.

DETAILED DESCRIPTION OF THE INVENTION

1. First Embodiment

The following describes an e-ticket system 1 which is the first embodiment of the present invention, by referring to drawings.

1.1. Construction of the E-Ticket System 1

Figure 1:
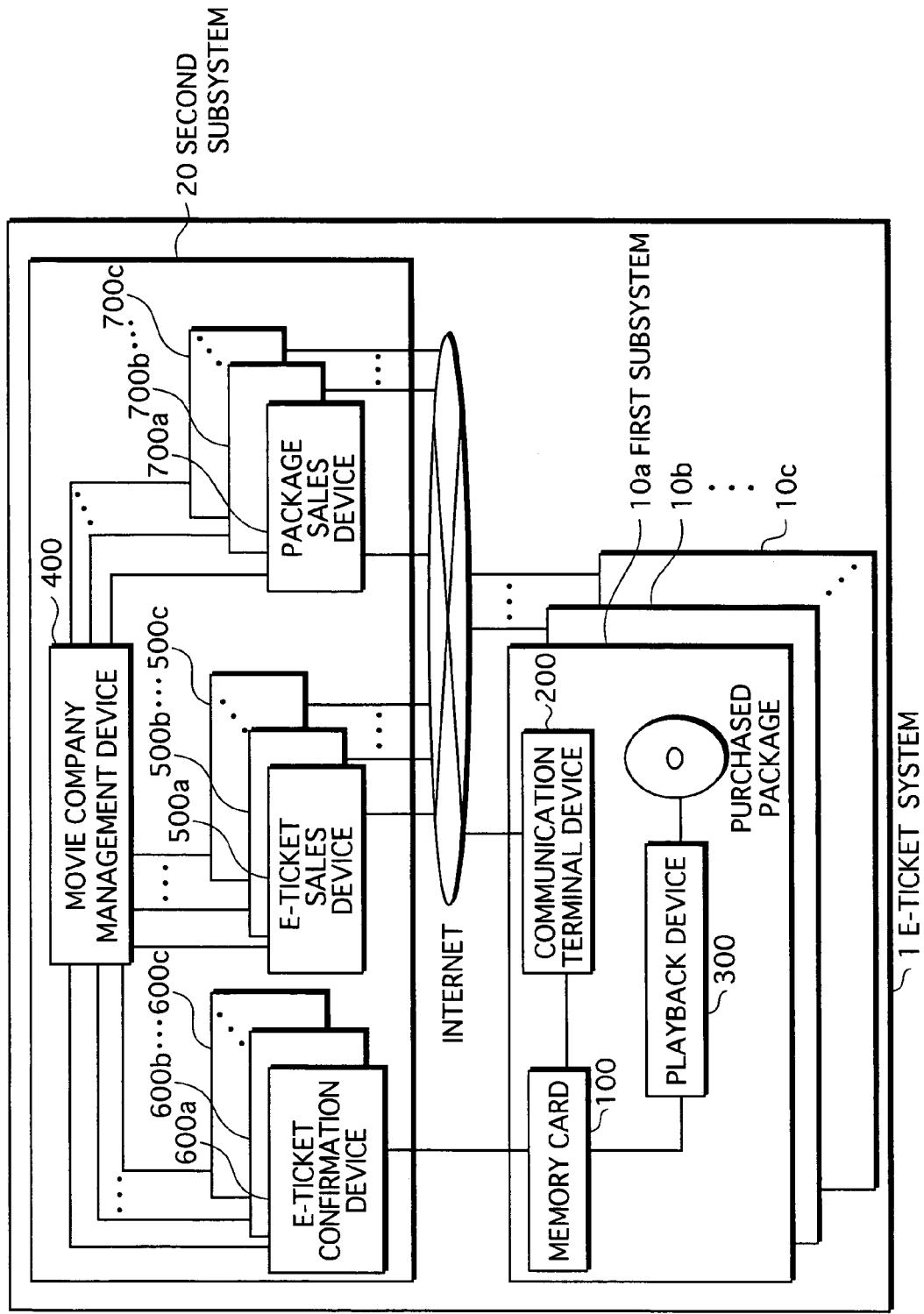
FIG. 1 is a block diagram showing a construction of an e-ticket system to which the first embodiment of the invention relates.

FIG. 1 shows a construction of the e-ticket system 1.

In the drawing, the e-ticket system 1 is roughly made up of first subsystems 10a, 10b, . . . , 10c and a second subsystem 20. The first subsystem 10a includes a memory card 100, a communication terminal device 200, and a playback device 300. The first subsystems 10b, . . . , 10c have the same construction as the first subsystem 10a and so their explanation has been omitted. The second subsystem 20 includes a movie company management device 400, e-ticket sales devices 500a, 500b, . . . , 500c, e-ticket confirmation devices 600a, 600b, . . . , 600c, and package sales devices 700a, 700b, . . . , 700c. The e-ticket sales devices 500a, 500b, . . . , 500c and the package sales devices 700a, 700b, . . . , 700c are associated with Internet addresses, to allow the communication terminal device 200 to connect to them via the Internet. To purchase an e-ticket, the communication terminal device 200 connects to one of the e-ticket sales devices 500a, 500b, . . . , 500c, via the Internet, using an Internet address of that e-ticket sales device. To purchase a package, the communication terminal device 200 connects to one of the package sales devices 700a, 700b, . . . , 700c via the Internet, using an Internet address of that package sales device. The movie company management device 400 is connected with the e-ticket sales devices 500a, 500b, . . . , 500c, the e-ticket confirmation devices 600a, 600b, . . . , 600c, and the package sales devices 700a, 700b, . . . , 700c, via dedicated lines.

The memory card 100 has a function of authenticating a user. The memory card 100 stores (i) information about an e-ticket, (ii) information about an incentive of purchasing the e-ticket, (iii) information about an incentive of using the e-ticket, and the like. As one example, the memory card 100 has IC card functions.

The communication terminal device 200 can have the memory card 100 inserted and removed. To purchase an e-ticket, the memory card 100 is inserted in the communication terminal device 200. After authentication of the memory card 100, the communication terminal device 200 sends information about an order for the e-ticket to an e-ticket sales device to which it is connected via the Internet. The communication terminal device 200 then receives information about the e-ticket and information about an incentive of purchasing the e-ticket, from the e-ticket sales device. To purchase a package, the memory card 100 is inserted in the communication terminal device 200. After authentication of the memory card 100, the communication terminal device 200 sends information about an order for the package to a package sales device to which it is connected via the Internet. The communication terminal device 200 then receives information about a purchase result from the package sales device. As one example, the communication terminal device 200 is a PDA (personal digital assistant) that can have the memory card 100 inserted and removed.

The playback device 300 plays back video data and audio data stored on the memory card 100 and a purchased package.

The movie company management device 400 receives information about users from the e-ticket sales devices 500a, 500b, . . . , 500c, the e-ticket confirmation devices 600a, 600b, . . . , 600c, and the package sales devices 700a, 700b, . . . , 700c, and manages the received information.

The e-ticket sales device 500a is managed by a movie company or a ticket sales company. The e-ticket sales device 500a receives information about an order for an e-ticket from the communication terminal device 200 via the Internet. The e-ticket sales device 500a issues the e-ticket and generates information about an incentive of purchasing the e-ticket, based on the received information. The e-ticket sales device 500a sends information about the issued and the information about the incentive of purchasing the e-ticket, to the communication terminal device 200. The e-ticket sales device 500a also sends information about the user who purchased the e-ticket, to the movie company management device 400.

The e-ticket sales devices 500b, . . . 500c have the same construction and operation as the e-ticket sales device 500a, so that their explanation has been omitted.

The e-ticket confirmation device 600a is managed in a movie theater. When the user enters the movie theater, the memory card 100 storing the e-ticket is inserted in the e-ticket confirmation device 600a. The e-ticket confirmation device 600a writes information indicating that the e-ticket has been used and information about an incentive of using the e-ticket, to the memory card 100. The e-ticket confirmation device 600a also sends information about the user who used the e-ticket, to the movie company management device 400.

The e-ticket confirmation devices 600b, . . . , 600c have the same construction and operation as the e-ticket confirmation device 600a, so that their explanation has been omitted.

The package sales device 700a is managed by the movie company or a package sales company. The package sales device 700a receives information about an order for a package from the communication terminal device 200 via the Internet. The package sales device 700a performs processing relating to purchase of the package based on the received information, and sends the processing result to the communication terminal device 200. The package sales device 700a also sends information about the user who purchased the package, to the movie company management device 400.

The package sales devices 700b, . . . , 700c have the same construction and operation as the package sales device 700a, so that their explanation has been omitted.

1.2. Construction of the Memory Card 100

Figure 2:
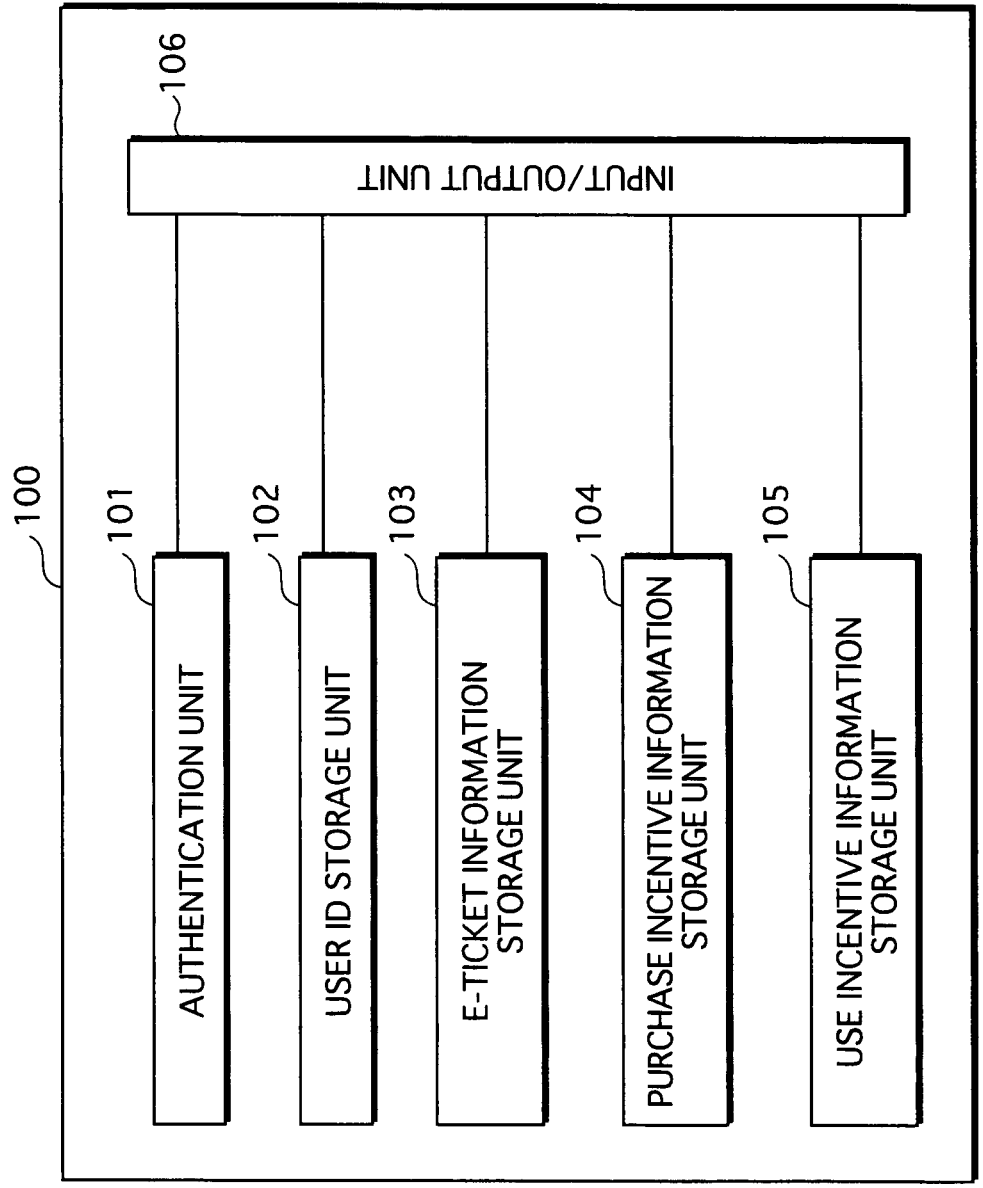
FIG. 2 is a block diagram showing a construction of a memory card shown in FIG. 1.

FIG. 2 shows a construction of the memory card 100.

In the drawing, the memory card 100 includes an authentication unit 101, a user ID storage unit 102, an e-ticket information storage unit 103, a purchase incentive information storage unit 104, a use incentive information storage unit 105, and an input/output unit 106.

The memory card 100 is actually realized by a computer system that includes a microprocessor, a ROM, and a RAM. The functions of the memory card 100 are realized by the microprocessor executing a computer program stored in the ROM.

1.2.1. Authentication Unit 101

The authentication unit 101 stores a password for judging whether to permit access to the memory card 100, beforehand.

When the memory card 100 is inserted in the communication terminal device 200, the authentication unit 101 receives a password from the communication terminal device 200 via the input/output unit 106 to authenticate a user. The authentication unit 101 compares the received password with the stored password. If they match, the authentication unit 101 permits access to data stored on the memory card 100. The authentication unit 101 also outputs access permission information indicating that the memory card 100 can be accessed, to the communication terminal device 200 via the input/output unit 106. If they do not match, the authentication unit 101 prohibits access to data stored on the memory card 100. The authentication unit 101 also outputs access prohibition information indicating that the memory card 100 cannot be accessed, to the communication terminal device 200 via the input/output unit 106.

The same authentication operation is conducted when the memory card 100 is inserted in the playback device 300 and the e-ticket confirmation devices 600a, 600b, ..., 600c.

1.2.2. User ID Storage Unit 102

The user ID storage unit 102 stores a user ID for identifying the user. Once stored, the user ID cannot be changed.

1.2.3. E-ticket Information Storage Unit 103

The e-ticket information storage unit 103 has an e-ticket information table T100, such as the one shown in FIG. 3, stored thereon.

The e-ticket information table T100 has an area for storing at least one record which is made up of: a title ID; an expiration date; a shop ID; signature data 1; a theater ID; and signature data 2.

The title ID identifies a movie. The title ID is written upon purchase of an e-ticket for the movie.

The expiration date is a date until which the e-ticket can be used. The expiration date is written upon purchase of the e-ticket.

The shop ID identifies a shop of the e-ticket. The shop ID is written upon purchase of the e-ticket.

The signature data 1 is first signature data generated by digitally-signing the title ID and the expiration date by an e-ticket sales device corresponding to the shop. The signature data 1 is written upon purchase of the e-ticket.

The theater ID identifies a movie theater. The theater ID is written upon use of the e-ticket.

The signature data 2 is second signature data generated by digitally-signing the title ID and the expiration date by an e-ticket confirmation device corresponding to the movie theater. The signature data 2 is written upon use of the e-ticket.

1.2.4. Purchase Incentive Information Storage Unit 104

The purchase incentive information storage unit 104 has a purchase incentive information table T110 such as the one shown in FIG. 4.

The purchase incentive information table T110 has an area for storing at least one record which is made up of: a title ID; audio data 1; package discount data; and exclusive data 1.

The title ID identifies a movie.

The audio data 1 shows a name of audio data for a trailer of the movie.

The package discount data shows a discount on a package which stores content containing data of the movie.

The exclusive data 1 shows information that can be used only by those who purchased the e-ticket. For example, the exclusive data 1 includes an address of a network service that can be used only by those who purchased the e-ticket, and a login name and a password necessary for using the network service.

Once the user of the memory card 100 has purchased the e-ticket, he or she can participate in a community such as a message board provided by the network service and purchase movie memorabilia online before or after release of the movie, using the address, login name, and password shown by the exclusive data 1.

The purchase incentive information storage unit 104 also stores audio data of the movie trailer corresponding to the audio data name shown by the audio data 1 in the purchase incentive information table T110.

1.2.5. Use Incentive Information Storage Unit 105

The use incentive information storage unit 105 has a use incentive information table T120 such as the one shown in FIG. 5.

The use incentive information table T120 has an area for storing at least one record which is made up of: a title ID; audio data 2; exclusive data 2; and additional information.

The title ID identifies a movie.

The audio data 2 shows a name of audio data for a trailer of a package which contains data of the movie.

The exclusive data 2 shows information relating to a service offered when purchasing the package, if such information is available. For example, the exclusive data 2 shows a right to purchase the package in a limited-edition case. If such information does not exist, the exclusive data 2 field is blank.

The additional information shows information relating to an additional advantage when purchasing the package, if such information is available. For example, the additional information shows a right to obtain a sample package when purchasing the package. If such information does not exist, the additional information field is blank.

Once the user of the memory card 100 has used an e-ticket for the movie, he or she can purchase a deluxe-edition package according to the exclusive data 2, and also obtain a bonus package according to the additional information.

The use incentive information storage unit 105 also stores audio data of the package trailer corresponding to the audio data name shown by the audio data 2 in the use incentive information table T120.

1.2.6. Input/Output Unit 106

The input/output unit 106 outputs a password received from the communication terminal device 200 to the authentication unit 101, when the memory card 100 is inserted in the communication terminal device 200. Likewise, when the memory card 100 is inserted in the playback device 300 and the e-ticket confirmation devices 600a, 600b, ..., 600c, the input/output unit 106 outputs a received password to the authentication unit 101.

The input/output unit 106 also transfers data which is read from or written to the memory card 100 by a device in which the memory card 100 is inserted.

1.3. Construction of the Communication Terminal Device 200

Figure 6:
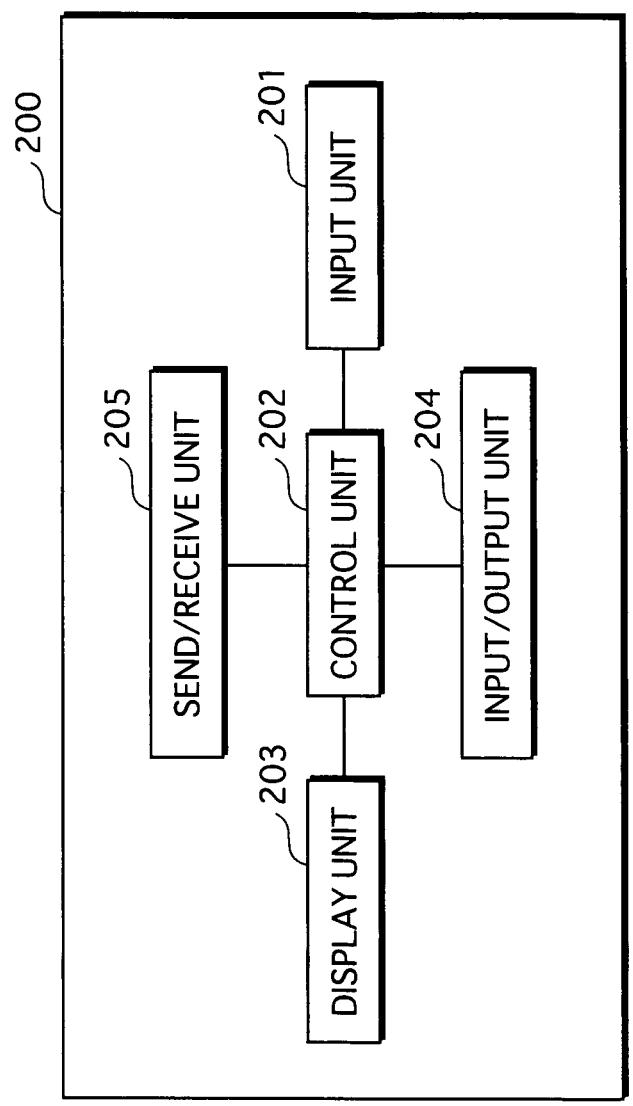
FIG. 6 is a block diagram showing a construction of a communication terminal device shown in FIG. 1.

FIG. 6 shows a construction of the communication terminal device 200.

In the drawing, the communication terminal device 200 includes an input unit 201, a control unit 202, a display unit 203, an input/output unit 204, and a send/receive unit 205.

The communication terminal device 200 is actually realized by a computer system that includes a microprocessor, a ROM, a RAM, and a display unit. The functions of the communication terminal device 200 are realized by the microprocessor executing a computer program stored in the ROM.

1.3.1. Input Unit 201

The input unit 201 operates as follows.

(A) Authentication of the Memory Card 100

When the memory card 100 is inserted in the communication terminal device 200, the input unit 201 receives a password for authentication, and outputs the received password to the control unit 202.

(B) Purchase of an E-Ticket

To purchase an e-ticket, the input unit 201 receives an Internet address of one of the e-ticket sales devices 500a, 500b, . . . , 500c, and outputs the Internet address to the control unit 202.

Once the communication terminal device 200 has been network-connected to the e-ticket sales device, the input unit 201 receives a title ID, and outputs the title ID to the control unit 202.

To pay for the e-ticket, the input unit 201 receives ticket payment information which includes the title ID, a decision to pay for the e-ticket, and a payment method, and outputs the ticket payment information to the control unit 202. To cancel the purchase of the e-ticket, the input unit 201 receives cancel information, which includes the title ID and a decision to cancel the purchase of the e-ticket, and outputs the cancel information to the control unit 202.

Here, the payment method for the e-ticket may be any of cash, credit card, electronic money, and the like.

(C) Purchase of a Package

To purchase a package, the input unit 201 receives an Internet address of one of the package sales devices 700a, 700b, . . . , 700c, and outputs the Internet address to the control unit 202.

Once the communication terminal device 200 has been network-connected to the package sales device, the input unit 201 receives a title ID, and outputs the title ID to the control unit 202.

To pay for the package, the input unit 201 receives package payment information which includes the title ID, a decision to pay for the package, and a payment method, and outputs the package payment information to the control unit 202. To cancel the purchase of the package, the input unit 201 receives cancel information which includes the title ID and a decision to cancel the purchase of the package, and outputs the cancel information to the control unit 202.

Here, the payment method for the package may be any of cash, credit card, electronic money, and the like.

1.3.2. Control Unit 202

The control unit 202 operates as follows.

(A) Authentication of the Memory Card 100

The control unit 202 receives a password for authentication from the input unit 201, and outputs the password to the memory card 100 via the input/output unit 204. When receiving access permission information from the memory card 100, via the input/output unit 204, as an authentication result, the control unit 202 outputs the access permission information to the display unit 203. When receiving access prohibition information from the memory card 100, via the input/output unit 204, as an authentication result, the control unit 202 outputs the access prohibition information to the display unit 203.

(B) Purchase of an E-Ticket

The control unit 202 receives an Internet address of one of the e-ticket sales devices 500a, 500b, . . . , 500c from the input unit 201. The control unit 202 network-connects to the e-ticket sales device using the Internet address, through the send/receive unit 205. Suppose here that the communication terminal device 200 is connected to the e-ticket sales device 500a via the Internet.

The control unit 202 receives a title ID from the input unit 201. The control unit 202 obtains a user ID from the memory card 100. The control unit 202 sends ticket order information which includes the user ID and the title ID, to the e-ticket sales device 500a via the send/receive unit 205. The control unit 202 then receives ticket purchase confirmation information which includes the user ID, the title ID, an expiration date of an e-ticket, an audio data name of a trailer of a movie identified by the title ID, package discount data, exclusive data given when purchasing the e-ticket, and a selling price of the e-ticket, from the e-ticket sales device 500a via the send/receive unit 205. The control unit 202 temporarily stores the ticket purchase confirmation information, and also outputs the ticket purchase confirmation information to the display unit 203.

Upon receiving ticket payment information from the input unit 201, the control unit 202 generates ticket billing request information which includes the ticket payment information and the user ID, and sends the ticket billing request information to the e-ticket sales device 500a via the send/receive unit 205.

Upon receiving cancel information from the input unit 201, the control unit 202 generates ticket billing cancel information which includes the cancel information and the user ID, and sends the ticket billing cancel information to the e-ticket sales device 500a via the send/receive unit 205.

Following this, the control unit 202 receives either ticket purchase determination information or ticket purchase cancel information from the e-ticket sales device 500a via the send/receive unit 205. The ticket purchase determination information includes ticket purchase completion information indicating completion of the e-ticket purchase, signature data information including a shop ID and first signature data, and the audio data of the movie trailer. The ticket purchase cancel information indicates completion of the cancellation of the e-ticket purchase. When receiving the ticket purchase determination information, the control unit 202 outputs the ticket purchase completion information to the display unit 203. The control unit 202 also generates purchased ticket information which includes the title ID, the expiration date, the shop ID, and the first signature data, based on the signature data information and the temporarily-stored ticket purchase confirmation information. The control unit 202 writes the title ID, the expiration date, the shop ID, and the first signature data included in the purchased ticket information, respectively to the title ID field, the expiration date field, the shop ID field, and the signature data 1 field in the e-ticket information table T100 in the e-ticket information storage unit 103 in the memory card 100. The control unit 202 also generates purchase incentive information which includes the title ID, the audio data name of the movie trailer, the package discount data, and the exclusive data, based on the temporarily-stored ticket purchase confirmation information. The control unit 202 writes the purchase incentive information to the purchase incentive information table T110 in the purchase incentive information storage unit 104 in the memory card 100. The control unit 202 further stores the audio data of the movie trailer in the purchase incentive information storage unit 104 in the memory card 100. The control unit 202 then discards the temporarily-stored ticket purchase confirmation information.

When receiving the ticket purchase cancel information, on the other hand, the control unit 202 outputs the ticket purchase cancel information to the display unit 203, and discards the temporarily-stored ticket purchase confirmation information.

(C) Purchase of a Package

The control unit 202 receives an Internet address of one of the package sales devices 700a, 700b, . . . , 700c from the input unit 201. The control unit 202 network-connects to the package sales device, via the send/receive unit 205, using the Internet address. Suppose here that the communication terminal device 200 is connected to the package sales device 700a via the Internet.

The control unit 202 receives a title ID from the input unit 201. The control unit 202 also obtains the user ID from the memory card 100. The control unit 202 searches the e-ticket information table T100 for a record corresponding to the received title ID, and reads an expiration date, a theater ID, and second signature data included in the record. Here, if an e-ticket for a movie identified by the title ID has not been used, the theater ID field and the signature data 2 field in the record are blank. The control unit 202 also searches the purchase incentive information table T110 for a record corresponding to the title ID, and reads package discount data included in the record.

The control unit 202 then generates package order information in the following manner.

The control unit 202 checks whether the theater ID field and the signature data 2 field in the record in the e-ticket information table T100 are blank, to judge whether the e-ticket has been used or not. If the e-ticket has been used, the control unit 202 searches the use incentive information table T120 for a record corresponding to the title ID, and reads exclusive data 2 and additional information included in the record. Through the use of the title ID, the user ID, and the information read from (i) the e-ticket information table T100, (ii) the purchase incentive information table T110, and (iii) the use incentive information table T120, the control unit 202 generates package order information which includes the user ID, the title ID, the expiration date, the theater ID, the second signature data, the package discount data, the exclusive data 2, and the additional information.

If the e-ticket has not been used, the control unit 202 generates package order information which includes the user ID, the title ID, the expiration date, the theater ID, the second signature data, and the package discount data. The theater ID and the second signature data included in this package order information are blank.

The control unit 202 sends the generated package order information to the package sales device 700a via the send/receive unit 205.

If the e-ticket has been used, the control unit 202 receives package purchase confirmation information which includes the user ID, the title ID, information about a package type specified according to the exclusive data 2 and the additional information included in the package order information, and a selling price of the package, from the package sales device 700a via the send/receive unit 205. The control unit 202 outputs the package purchase confirmation information to the display unit 203. If the e-ticket has not been used, on the other hand, the control unit 202 receives package purchase confirmation information which includes the user ID, the title ID, and a selling price of the package, from the package sales device 700a via the send/receive unit 205. The control unit 202 outputs the package purchase confirmation information to the display unit 203.

When receiving package payment information from the input unit 201, the control unit 202 generates package billing request information, which includes the package payment information and the user ID, and sends the package billing request information to the package sales device 700a via the send/receive unit 205. When receiving cancel information from the input unit 201, the control unit 202 generates package billing cancel information, which includes the cancel information and the user ID, and sends the package billing cancel information to the package sales device 700a via the send/receive unit 205.

When receiving package purchase completion information indicating completion of the package purchase from the package sales device 700a, via the send/receive unit 205, the control unit 202 outputs the package purchase completion information to the display unit 203. When receiving package purchase prohibition information indicating that the package cannot be purchased from the package sales device 700a, via the send/receive unit 205, the control unit 202 outputs the package purchase prohibition information to the display unit 203. When receiving package purchase cancel information indicating completion of the cancellation of the package purchase from the package sales device 700a, via the send/receive unit 205, the control unit 202 outputs the package purchase cancel information to the display unit 203.

1.3.3. Display Unit 203

The display unit 203 operates as follows.

(A) Authentication of the Memory Card 100

When receiving access permission information from the control unit 202, the display unit 203 displays the access permission information to notify the user. When receiving access prohibition information from the control unit 202, the display unit 203 displays the access prohibition information to notify the user.

(B) Purchase of an E-Ticket

When receiving ticket purchase confirmation information from the control unit 202, the display unit 203 displays a message indicating the receipt of the ticket purchase confirmation information from the e-ticket sales device 500a, and prompts the user to enter either ticket payment information or cancel information. When receiving ticket purchase completion information from the control unit 202, the display unit 203 displays a message indicating the receipt of the ticket purchase completion information from the e-ticket sales device 500a. When receiving ticket purchase cancel information from the control unit 202, the display unit 203 displays a message indicating the receipt of the ticket purchase cancel information from the e-ticket sales device 500a.

(C) Purchase of a Package

When receiving package purchase confirmation information from the control unit 202, the display unit 203 displays a message indicating the receipt of the package purchase confirmation information from the package sales device 700a, and prompts the user to enter either package payment information or cancel information. When receiving package purchase completion information from the control unit 202, the display unit 203 displays a message indicating the receipt of the package purchase completion information from the package sales device 700a. When receiving package purchase prohibition information from the control unit 202, the display unit 203 displays a message indicating the receipt of the package purchase prohibition information from the package sales device 700a. When receiving package purchase cancel information from the control unit 202, the display unit 203 displays a message indicating the receipt of the package purchase cancel information from the package sales device 700a.

1.3.4. Input/Output Unit 204

The input/output unit 204 performs input/output of information between the control unit 202 and the memory card 100.

1.3.5. Send/Receive Unit 205

The send/receive unit 205 operates as follows.

At the purchase of an e-ticket, the send/receive unit 205 sends information received from the control unit 202 to the e-ticket sales device 500a, and outputs information received from the e-ticket sales device 500a to the control unit 202. At the purchase of a package, the send/receive unit 205 sends information received from the control unit 202 to the package sales device 700a, and outputs information received from the package sales device 700a to the control unit 202.

1.4. Construction of the Playback Device 300

Figure 7:
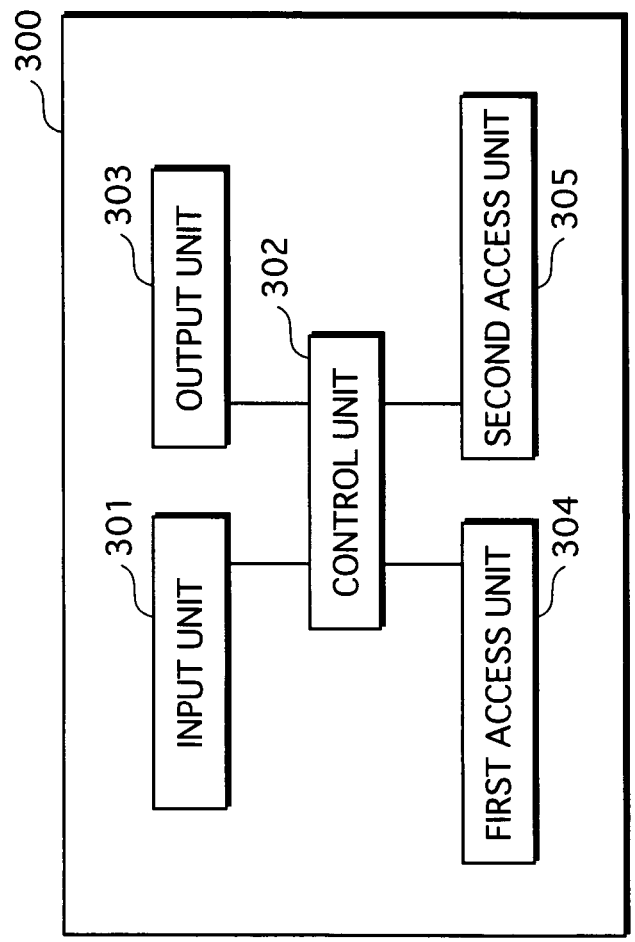
FIG. 7 is a block diagram showing a construction of a playback device shown in FIG. 1.

FIG. 7 shows a construction of the playback device 300.

In the drawing, the playback device 300 includes an input unit 301, a control unit 302, an output unit 303, a first access unit 304, and a second access unit 305.

The playback device 300 is actually realized by a computer system that includes a microprocessor, a ROM, a RAM, and a hard disk unit. The functions of the playback device 300 are realized by the microprocessor executing a computer program stored in the ROM or the hard disk unit.

A purchased package stores not only content which is video data and audio data of a movie, but also stored a title ID of the movie, video data of a trailer of the movie, and video data of a trailer of the package. To play back the movie trailer, the purchased package and the memory card 100, on which audio data of the movie trailer is stored, are both inserted in the playback device 300. To play back the package trailer, the purchased package and the memory card 100, on which audio data of the package trailer is stored, are both inserted in the playback device 300.

The playback device 300 is connected with a display device of a television or the like (not shown in FIG. 7), and outputs video and audio from the display device.

1.4.1. Input Unit 301

The input unit 301 operates as follows.

(A) Authentication of the Memory Card 100

When the memory card 100 is inserted in the playback device 300, the input unit 301 receives a password for authentication, and outputs the password to the control unit 302.

(B) Playback of a Movie Trailer

After the memory card 100 and a package are inserted in the playback device 300 and the memory card 100 performs authentication, the input unit 301 receives first playback request information, which includes a title ID and a request to play back a trailer of a movie identified by the title ID. The input unit 301 outputs the first playback request information to the control unit 302.

(C) Playback of a Package Trailer

After the memory card 100 and a package are inserted in the playback device 300 and the memory card 100 performs authentication, the input unit 301 receives second playback request information which includes a title ID and a request to play back a trailer of the package. The input unit 301 outputs the second playback request information to the control unit 302.

(D) Playback of a Package

After a package is inserted in the playback device 300, the input unit 301 receives third playback request information, which includes a request to play back the package. The input unit 301 outputs the third playback request information to the control unit 302.

1.4.2. Control Unit 302

The control unit 302 operates as follows.

(A) Authentication of the Memory Card 100

The control unit 302 receives a password for authentication from the input unit 301, and outputs the password to the memory card 100 via the first access unit 304. When receiving access permission information from the memory card 100, via the first access unit 304, as an authentication result, the control unit 302 outputs the access permission information to the output unit 303. When receiving access prohibition information from the memory card 100, via the first access unit 304, as an authentication result, the control unit 302 outputs the access prohibition information to the output unit 303.

(B) Playback of a Movie Trailer

The control unit 302 receives first playback request information from the input unit 301. The control unit 302 searches the purchase incentive information table T110 in the purchase incentive information storage unit 104 in the memory card 100, for an audio data name corresponding to a title ID included in the first playback request information. If the audio data name does not exist, the control unit 302 outputs, to the output unit 303, playback prohibition information indicating that a trailer of a movie identified by the title ID cannot be played. If the audio data name exists, the control unit 302 judges whether a title ID in an inserted package matches the title ID included in the first playback request information. If they do not match, the control unit 302 outputs playback prohibition information to the output unit 303. If they match, the control unit 302 plays back the movie trailer.

To play back the movie trailer, the control unit 302 reads audio data of the movie trailer identified by the audio data name from the purchase incentive information storage unit 104 in the memory card 100 via the first access unit 304. The control unit 302 also reads video data of the movie trailer from the inserted package via the second access unit 305. The control unit 302 outputs the video data and the audio data in sync with each other, to the output unit 303.

(C) Playback of a Package Trailer

The control unit 302 receives second playback request information from the input unit 301. The control unit 302 searches the use incentive information table T120 in the use incentive information storage unit 105 in the memory card 100, for an audio data name corresponding to a title ID included in the second playback request information. If the audio data name does not exist, the control unit 302 outputs, to the output unit 303, playback prohibition information indicating that a trailer of a package, which stores content containing data of a movie identified by the title ID, cannot be played. If the audio data name exists, the control unit 302 judges whether a title ID in an inserted package matches the title ID included in the second playback request information. If they do not match, the control unit 302 outputs playback prohibition information to the output unit 303. If they match, the control unit 302 plays back the package trailer.

To play back the package trailer, the control unit 302 reads audio data of the package trailer identified by the audio data name from the use incentive information storage unit 105 via the first access unit 304. The control unit 302 also reads video data of the package trailer from the inserted package via the second access unit 305. The control unit 302 outputs, to the output unit 303, the video data and the audio data in sync with each other.

(D) Playback of a Package

The control unit 302 receives third playback request information from the input unit 301, and plays back a package.

To play back the package, the control unit 302 reads audio data and video data from the package via the second access unit 305, and outputs the audio data and the video data to the output unit 303.

1.4.3. Output Unit 303

The output unit 303 operates as follows. In authentication of the memory card 100, when receiving access permission information from the control unit 302, the output unit 303 outputs the access permission information to the display device to notify the user. When receiving access prohibition information, the output unit 303 outputs the access prohibition information to the display device to notify the user.

In playback of a movie trailer, a package trailer, and a package, the output unit 303 receives audio data and video data from the control unit 302, and outputs the audio data and the video data to the display device.

When receiving playback prohibition information from the control unit 302, the output unit 303 outputs the playback prohibition information to the display device.

1.4.4. First Access Unit 304

The first access unit 304 performs input/output of information between the control unit 302 and the memory card 100.

1.4.5. Second Access Unit 305

The second access unit 305 performs input/output of information between the control unit 302 and a package.

1.5. Construction of the Movie Company Management Device 400

Figure 8:
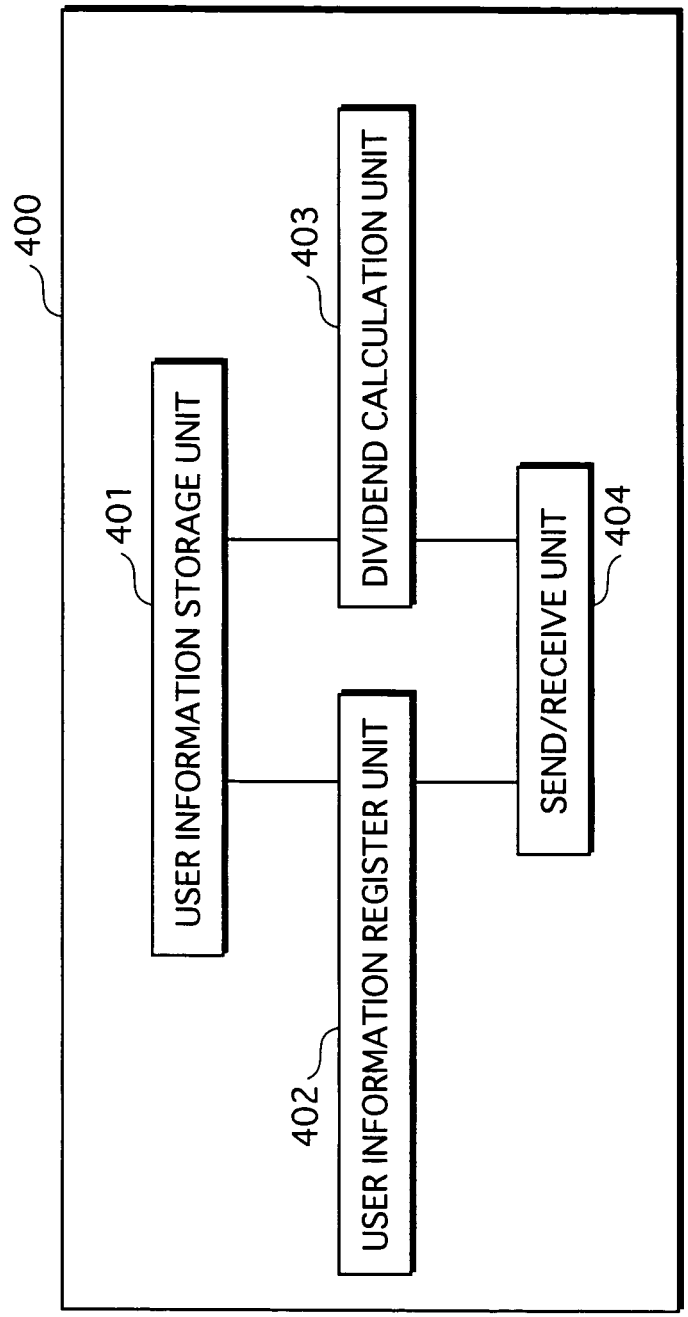
FIG. 8 is a block diagram showing a construction of a movie company management device shown in FIG. 1.

FIG. 8 shows a construction of the movie company management device 400.

In the drawing, the movie company management device 400 includes a user information storage unit 401, a user information register unit 402, a dividend calculation unit 403, and a send/receive unit 404.

The movie company management device 400 is actually realized by a computer system that includes a microprocessor, a ROM, a RAM, a hard disk unit, a display unit, a keyboard, a mouse, and a modem. The functions of the movie company management device 400 are realized by the microprocessor executing a computer program stored in the ROM or the hard disk unit.

Here, the movie company management device 400 manages personal information associated with user IDs in a secure state. The secure state is, for instance, an encrypted state.

1.5.1. User Information Storage Unit 401

The user information storage unit 401 has a user management table T400 such as the one shown in FIG. 9.

The user management table T400 has an area for storing at least one record that is made up of: a user ID; a title ID; ticket purchase information; ticket use information; and package purchase information.

The user ID identifies a user.

The title ID identifies a movie.

The ticket purchase information is made up of a shop ID 1 and a selling date 1. The shop ID 1 identifies a shop of an e-ticket purchase. The selling date 1 is a date at which the e-ticket was sold.

The ticket use information is made up of a theater ID and a use date. The theater ID identifies a movie theater. The use date is a date at which the e-ticket was used.

The package purchase information is made up of a shop ID 2 and a selling date 2. The shop ID 2 identifies a shop of a package purchase. The selling date 2 is a date at which the package was sold.

1.5.2. User Information Register Unit 402

The user information register unit 402 operates as follows.

(A) Purchase of an E-Ticket

The user information register unit 402 receives ticket sales information which includes a user ID, a title ID, a shop ID, and a selling date, from one of the e-ticket sales devices 500a, 500b, . . . , 500c via the send/receive unit 404. The user information register unit 402 writes the ticket sales information to the user management table T400 in the user information storage unit 401. Here, the shop ID and the selling date are written respectively to the shop ID 1 field and the selling date 1 field of the ticket purchase information field in the user management table T400.

(B) Use of an E-Ticket

The user information register unit 402 receives ticket use information which includes a user ID, a title ID, a theater ID, and a use date, from one of the e-ticket confirmation devices 600a, 600b, . . . , 600c via the send/receive unit 404. The user information register unit 402 searches the user management table T400 for a record corresponding to the user ID and the title ID included in the ticket use information. The user information register unit 402 writes the theater ID and the use date included in the ticket use information, respectively to the theater ID field and the use date field of the ticket use information field in the record.

(C) Purchase of a Package

The user information register unit 402 receives package sales information which includes a user ID, a title ID, a shop ID, and a selling date, from one of the package sales devices 700a, 700b, . . . , 700c via the send/receive unit 404. The user information register unit 402 searches the user management table T400 for a record corresponding to the user ID and the title ID included in the package sales information. The user information register unit 402 writes the shop ID and the selling date included in the package sales information, respectively to the shop ID 2 field and the selling date 2 field of the package purchase information field in the record.

1.5.3. Dividend Calculation Unit 403

The dividend calculation unit 403 calculates a dividend to be passed on to each device, based on e-ticket sales, e-ticket use, and package sales. The dividend calculation unit 403 sends a dividend calculation result to each device via the send/receive unit 404. After this, the dividend is paid by cash or the like.

For an e-ticket sales device, the dividend calculation unit 403 calculates a dividend from ticket sales of a corresponding ticket shop within a dividend calculation target period, with reference to the ticket purchase information field in the user management table T400. The dividend calculation unit 403 sends first dividend information, which includes a shop ID of the ticket shop and a calculation result, to the e-ticket sales device via the send/receive unit 404.

For an e-ticket confirmation device, the dividend calculation unit 403 calculates a dividend from ticket use of a corresponding movie theater within a dividend calculation target period, with reference to the ticket use information field in the user management table T400. The dividend calculation unit 403 sends second dividend information which includes a theater ID of the movie theater and a calculation result, to the e-ticket confirmation device via the send/receive unit 404.

For a package sales device, the dividend calculation unit 403 calculates a dividend from package sales of a corresponding package shop within a dividend calculation target period, with reference to the package purchase information field in the user management table T400. The dividend calculation unit 403 sends third dividend information which includes a shop ID of the package shop and a calculation result, to the package sales device via the send/receive unit 404.

1.5.4. Send/Receive Unit 404

The send/receive unit 404 outputs information received from the e-ticket sales devices 500a, 500b, . . . , 500c, the e-ticket confirmation devices 600a, 600b, . . . , 600c, and the package sales devices 700a, 700b, . . . , 700c, to the user information register unit 402. Also, when receiving first dividend information from the dividend calculation unit 403, the send/receive unit 404 sends the first dividend information to an e-ticket sales device corresponding to a shop ID included in the first dividend information. When receiving second dividend information from the dividend calculation unit 403, the send/receive unit 404 sends the second dividend information to an e-ticket confirmation device corresponding to a theater ID included in the second dividend information. When receiving third dividend information from the dividend calculation unit 403, the send/receive unit 404 sends the third dividend information to a package sales device corresponding to a shop ID included in the third dividend information.

1.6. Construction of the E-Ticket Sales Device 500a

Figure 10:
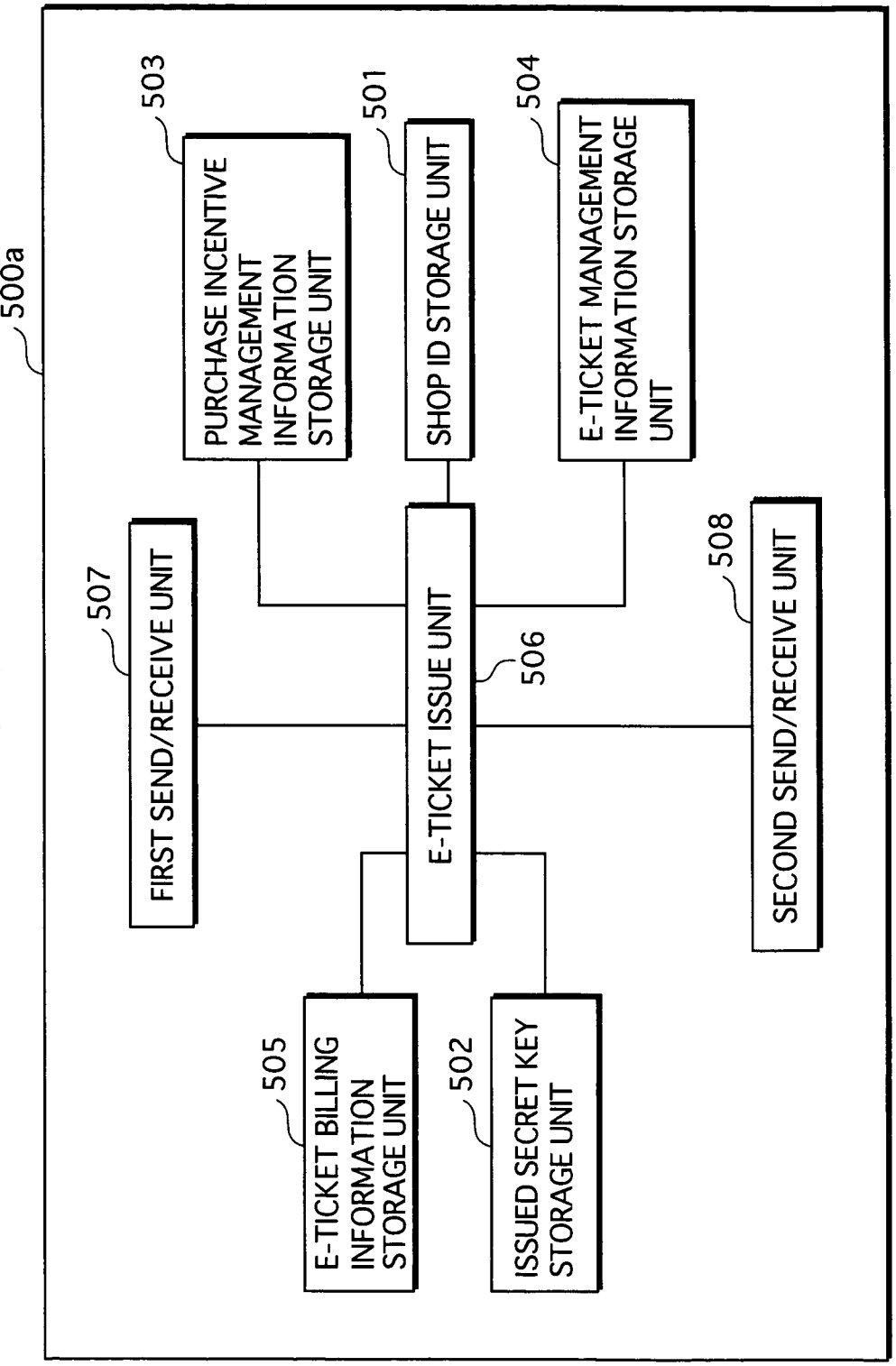
FIG. 10 is a block diagram showing a construction of an e-ticket sales device shown in FIG. 1.

FIG. 10 shows a construction of the e-ticket sales device 500a.

In the drawing, the e-ticket sales device 500a includes a shop ID storage unit 501, an issued secret key storage unit 502, a purchase incentive management information storage unit 503, an e-ticket management information storage unit 504, an e-ticket billing information storage unit 505, an e-ticket issue unit 506, a first send/receive unit 507, and a second send/receive unit 508.

The e-ticket sales device 500a is actually realized by a computer system that includes a microprocessor, a ROM, a RAM, a hard disk unit, a display unit, a keyboard, a mouse, and a modem. The functions of the e-ticket sales device 500a are realized by the microprocessor executing a computer program stored in the ROM or the hard disk unit.

Upon receipt of a network connection request made from the communication terminal device 200, using an Internet address of the e-ticket sales device 500a, the e-ticket sales device 500a is connected with the communication terminal device 200 via the Internet.

1.6.1. Shop ID Storage Unit 501

The shop ID storage unit 501 stores a shop ID of a ticket shop. Once stored, the shop ID cannot be changed.

1.6.2. Issued Secret Key Storage Unit 502

The issued secret key storage unit 502 stores a secret key for generating first signature data.

1.6.3. Purchase Incentive Management Information Storage Unit 503

The purchase incentive management information storage unit 503 has a purchase incentive management table T500 such as the one shown in FIG. 11. The structure of the purchase incentive management table T500 is the same as that of the purchase incentive information table T110 in the purchase incentive information storage unit 104 in the memory card 100. Thus, an explanation thereof has been omitted. The purchase incentive management information storage unit 503 also stores audio data of a movie trailer corresponding to the audio data 1 field in the purchase incentive management table T500.

1.6.4. E-Ticket Management Information Storage Unit 504

The e-ticket management information storage unit 504 has an e-ticket management table T510 such as the one shown in FIG. 12.

The e-ticket management table T510 has an area for storing at least one record that is made up of a title ID and an expiration date.

The title ID identifies a movie.

The expiration date is a date until which an e-ticket for the movie can be used.

1.6.5. E-Ticket Billing Information Storage Unit 505

The e-ticket billing information storage unit 505 has an e-ticket billing table T520 such as the one shown in FIG. 13.

The e-ticket billing table T520 has an area for storing at least one record that is made up of: a user ID; a title ID; a selling date 1; a price 1; and a payment method 1.

The user ID identifies a user.

The title ID identifies a movie.

The selling date 1 is a date at which an e-ticket for the movie was sold.

The price 1 is a selling price of the e-ticket.

The payment method 1 is a payment method for the e-ticket.

This e-ticket billing table T520 is used when making settlement for a predetermined time period during which e-tickets were sold.

1.6.6. E-Ticket Issue Unit 506

The e-ticket issue unit 506 stores ticket prices in correspondence with title IDs of movies, beforehand.

The e-ticket issue unit 506 receives ticket order information from the communication terminal device 200, through the second send/receive unit 508. The e-ticket issue unit 506 obtains a record corresponding to a title ID included in the ticket order information, from the purchase incentive management table T500 in the purchase incentive management information storage unit 503. The e-ticket issue unit 506 also obtains a record corresponding to the title ID from the e-ticket management table T510 in the e-ticket management information storage unit 504. The e-ticket issue unit 506 further obtains a ticket price corresponding to the title ID. The e-ticket issue unit 506 generates ticket purchase confirmation information, using a user ID included in the ticket order information, the records obtained from the purchase incentive management table T500 and the e-ticket management table T510, and the ticket price. The e-ticket issue unit 506 sends the ticket purchase confirmation information to the communication terminal device 200 via the second send/receive unit 508. The e-ticket issue unit 506 also temporarily stores the ticket purchase confirmation information.

Following this, the e-ticket issue unit 506 receives ticket billing request information or ticket billing cancel information from the communication terminal device 200 via the second send/receive unit 508.

If the e-ticket issue unit 506 receives the ticket billing request information, the e-ticket issue unit 506 obtains the temporarily-stored ticket purchase confirmation information, using the user ID and the title ID included in the ticket billing request information. The e-ticket issue unit 506 generates (i) ticket billing information which includes the user ID, the title ID, and the ticket price included in the ticket purchase confirmation information, a (ii) payment method included in the ticket billing request information, and (iii) a selling date. The e-ticket issue unit 506 writes the ticket billing information to the e-ticket billing table T520 in the e-ticket billing information storage unit 505. Next, the e-ticket issue unit 506 generates ticket sales information, and sends the ticket sales information to the movie company management device 400 via the first send/receive unit 507. The e-ticket issue unit 506 also reads the secret key from the issued secret key storage unit 502, and digitally-signs the title ID and the expiration date included in the ticket purchase confirmation information using the secret key to generate first signature data. The e-ticket issue unit 506 generates signature data information which includes the first signature data and the shop ID stored in the shop ID storage unit 501. The e-ticket issue unit 506 further generates ticket purchase completion information. The e-ticket issue unit 506 acquires audio data of a movie trailer corresponding to an audio data name included in the ticket purchase confirmation information, from the purchase incentive management information storage unit 503. The e-ticket issue unit 506 generates (i) ticket purchase determination information, which includes the signature data information, (ii) the ticket purchase completion information, and (iii) the audio data. The e-ticket issue unit 506 sends the ticket purchase determination information to the communication terminal device 200 via the second send/receive unit 508. The e-ticket issue unit 506 then discards the temporarily-stored ticket purchase confirmation information.

If the e-ticket issue unit 506 receives the ticket billing cancel information, on the other hand, the e-ticket issue unit 506 discards the temporarily-stored ticket purchase confirmation information based on the user ID and the title ID included in the ticket billing cancel information. The e-ticket issue unit 506 generates ticket purchase cancel information, and sends the ticket purchase cancel information to the communication terminal device 200 via the second send/receive unit 508.

For example, the ElGamal signature scheme based on a finite field may be used to generate the first signature data. Since the ElGamal signature scheme based on a finite field is well known, its explanation has been omitted here.

1.6.7. First Send/Receive Unit 507

The first send/receive unit 507 sends ticket sales information received from the e-ticket issue unit 506, to the movie company management device 400. The first send/receive unit 507 also outputs a dividend calculation result received from the movie company management device 400, to a display unit (not illustrated). The display unit displays the dividend calculation result to notify an operator of the e-ticket sales device 500*a*.

1.6.8. Second Send/Receive Unit 508

The second send/receive unit 508 outputs information received from the communication terminal device 200, to the e-ticket issue unit 506. Also, the second send/receive unit 508 sends information received from the e-ticket issue unit 506, to the communication terminal device 200.

1.7. Construction of the E-Ticket Confirmation Device 600*a*

Figure 14:
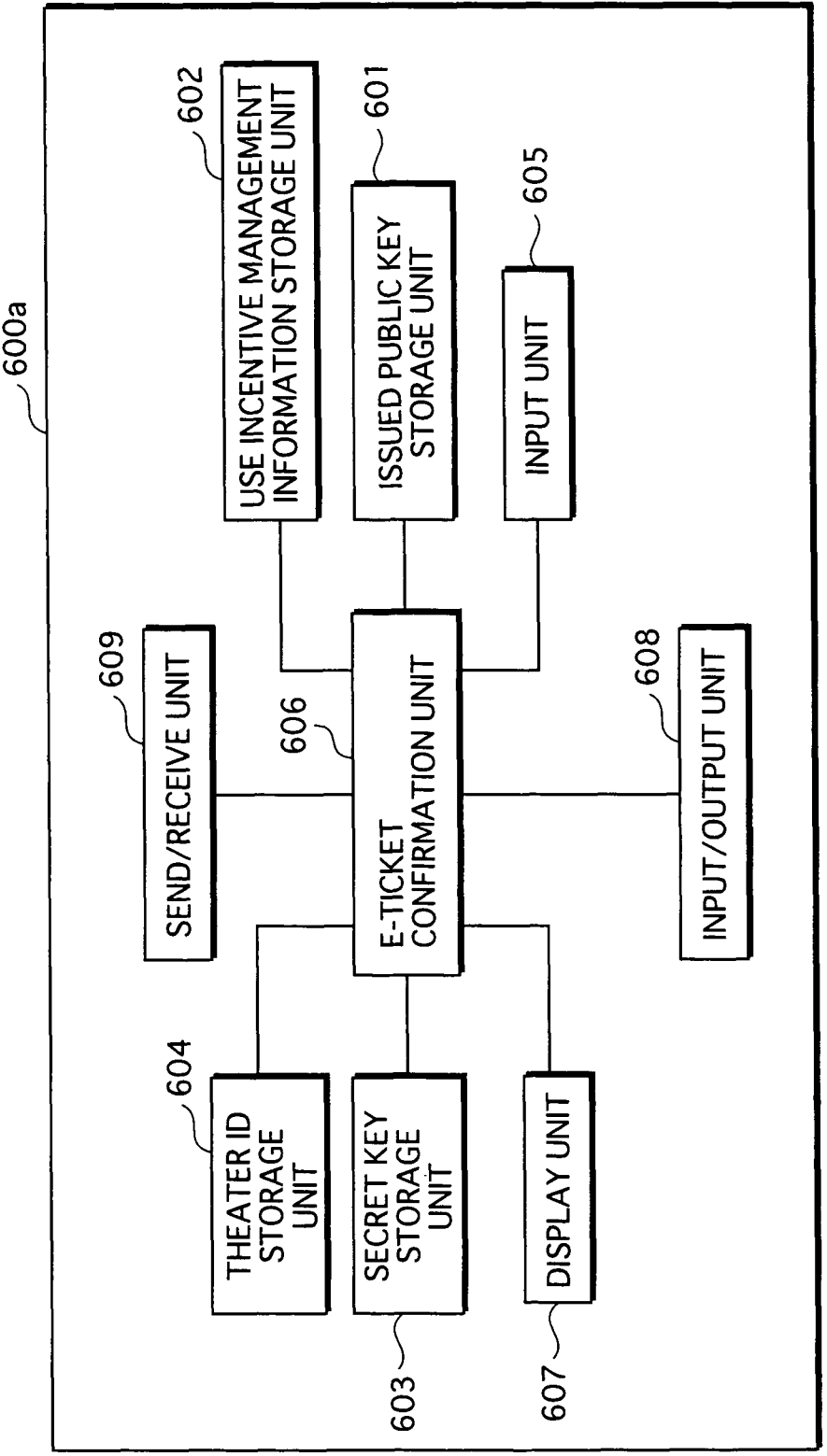
FIG. 14 is a block diagram showing a construction of an e-ticket confirmation device shown in FIG. 1.

FIG. 14 shows a construction of the e-ticket confirmation device 600*a*.

In the drawing, the e-ticket confirmation device 600*a* includes an issued public key storage unit 601, a use incentive management information storage unit 602, a secret key storage unit 603, a theater ID storage unit 604, an input unit 605, an e-ticket confirmation unit 606, a display unit 607, an input/output unit 608, and a send/receive unit 609.

The e-ticket confirmation device 600*a* is actually realized by a computer system that includes a microprocessor, a ROM, a RAM, a hard disk unit, a display unit, a keyboard, a mouse, and a modem. The functions of the e-ticket confirmation device 600*a* are realized by the microprocessor executing a computer program stored in the ROM or the hard disk unit.

1.7.1. Issued Public Key Storage Unit 601

Figure 15:
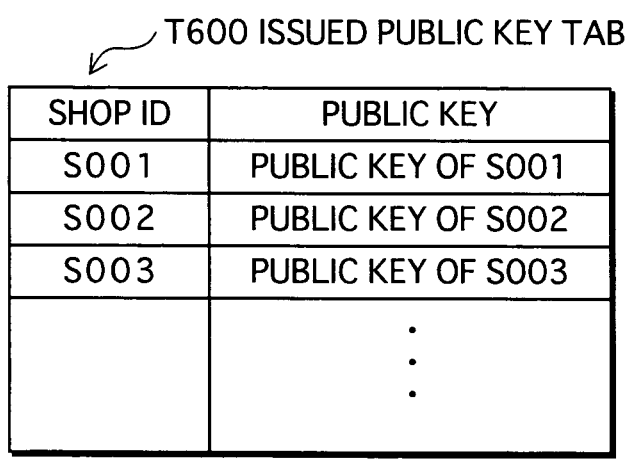
FIG. 15 shows a data structure of an issued public key table in an issued public key storage unit shown in FIG. 14.

The issued public key storage unit 601 has an issued public key table T600 such as the one shown in FIG. 15.

The issued public key table T600 has an area for storing at least one record that is made up of a shop ID and a public key.

The shop ID identifies a ticket shop.

The public key is a public key given from the ticket shop.

1.7.2. Use Incentive Management Information Storage Unit 602

The use incentive management information storage unit 602 has a use incentive management table T610 such as the one shown in FIG. 16. The use incentive management table T610 has the same structure as the use incentive information table T120 in the use incentive information storage unit 105 in the memory card 100. Thus, explanation thereof has been omitted here. The use incentive management information storage unit 602 also stores audio data of a package trailer corresponding to the audio data 2 field in the use incentive management table T610.

1.7.3. Secret Key Storage Unit 603

The secret key storage unit 603 stores a secret key for generating second signature data.

1.7.4. Theater ID Storage Unit 604

The theater ID storage unit 604 stores a theater ID of a movie theater. Once stored, the theater ID cannot be changed.

1.7.5. Input Unit 605

The input unit 605 operates as follows.

(A) Authentication of the Memory Card 100

When the memory card 100 is inserted in the e-ticket confirmation device 600*a*, the input unit 605 receives a password for authentication, and outputs the password to the e-ticket confirmation unit 606.

(B) Confirmation of an E-Ticket

The input unit 605 receives a title ID, and outputs the title ID to the e-ticket confirmation unit 606.

1.7.6. E-Ticket Confirmation Unit 606

The e-ticket confirmation unit 606 operates as follows.

(A) Authentication of the Memory Card 100

The e-ticket confirmation unit 606 receives a password for authentication from the input unit 605, and outputs the password to the memory card 100 via the input/output unit 608. When receiving access permission information from the memory card 100, via the input/output unit 608 as an authentication result, the e-ticket confirmation unit 606 outputs the access permission information to the display unit 607. When receiving access prohibition information from the memory card 100, via the input/output unit 608 as an authentication result, the e-ticket confirmation unit 606 outputs the access prohibition information to the display unit 607.

(B) Confirmation of an E-Ticket

The e-ticket confirmation unit 606 receives a title ID from the input unit 605. The e-ticket confirmation unit 606 searches the e-ticket information table T100 in the e-ticket information storage unit 103 in the memory card 100, for a record corresponding to the title ID. If the record does not exist, the e-ticket confirmation unit 606 outputs, to the display unit 607, use prohibition information indicating that the e-ticket cannot be used.

If the record exists, the e-ticket confirmation unit 606 checks whether the theater ID field and the signature data 2 field of the record are blank, to judge whether the e-ticket has not been used.

If the e-ticket has already been used, the e-ticket confirmation unit 606 outputs use prohibition information to the display unit 607. If the e-ticket has not been used, the e-ticket confirmation unit 606 judges whether the e-ticket has expired, based on the expiration date field of the record. If the e-ticket has expired, the e-ticket confirmation unit 606 outputs use prohibition information to the display unit 607. If the e-ticket has not expired, the e-ticket confirmation unit 606 acquires a public key corresponding to a shop ID included in the record, from the issued public key table T600 in the issued public key storage unit 601. The e-ticket confirmation unit 606 verifies first signature data included in the record, using the public key and the title ID and the expiration date included in the record. If the first signature data is invalid, the e-ticket confirmation unit 606 outputs use prohibition information to the display unit 607. If the first signature data is valid, the e-ticket confirmation unit 606 digitally-signs the title ID and the expiration date using the secret key stored in the secret key storage unit 603, to generate second signature data. The e-ticket confirmation unit 606 writes the second signature data and the theater ID stored in the theater ID storage unit 604 respectively to the theater ID field and the signature data 2 field of the record, to renew the e-ticket information table T100. The e-ticket confirmation unit 606 also searches the use incentive management table T610 in the use incentive management information storage unit 602, for a record corresponding to the title ID. The e-ticket confirmation unit 606 writes information included in the record, to the use incentive information table T120 in the use incentive information storage unit 105 in the memory card 100 via the input/output unit 608. The e-ticket confirmation unit 606 obtains audio data of a package trailer corresponding to the audio data 2 field of the record, from the use incentive management information storage unit 602. The e-ticket confirmation unit 606 writes the audio data to the use incentive information storage unit 105 in the memory card 100. Further, the e-ticket confirmation unit 606 acquires a user ID from the user ID storage unit 102 in the memory card 100. The e-ticket confirmation unit 606 generates ticket use information, based on the user ID, the title ID, the theater ID, and a use date. The e-ticket confirmation unit 606 sends the ticket use information to the movie company management device 400 via the send/receive unit 609.

The signature verification here uses an algorithm for verifying the first signature data generated by the digital signature at the time of selling the e-ticket. The ElGamal signature scheme based on a finite field may, for example, be used to generate the second signature data. Since the ElGamal signature scheme based on a finite field is well known, its explanation has been omitted here.

1.7.7. Display Unit 607

The display unit 607 operates as follows. In authentication of the memory card 100, when receiving access permission information, the display unit 607 displays the access permission information. When receiving access prohibition information, the display unit 607 displays the access prohibition information.

In confirmation of an e-ticket, when receiving use prohibition information, the display unit 607 displays the use prohibition information.

Also, when receiving a dividend calculation result, the display unit 607 displays the dividend calculation result to notify an operator of the e-ticket confirmation device 600a.

1.7.8. Input/Output Unit 608

The input/output unit 608 outputs information received from the e-ticket confirmation unit 606, to the memory card 100. Also, the input/output unit 608 outputs information received from the memory card 100, to the e-ticket confirmation unit 606.

1.7.9. Send/Receive Unit 609

The send/receive unit 609 sends information received from the e-ticket confirmation unit 606, to the movie company management device 400. Also, the send/receive unit 609 outputs a dividend calculation result received from the movie company management device 400, to the display unit 607 via the e-ticket confirmation unit 606.

1.8. Construction of the Package Sales Device 700a

Figure 17:
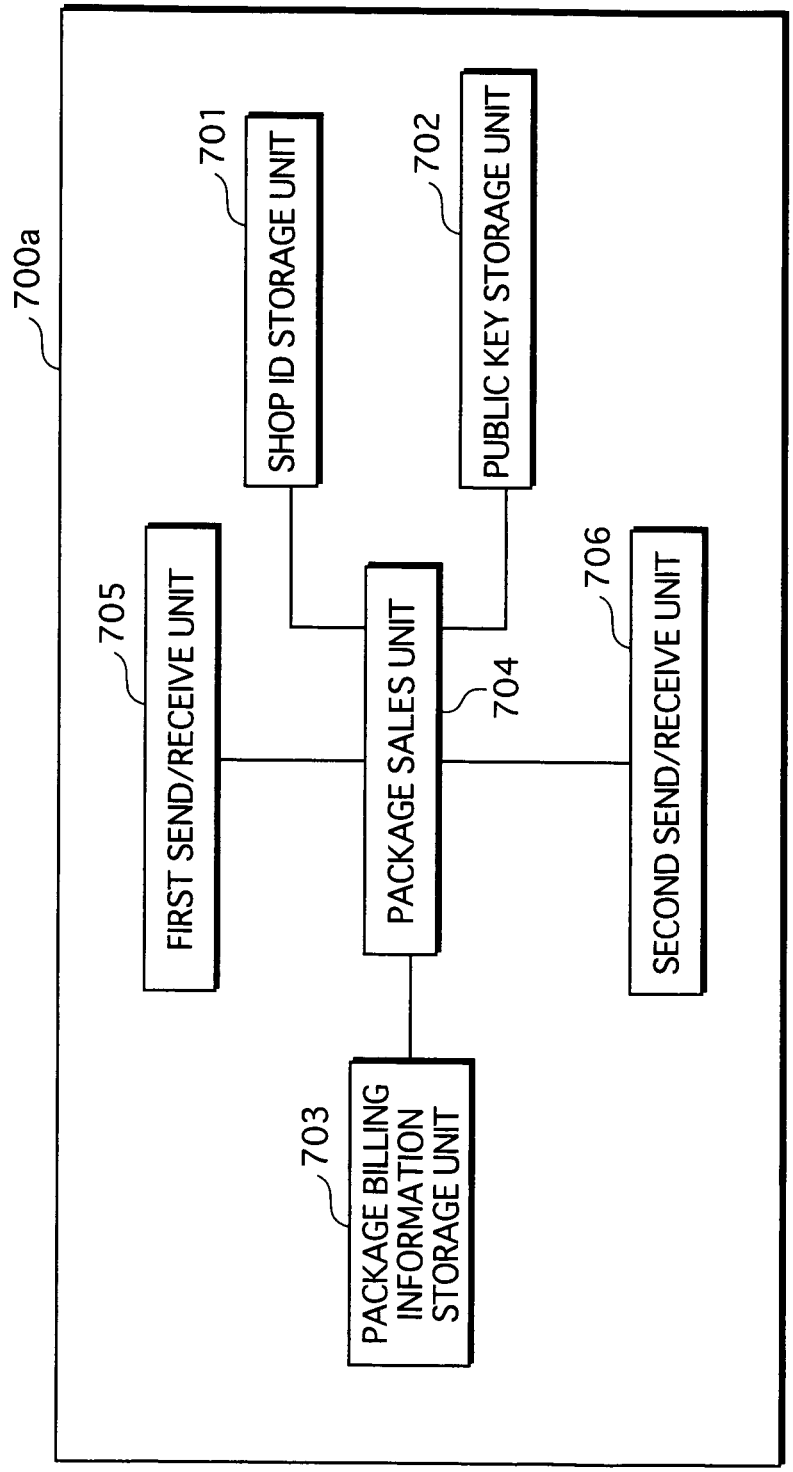
FIG. 17 is a block diagram showing a construction of a package sales device shown in FIG. 1.

FIG. 17 shows a construction of the package sales device 700a.

In the drawing, the package sales device 700a includes a shop ID storage unit 701, a public key storage unit 702, a package billing information storage unit 703, a package sales unit 704, a first send/receive unit 705, and a second send/receive unit 706.

The package sales device 700a is actually realized by a computer system that includes a microprocessor, a ROM, a RAM, a hard disk unit, a display unit, a keyboard, a mouse, and a modem. The functions of the package sales device 700a are realized by the microprocessor executing a computer program stored in the ROM or the hard disk unit.

Upon receipt of a network connection request made from the communication terminal device 200 using an Internet address of the package sales device 700a, the package sales device 700a is connected to the communication terminal device 200 via the Internet.

1.8.1. Shop ID Storage Unit 701

The shop ID storage unit 701 stores a shop ID of a package shop. Once stored, the shop ID cannot be changed.

1.8.2. Public Key Storage Unit 702

Figure 18:
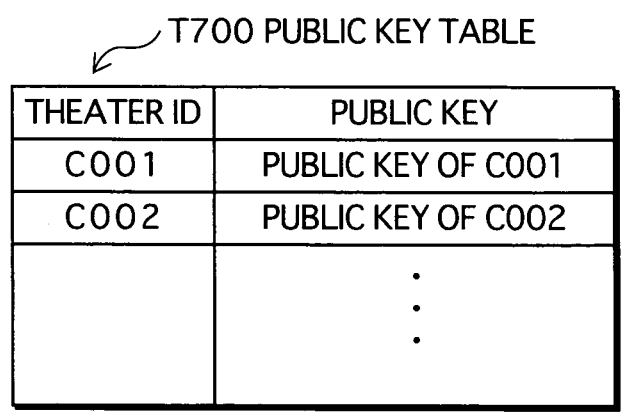
FIG. 18 shows a data structure of a public key table in a public key storage unit shown in FIG. 17.

The public key storage unit 702 has a public key table T700 such as the one shown in FIG. 18.

The public key table T700 has an area for storing at least one record that is made up of a theater ID and a public key.

The theater ID identifies a movie theater.

The public key is a public key given from the movie theater.

1.8.3. Package Billing Information Storage Unit 703

The package billing information storage unit 703 has a package billing table T710 such as the one shown in FIG. 19.

The package billing table T710 has an area for storing at least one record that is made up of: a user ID; a title ID; a selling date 2; a price 2; and a payment method 2.

The user ID identifies a user.

The title ID identifies a movie.

The selling date 2 is a date at which a package was sold.

The price 2 is a selling price of the package.

The payment method 2 is a payment method for the package.

This package billing table T710 is used when making settlement for a predetermined time period during which packages were sold.

1.8.4. Package Sales Unit 704

The package sales unit 704 receives package order information from the communication terminal device 200 via the second send/receive unit 706. The package sales unit 704 checks whether the theater ID field and the second signature data field of the package order information are blank, to judge whether an e-ticket has not been used.

(A) If the E-Ticket has been Used

The package sales unit 704 obtains a public key corresponding to a theater ID included in the package order information, from the public key table T700 in the public key storage unit 702. The package sales unit 704 verifies second signature data included in the package order information, using the public key and a title ID and an expiration date included in the package order information. This signature verification uses an algorithm for verifying the second signature data which is generated by the digital signature at the time of using the e-ticket.

If the second signature data is invalid, the package sales unit 704 generates package purchase prohibition information, and sends the package purchase prohibition information to the communication terminal device 200 via the second send/receive unit 706.

If the second signature data is valid, the package sales unit 704 calculates a selling price of the package based on package discount data included in the package order information. The package sales unit 704 also determines a package type based on exclusive data 2 and additional information included in the package order information. The package sales unit 704 generates package purchase confirmation information, using a user ID and the title ID included in the package order information, the selling price, and the package type. The package sales unit 704 sends the package purchase confirmation information to the communication terminal device 200 via the second send/receive unit 706. The package sales unit 704 also temporarily stores the package purchase confirmation information.

The package sales unit 704 then receives package billing request information or package billing cancel information from the communication terminal device 200 via the second send/receive unit 706.

If the package sales unit 704 receives the package billing request information, the package sales unit 704 obtains the temporarily-stored package purchase confirmation information using the user ID and the title ID included in the package billing request information. The package sales unit 704 generates (i) package billing information which includes the user ID, the title ID, and (ii) the selling price included in the package purchase confirmation information, (iii) a selling date, and (iv) a payment method included in the package billing request information. The package sales unit 704 writes the package billing information to the package billing table T710 in the package billing information storage unit 703. Next, the package sales unit 704 generates package sales information, and sends the package sales information to the movie company management device 400 via the first send/receive unit 705. The package sales unit 704 generates package purchase completion information, and sends the package purchase completion information to the communication terminal device 200 via the second send/receive unit 706. The package sales unit 704 also conducts a procedure following the determination of the package purchase, such as acquirement of a package of the package type included in the package purchase confirmation information and shipping arrangement. The package sales unit 704 then discards the temporarily-stored package purchase confirmation information.

If the package sales unit 704 receives the package billing cancel information, the package sales unit 704 discards the temporarily-stored package purchase confirmation information using the user ID and the title ID included in the package billing cancel information. The package sales unit 704 generates package purchase cancel information, and sends the package purchase cancel information to the communication terminal device 200 via the second send/receive unit 706.

(B) If the E-Ticket has not been Used

The package sales unit 704 calculates a discount of the package corresponding to the case where the e-ticket has not been used (hereafter "ticket-unused case"), based on the package discount data included in the package order information. The package sales unit 704 sets a selling price of the package using the calculated discount. The package sales unit 704 generates package purchase confirmation information, using the user ID and the title ID included in the package order information and the selling price. The package sales unit 704 sends the package purchase confirmation information to the communication terminal device 200 via the second send/receive unit 706. The package sales unit 704 also temporarily stores the package purchase confirmation information.

Following this, the package sales unit 704 receives either package billing request information or package billing cancel information from the communication terminal device 200 via the second send/receive unit 706.

If the package sales unit 704 receives the package billing request information, the package sales unit 704 obtains the temporarily-stored package purchase confirmation information using the user ID and the title ID included in the package billing request information. The package sales unit 704 generates (i) package billing information which includes the user ID, the title ID, and the selling price included in the package purchase confirmation information, (ii) a selling date, and (iii) a payment method included in the package billing request information. The package sales unit 704 writes the package billing information to the package billing table T710 in the package billing information storage unit 703. Next, the package sales unit 704 generates package sales information, and sends the package sales information to the movie company management device 400 via the first send/receive unit 705. The package sales unit 704 also generates package purchase completion information, and sends the package purchase completion information to the communication terminal device 200 via the second send/receive unit 706. The package sales unit 704 further conducts a procedure following the determination of the package purchase, such as acquirement of a package and shipping arrangement. The package sales unit 704 then discards the temporarily-stored package purchase confirmation information.

If the package sales unit 704 receives the package billing cancel information, the package sales unit 704 discards the temporarily-stored package purchase confirmation information using the user ID and the title ID included in the package billing cancel information. Also, the package sales unit 704 generates package purchase cancel information, and sends the package purchase cancel information to the communication terminal device 200 via the second send/receive unit 706.

1.8.5. First Send/Receive Unit 705

The first send/receive unit 705 sends package sales information received from the package sales unit 704, to the movie company management device 400. Also, the first send/receive unit 705 outputs a dividend calculation result received from the movie company management device 400, to a display unit (not illustrated). The display unit displays the dividend calculation result to notify an operator of the package sales device 700a.

1.8.6. Second Send/Receive Unit 706

The second send/receive unit 706 outputs information received from the communication terminal device 200, to the package sales unit 704. Also, the second send/receive unit 706 sends information received from the package sales unit 704, to the communication terminal device 200.

1.9. Overall Procedures of the E-Ticket System 1

Overall procedures of the e-ticket system 1 are explained below.

1.9.1. Overall Procedure of Authentication of the Memory Card 100

Figure 20:
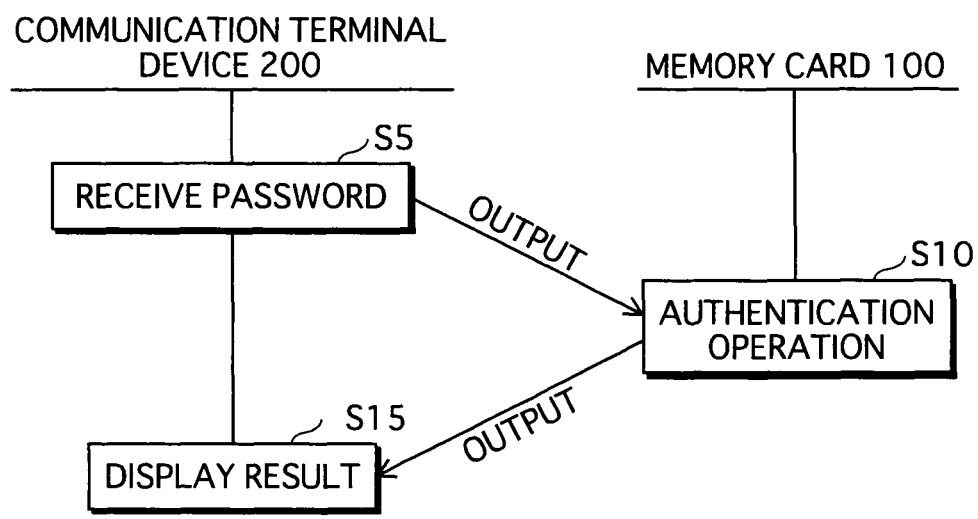
FIG. 20 is a flowchart showing a procedure of authentication of the memory card in the e-ticket system shown in FIG. 1.

FIG. 20 is a flowchart showing an overall procedure of authentication when the memory card 100 is inserted in the communication terminal device 200.

When the memory card 100 is inserted, the communication terminal device 200 receives a password for authentication, and outputs the password to the memory card 100 (S5).

The memory card 100 receives the password and performs an authentication operation. The memory card 100 outputs either access permission information or access prohibition information to the communication terminal device 200 as an authentication result (S10).

The communication terminal device 200 receives the information, and displays it (S15).

The same procedure is carried out when the memory card 100 is inserted in the playback device 300 and the e-ticket confirmation devices 600a, 600b, . . . , 600c.

1.9.2. Overall Procedure of Purchasing an E-Ticket

Figure 21:
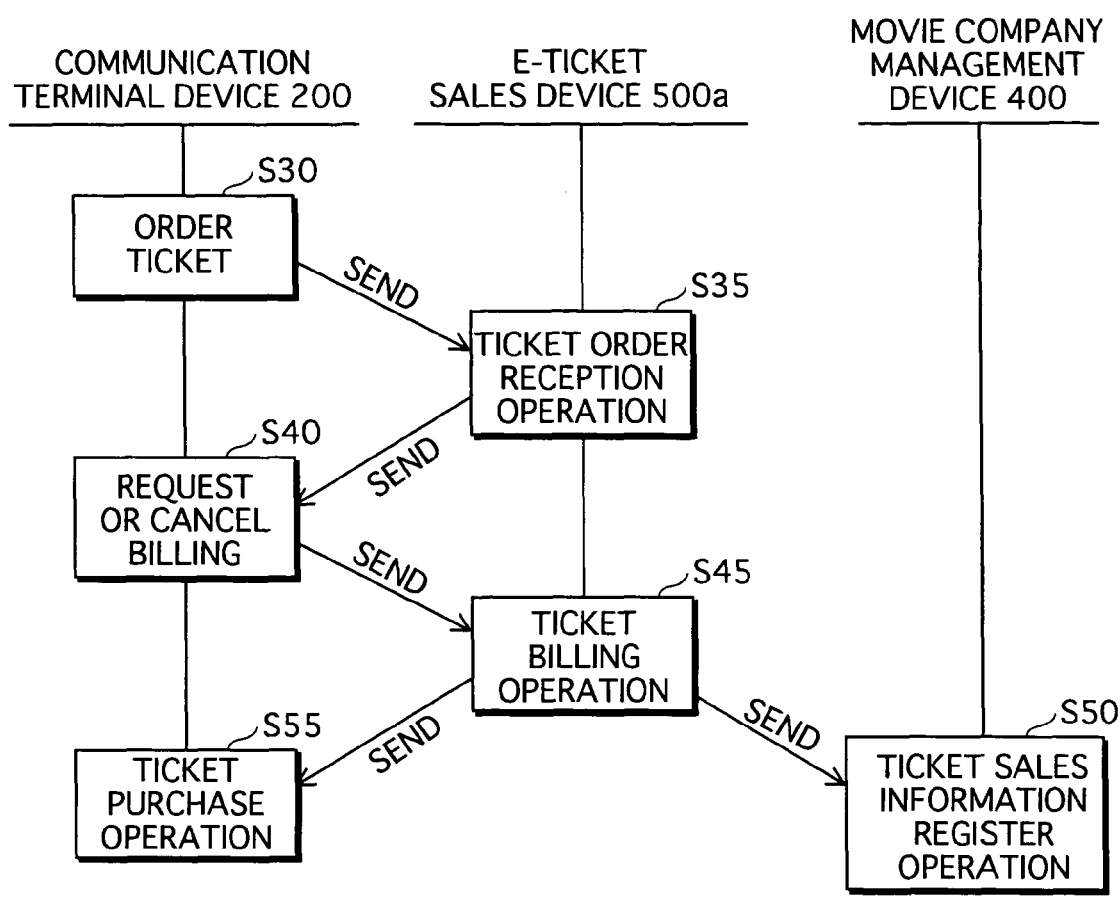
FIG. 21 is a flowchart showing a procedure of purchasing an e-ticket in the e-ticket system shown in FIG. 1.

FIG. 21 is a flowchart showing an overall procedure of purchasing an e-ticket.

The communication terminal device 200 receives a title ID of a movie for which the user wants to purchase an e-ticket. The communication terminal device 200 generates ticket order information, using the title ID and a user ID stored in the user ID storage unit 102 in the memory card 100. The communication terminal device 200 sends the ticket order information to the e-ticket sales device 500a (S30).

The e-ticket sales device 500a performs a ticket order reception operation according to the ticket order information. The e-ticket sales device 500a sends ticket purchase confirmation information generated in the ticket order reception operation, to the communication terminal device 200. The e-ticket sales device 500a also temporarily stores the ticket purchase confirmation information (S35).

The communication terminal device 200 receives the ticket purchase confirmation information, and temporarily stores the ticket purchase confirmation information. The communication terminal device 200 displays a message indicating the receipt of the ticket purchase confirmation information, and receives either ticket payment information or cancel information from the user. If the communication terminal device 200 receives the ticket payment information, the communication terminal device 200 generates ticket billing request information, and sends the ticket billing request information to the e-ticket sales device 500a. If the communication terminal device 200 receives the cancel information, the communication terminal device 200 generates ticket billing cancel information, and sends the ticket billing cancel information to the e-ticket sales device 500a (S40).

The e-ticket sales device 500a performs a ticket billing operation using the information received from the communication terminal device 200. If the e-ticket sales device 500a generates ticket sales information in the ticket billing operation, then the e-ticket sales device 500a sends the ticket sales information to the movie company management device 400. The e-ticket sales device 500a also sends ticket purchase determination information or ticket purchase cancel information generated in the ticket billing operation, to the communication terminal device 200 (S45).

The movie company management device 400 performs a ticket sales information register operation using the ticket sales information (S50).

The communication terminal device 200 performs a ticket purchase operation, using the information received from the e-ticket sales device 500a and the temporarily-stored ticket purchase confirmation information (S55).

1.9.3. Overall Procedure of Confirming an E-Ticket

Figure 22:
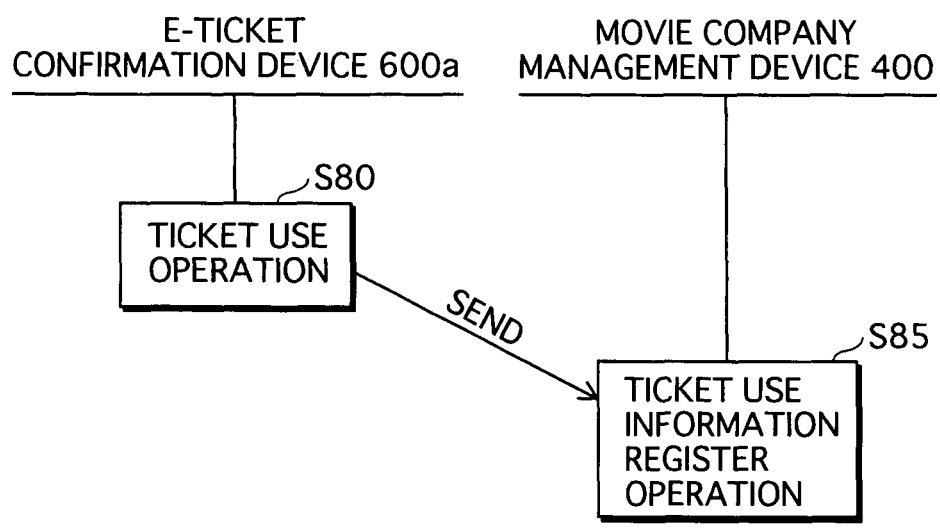
FIG. 22 is a flowchart showing a procedure of confirming an e-ticket in the e-ticket system shown in FIG. 1.

FIG. 22 is a flowchart showing an overall procedure of confirming an e-ticket.

The e-ticket confirmation device 600a receives a title ID, and performs a ticket use operation using the title ID. If ticket use information is generated in the ticket use operation, the e-ticket confirmation device 600a sends the ticket use information to the movie company management device 400 (S80).

The movie company management device 400 performs a ticket use information register operation, using the ticket use information received from the e-ticket confirmation device 600a (S85).

1.9.4. Overall Procedure of Purchasing a Package

Figure 23:
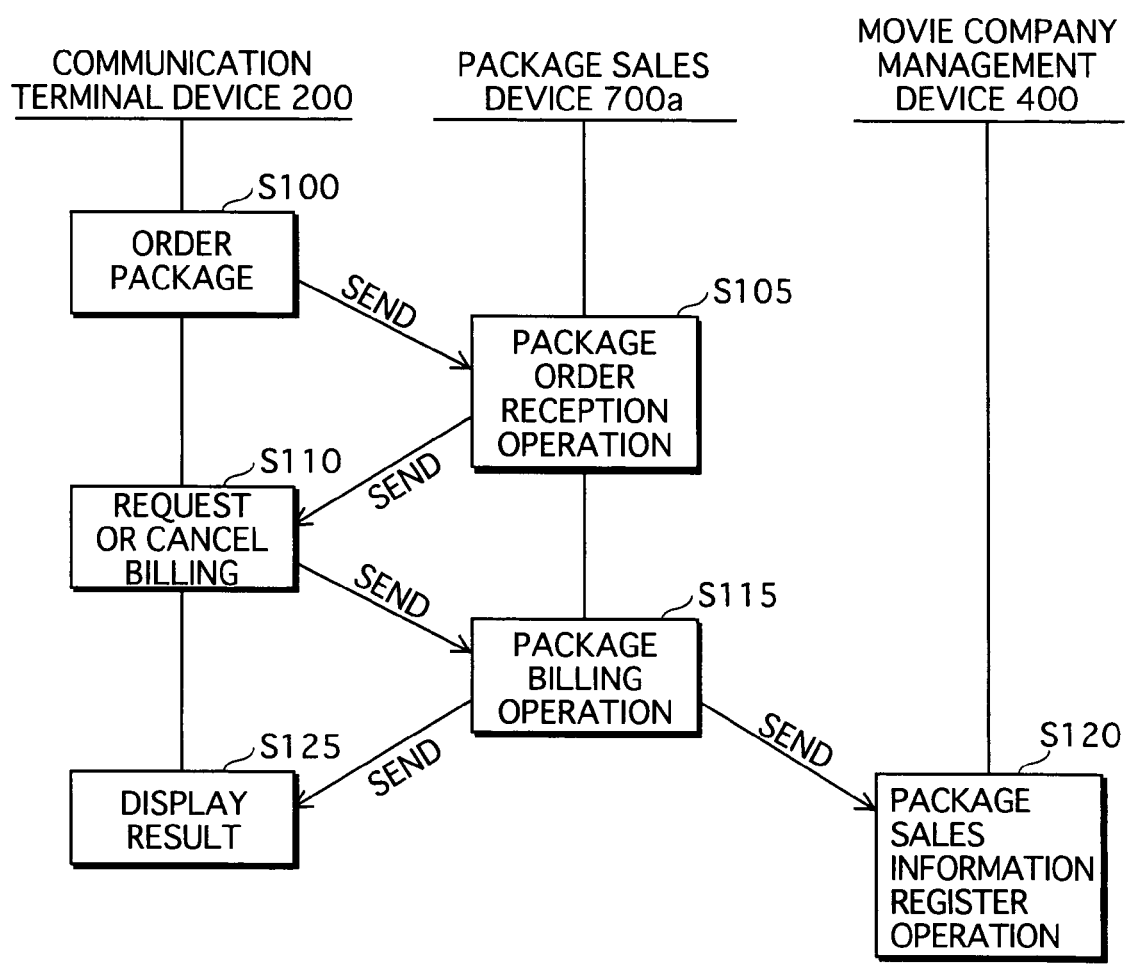
FIG. 23 is a flowchart showing a procedure of purchasing a package in the e-ticket system shown in FIG. 1.

FIG. 23 is a flowchart showing an overall procedure of purchasing a package.

The communication terminal device 200 receives a title ID of a movie for which the user wants to purchase a package. The communication terminal device 200 generates package order information, using the title ID and the user ID stored in the user ID storage unit 102 in the memory card 100. The communication terminal device 200 sends the package order information to the package sales device 700a (S100).

The package sales device 700a performs a package order reception operation using the package order information. If package purchase prohibition information is generated in the package order reception operation, then the package sales device 700a sends the package purchase prohibition information to the communication terminal device 200. If package purchase confirmation information is generated in the package order reception operation, then the package sales device 700a sends the package purchase confirmation information to the communication terminal device 200 and also temporarily stores the package purchase confirmation information (S105).

When receiving the package purchase confirmation information, the communication terminal device 200 displays a message indicating the receipt of the package purchase confirmation information. The communication terminal device 200 then receives either package payment information or cancel information from the user. When receiving the package payment information, the communication terminal device 200 generates package billing request information and sends the package billing request information to the package sales device 700a. When receiving the cancel information, the communication terminal device 200 generates package billing cancel information and sends the package billing cancel information to the package sales device 700a. When receiving the package purchase prohibition information, on the other hand, the communication terminal device 200 displays a message indicating the receipt of the package purchase prohibition information, and ends the procedure (S110).

The package sales device 700a performs a package billing operation based on the information received from the communication terminal device 200. If package sales information is generated in the package billing operation, then the package sales device 700a sends the package sales information to the movie company management device 400. The package sales device 700a also sends package purchase completion information or package purchase cancel information generated in the package billing operation, to the communication terminal device 200 (S115).

The movie company management device 400 performs a package sales information register operation using the package sales information received from the package sales device 700a (S120).

The communication terminal device 200 displays a result using the information received from the package sales device 700a (S125).

1.10. Authentication Operation

Figure 24:
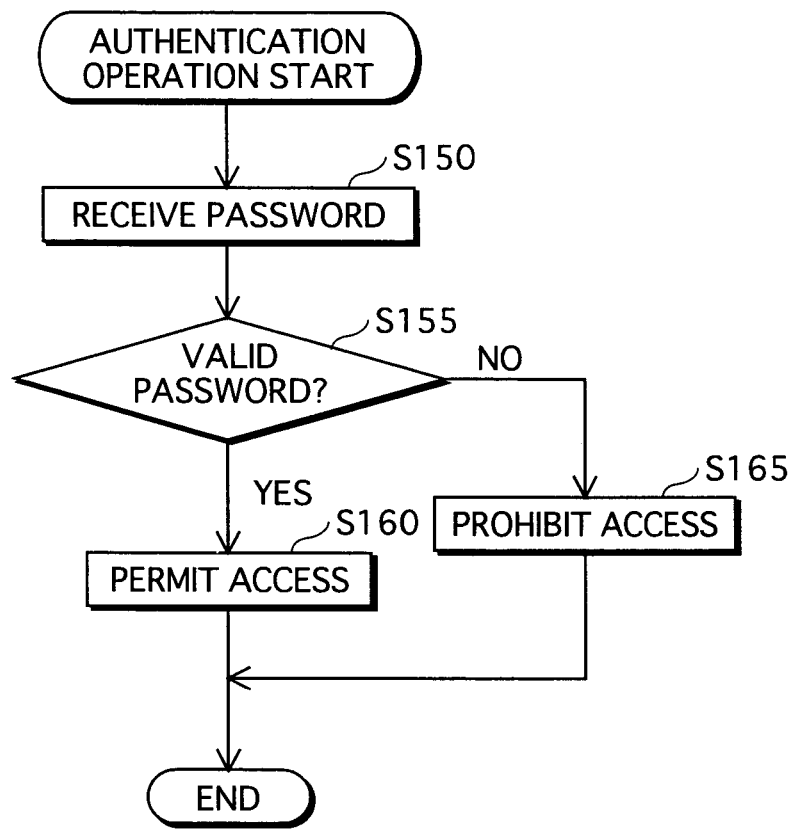
FIG. 24 is a flowchart showing an authentication operation in the e-ticket system shown in FIG. 1.

FIG. 24 is a flowchart showing an authentication operation performed by the memory card 100.

The memory card 100 receives a password (S150). The memory card 100 judges whether the received password matches a password stored beforehand (S155). If the two passwords match, the memory card 100 permits access. The memory card 100 also generates access permission information, and outputs the access permission information to a device in which the memory card 100 is inserted (S160). If the two passwords do not match, the memory card 100 prohibits access. The memory card 100 also generates access prohibition information, and outputs the access prohibition information to the device (S165).

1.11. Ticket Order Reception Operation

Figure 25:
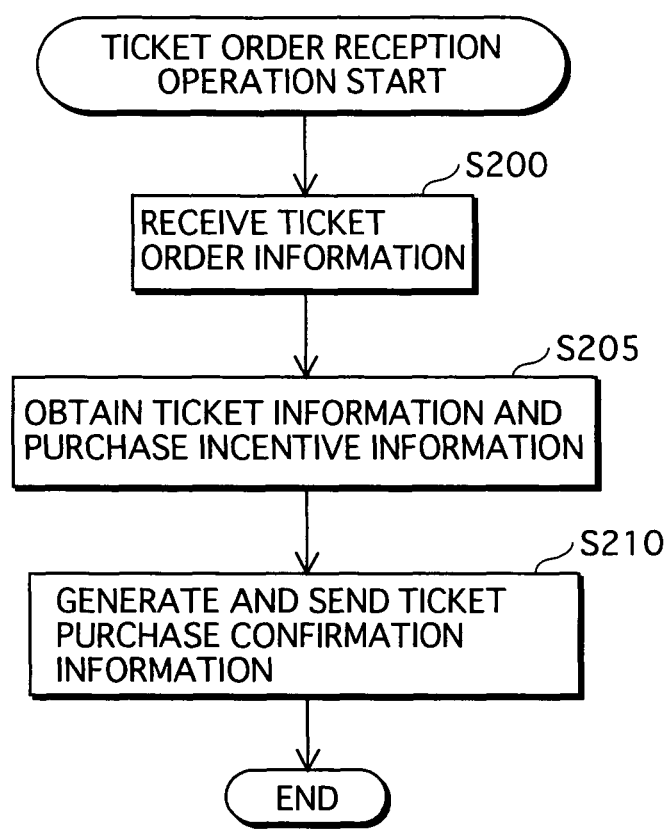
FIG. 25 is a flowchart showing a ticket order reception operation in the e-ticket system shown in FIG. 1.

FIG. 25 is a flowchart showing a ticket order reception operation performed by the e-ticket sales device 500a.

The e-ticket sales device 500a receives ticket order information from the communication terminal device 200 (S200).

The e-ticket sales device 500a obtains a record corresponding to a title ID included in the ticket order information, from the e-ticket management table T510. The e-ticket sales device 500a also obtains a record corresponding to the title ID from the purchase incentive management table T500 (S205).

The e-ticket sales device 500a generates ticket purchase confirmation information using the obtained information. The e-ticket sales device 500a sends the ticket purchase confirmation information to the communication terminal device 200, and also temporarily stores the ticket purchase confirmation information (S210).

1.12. Ticket Billing Operation

Figure 26:
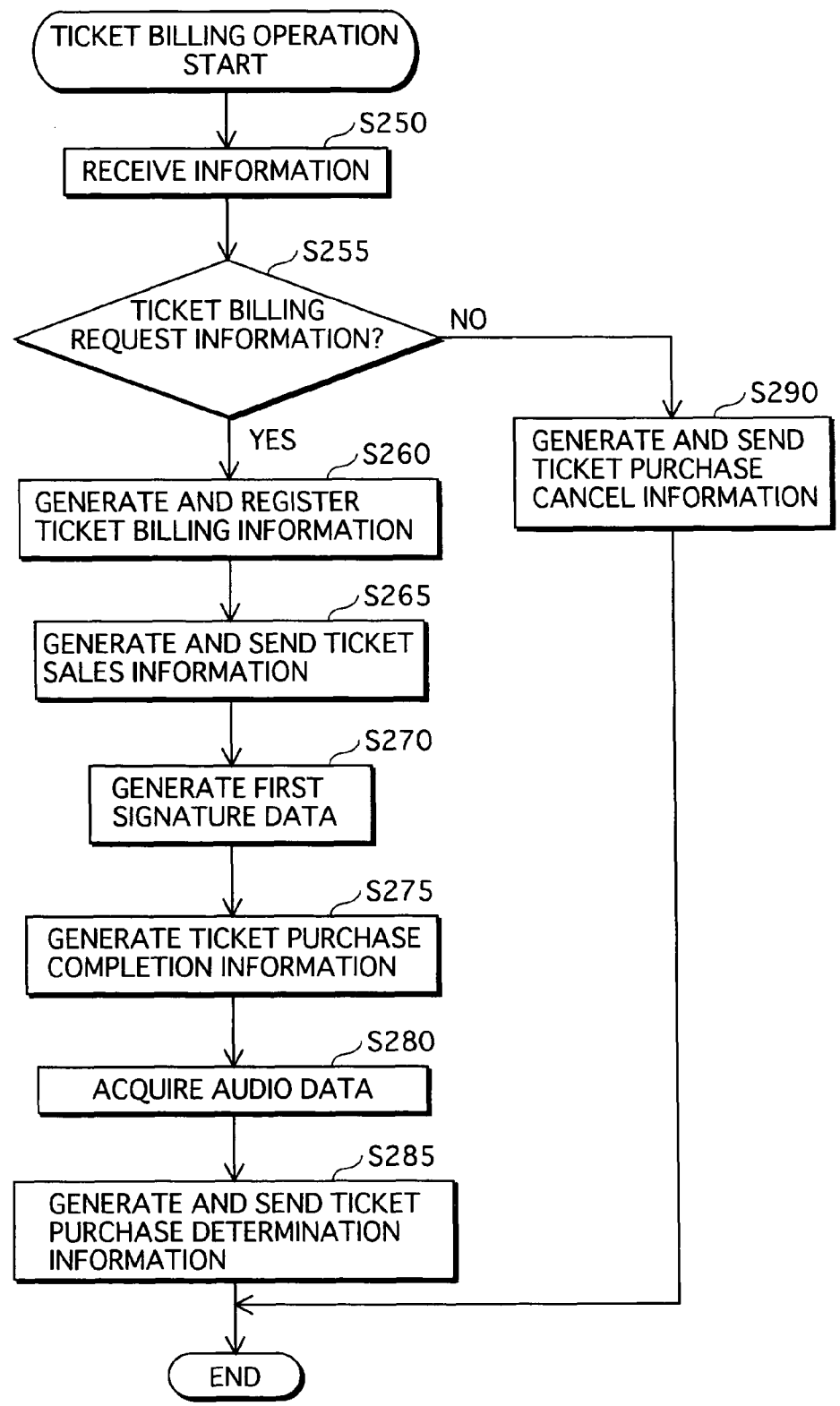
FIG. 26 is a flowchart showing a ticket billing operation in the e-ticket system shown in FIG. 1.

FIG. 26 is a flowchart showing a ticket billing operation performed by the e-ticket sales device 500a.

The e-ticket sales device 500a receives ticket billing request information from the communication terminal device 200 if the user decides to purchase an e-ticket. The e-ticket sales device 500a receives ticket billing cancel information from the communication terminal device 200 if the user decides not to purchase the e-ticket (S250).

The e-ticket sales device 500a judges whether the received information is the ticket billing request information or the ticket billing cancel information (S255).

If the received information is the ticket billing request information, then the e-ticket sales device 500a obtains ticket purchase confirmation information temporarily stored in the ticket order reception operation. The e-ticket sales device 500a generates ticket billing information using the ticket purchase confirmation information and the ticket billing request information, and writes the ticket billing information to the e-ticket billing table T520 (S260). After this, the e-ticket sales device 500a generates ticket sales information, and sends the ticket sales information to the movie company management device 400 (S265). The e-ticket sales device 500a reads a secret key from the issued secret key storage unit 502, and generates first signature data using the secret key. The e-ticket sales device 500a further generates signature data information using the first signature data and a shop ID stored in the shop ID storage unit 501 (S270). The e-ticket sales device 500a also generates ticket purchase completion information (S275). The e-ticket sales device 500a acquires audio data of a movie trailer from the purchase incentive management information storage unit 503 (S280). The e-ticket sales device 500a generates ticket purchase determination information, and sends the ticket purchase determination information to the communication terminal device 200. The e-ticket sales device 500a also discards the temporarily-stored ticket purchase confirmation information (S285).

If the received information is the ticket billing cancel information, then the e-ticket sales device 500a discards the temporarily-stored ticket purchase confirmation information. The e-ticket sales device 500a also generates ticket purchase cancel information, and sends the ticket purchase cancel information to the communication terminal device 200 (S290).

1.13. Ticket Sales Information Register Operation

Figure 27:
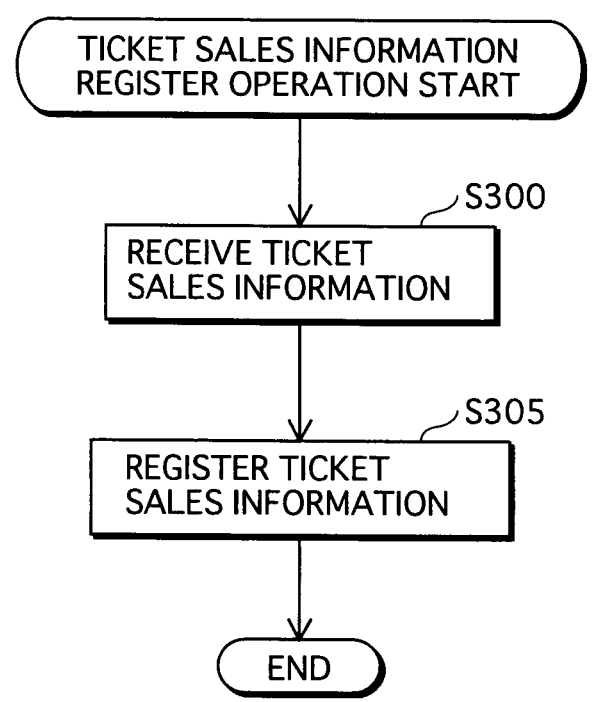
FIG. 27 is a flowchart showing a ticket sales information register operation in the e-ticket system shown in FIG. 1.

FIG. 27 is a flowchart showing a ticket sales information register operation performed by the movie company management device 400.

The movie company management device 400 receives ticket sales information from the e-ticket sales device 500a (S300). The movie company management device 400 writes the ticket sales information to the user management table T400 (S305).

1.14. Ticket Purchase Operation

Figure 28:
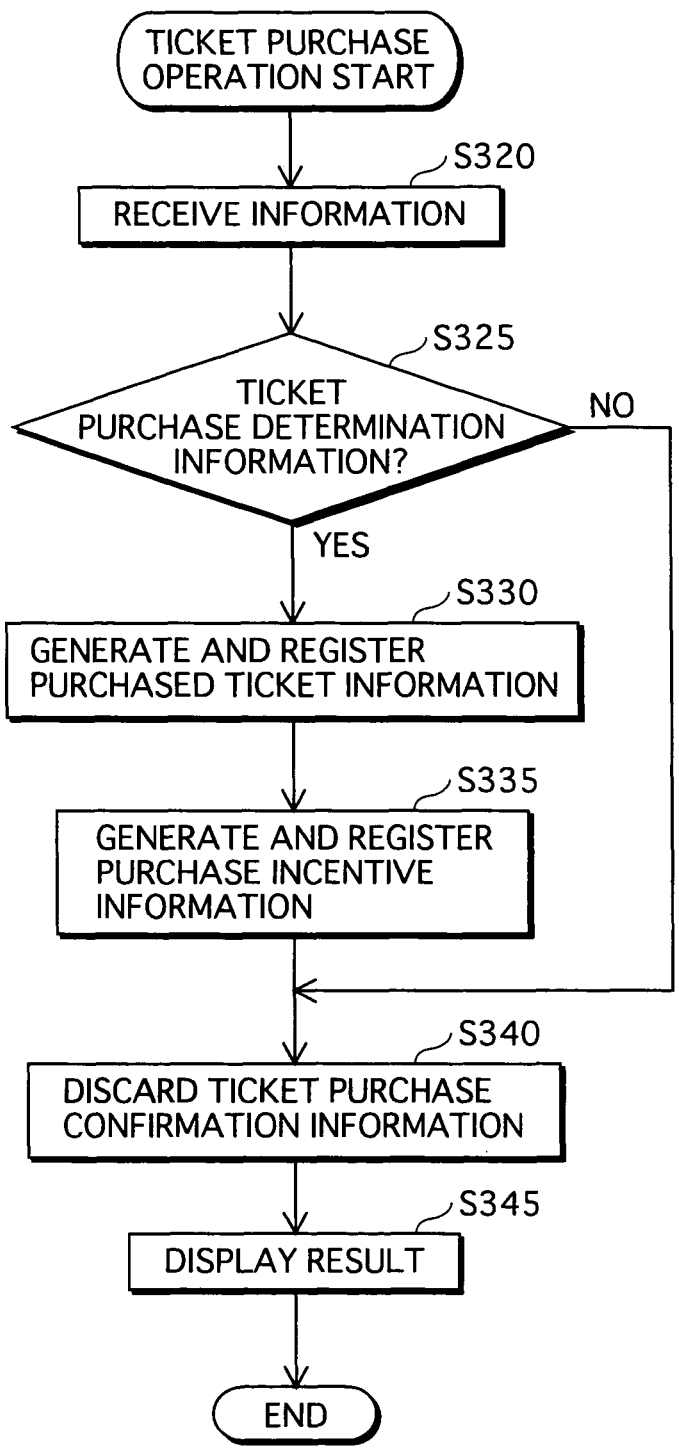
FIG. 28 is a flowchart showing a ticket purchase operation in the e-ticket system shown in FIG. 1.

FIG. 28 is a flowchart showing a ticket purchase operation performed by the communication terminal device 200.

If the communication terminal device 200 sends ticket billing request information to the e-ticket sales device 500a, then the communication terminal device 200 receives ticket purchase determination information in response. If the communication terminal device 200 sends ticket billing cancel information to the e-ticket sales device 500a, then the communication terminal device 200 receives ticket purchase cancel information in response (S320).

The communication terminal device 200 judges whether the received information is the ticket purchase determination information or the ticket purchase cancel information (S325).

If the received information is the ticket purchase determination information, then the communication terminal device 200 generates purchased ticket information, using signature data information included in the ticket purchase determination information and temporarily-stored ticket purchase confirmation information. The communication terminal device 200 writes the purchased ticket information to the e-ticket information table T100 in the memory card 100 (S330). The communication terminal device 200 also generates purchase incentive information using the ticket purchase confirmation information, and writes the purchase incentive information to the purchase incentive information table T110 in the memory card 100. The communication terminal device 200 writes audio data of a movie trailer included in the ticket purchase determination information, to the purchase incentive information storage unit 104 (S335). The communication terminal device 200 then discards the temporarily-stored ticket purchase confirmation information (S340), and displays a result using ticket purchase completion information included in the ticket purchase determination information (S345).

If the received information is the ticket purchase cancel information, then the communication terminal device 200 discards the temporarily-stored ticket purchase confirmation information (S340), and displays a result using the ticket purchase cancel information (S345).

1.15. Ticket Use Operation

Figure 29:
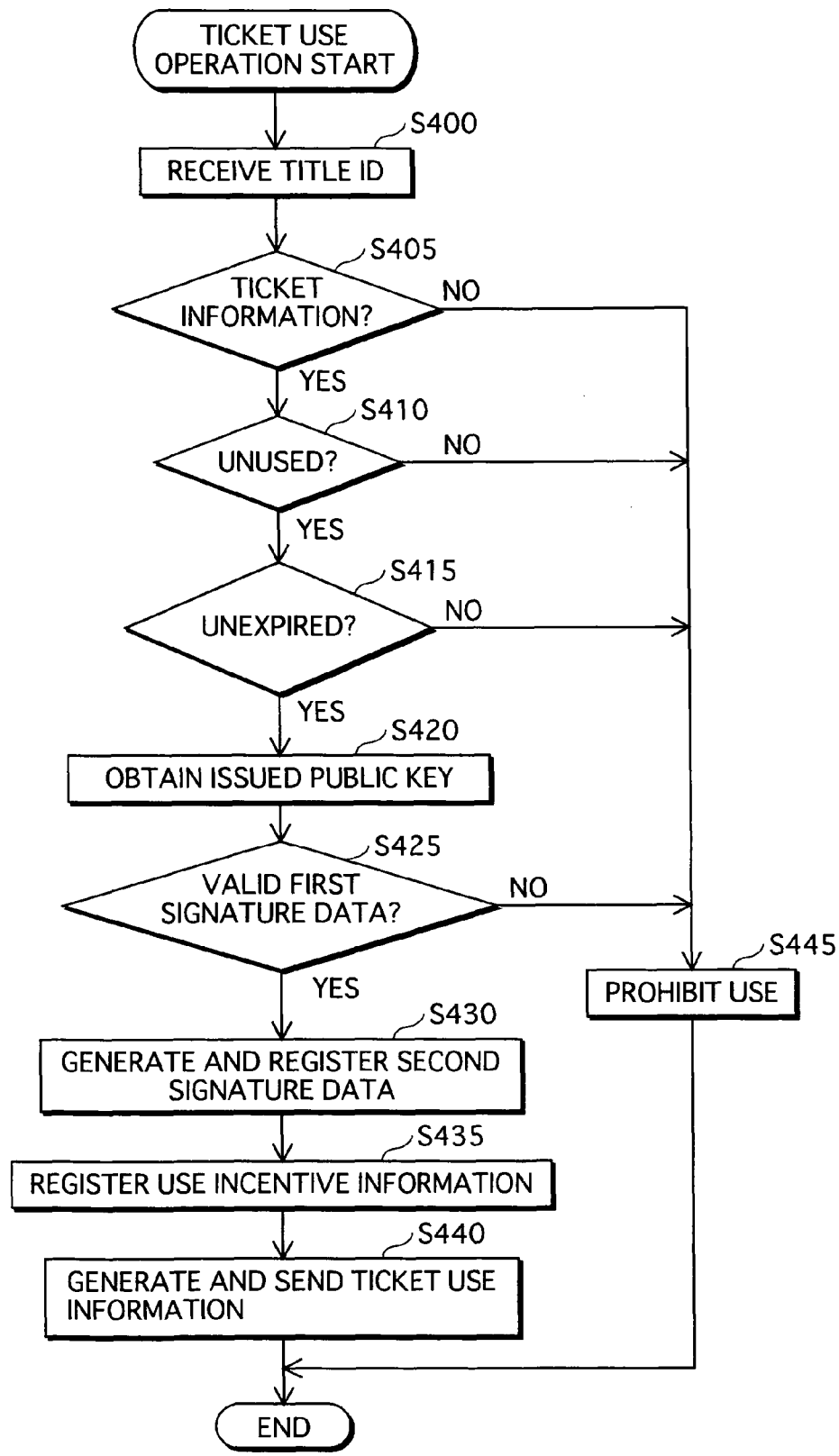
FIG. 29 is a flowchart showing a ticket use operation in the e-ticket system shown in FIG. 1.

FIG. 29 is a flowchart showing a ticket use operation performed by the e-ticket confirmation device 600a.

The e-ticket confirmation device 600a receives a title ID in the input unit 605 (S400).

The e-ticket confirmation device 600a searches the e-ticket information table T100 in the memory card 100 for a record corresponding to the title ID (S405).

If the record does not exist, then the e-ticket confirmation device 600a generates use prohibition information, and displays the use prohibition information (S445). If the record exists, then the e-ticket confirmation device 600a checks whether the theater ID field and the signature data 2 field of the record are blank, to judge whether an e-ticket has not been used (S410).

If the e-ticket has already been used, then the e-ticket confirmation device 600a generates and displays use prohibition information (S445). If the e-ticket has not been used, then the e-ticket confirmation device 600a judges whether the e-ticket has expired based on an expiration date included in the record (S415).

If the e-ticket has expired, then the e-ticket confirmation device 600a generates and displays use prohibition information (S445). If the e-ticket has not expired, then the e-ticket confirmation device 600a obtains a public key corresponding to a shop ID included in the record, from the issued public key storage unit 601 (S420). The e-ticket confirmation device 600*a* verifies first signature data included in the record, using the public key and the title ID and the expiration date included in the record (S425). If the first signature data is invalid, then the e-ticket confirmation device 600*a* generates and displays use prohibition information (S445). If the first signature data is valid, then the e-ticket confirmation device 600*a* generates second signature data. The e-ticket confirmation device 600*a* write a theater ID stored in the theater ID storage unit 604 and the second signature data respectively to the theater ID field and the signature data 2 field of the record, to renew the e-ticket information table T100 (S430). The e-ticket confirmation device 600*a* then reads a record corresponding to the title ID from the use incentive management table T610, and generates use incentive information. The e-ticket confirmation device 600*a* writes the use incentive information to the use incentive information table T120 in the memory card 100. The e-ticket confirmation device 600*a* also obtains audio data of a package trailer corresponding to an audio data name included in the use incentive information, from the use incentive management information storage unit 602. The e-ticket confirmation device 600*a* writes the audio data to the use incentive information storage unit 105 in the memory card 100 (S435). The e-ticket confirmation device 600*a* further generates ticket use information, and sends the ticket use information to the movie company management device 400 (S440).

1.16. Ticket Use Information Register Operation

Figure 30:
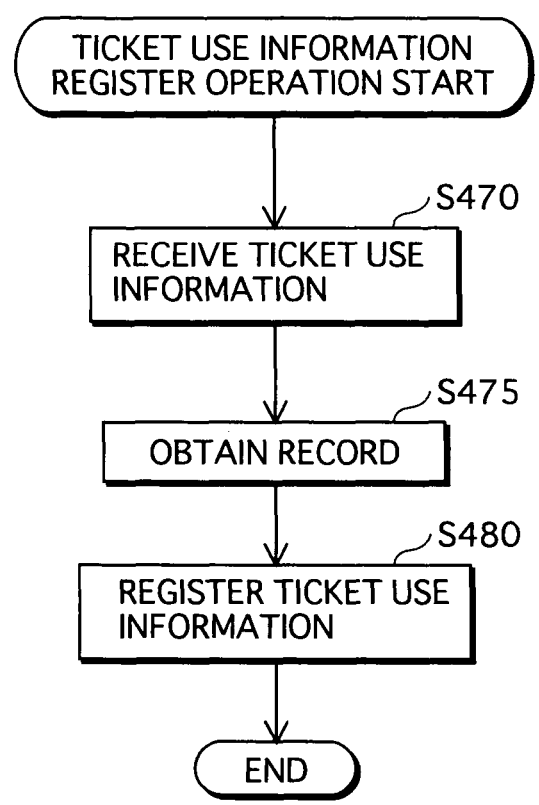
FIG. 30 is a flowchart showing a use information register operation in the e-ticket system shown in FIG. 1.

FIG. 30 is a flowchart showing a ticket use information register operation performed by the movie company management device 400.

The movie company management device 400 receives ticket use information from the e-ticket confirmation device 600*a* (S470).

The movie company management device 400 searches the user management table T400 for a record corresponding to a user ID and a title ID included in the ticket use information (S475).

The movie company management device 400 writes a theater ID and a use date included in the ticket use information to the ticket use information field of the record, to renew the user management table T400 (S480).

1.17. Package Order Reception Operation

Figure 31:
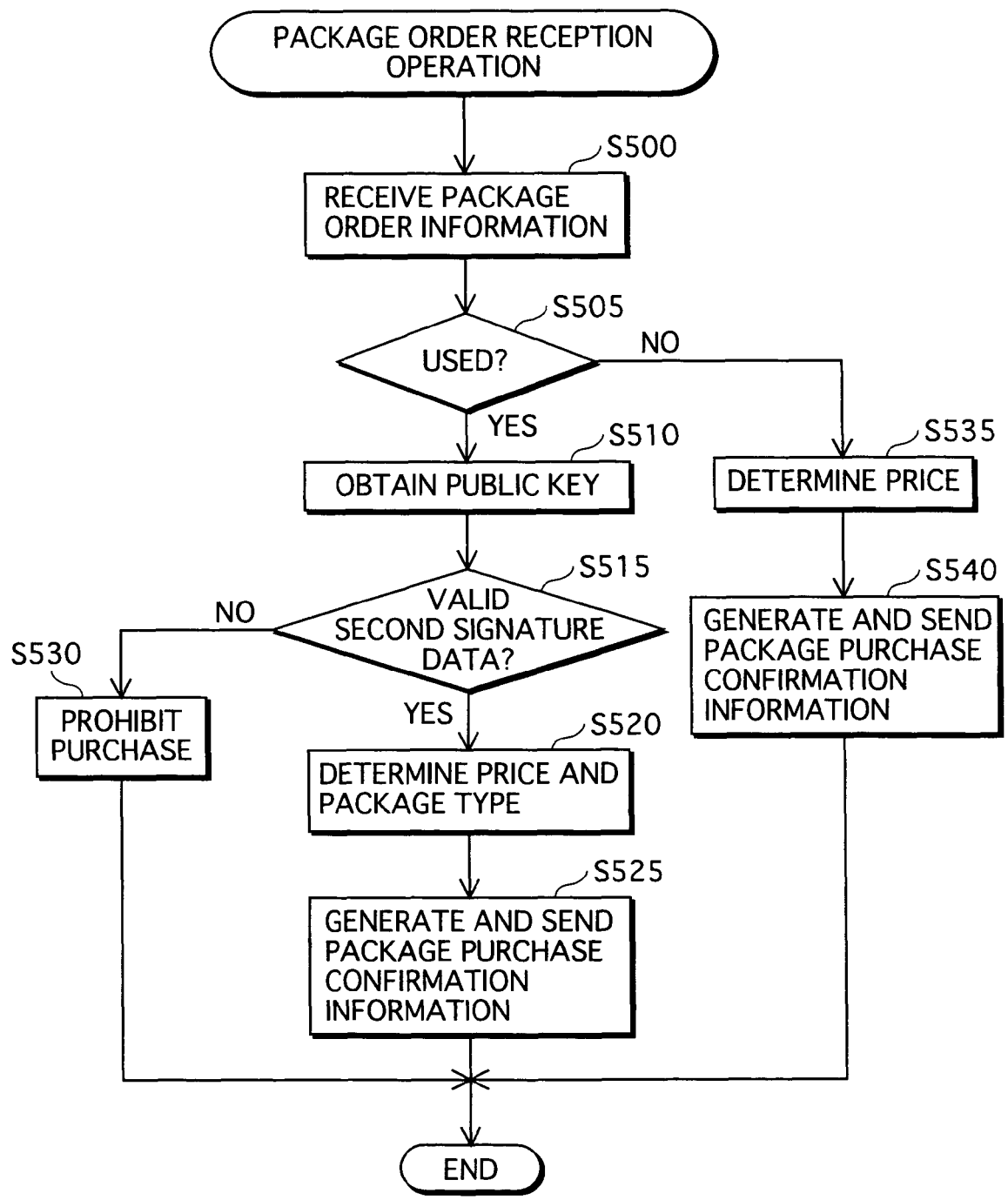
FIG. 31 is a flowchart showing a package order reception operation in the e-ticket system shown in FIG. 1.

FIG. 31 is a flowchart showing a package order reception operation performed by the package sales device 700*a*.

The package sales device 700*a* receives package order information from the communication terminal device 200 (S500).

The package sales device 700*a* checks whether the theater ID field and the signature data 2 field of the package order information are blank, for judging whether an e-ticket has not been used (S505).

If the e-ticket was used, the package sales device 700*a* obtains a public key corresponding to a theater ID included in the package order information, from the public key table T700 (S510). The package sales device 700*a* verifies second signature data included in the package order information, using the public key and a title ID and an expiration date included in the package order information (S515). If the second signature data is valid, then the package sales device 700*a* determines a selling price and a package type based on the package order information (S520). The package sales device 700*a* then generates package purchase confirmation information, and sends the package purchase confirmation information to the communication terminal device 200. The package sales device 700*a* also temporarily stores the package purchase confirmation information (S525). If the second signature data is invalid, then the package sales device 700*a* generates purchase prohibition information, and sends the purchase prohibition information to the communication terminal device 200 (S530).

If the e-ticket has not been used, then the package sales device 700*a* determines a selling price corresponding to the ticket-unused case, based on the package order information (S535). The package sales device 700*a* then generates package purchase confirmation information, and sends the package purchase confirmation information to the communication terminal device 200. The package sales device 700*a* also temporarily stores the package purchase confirmation information (S540).

1.18. Package Billing Operation

Figure 32:
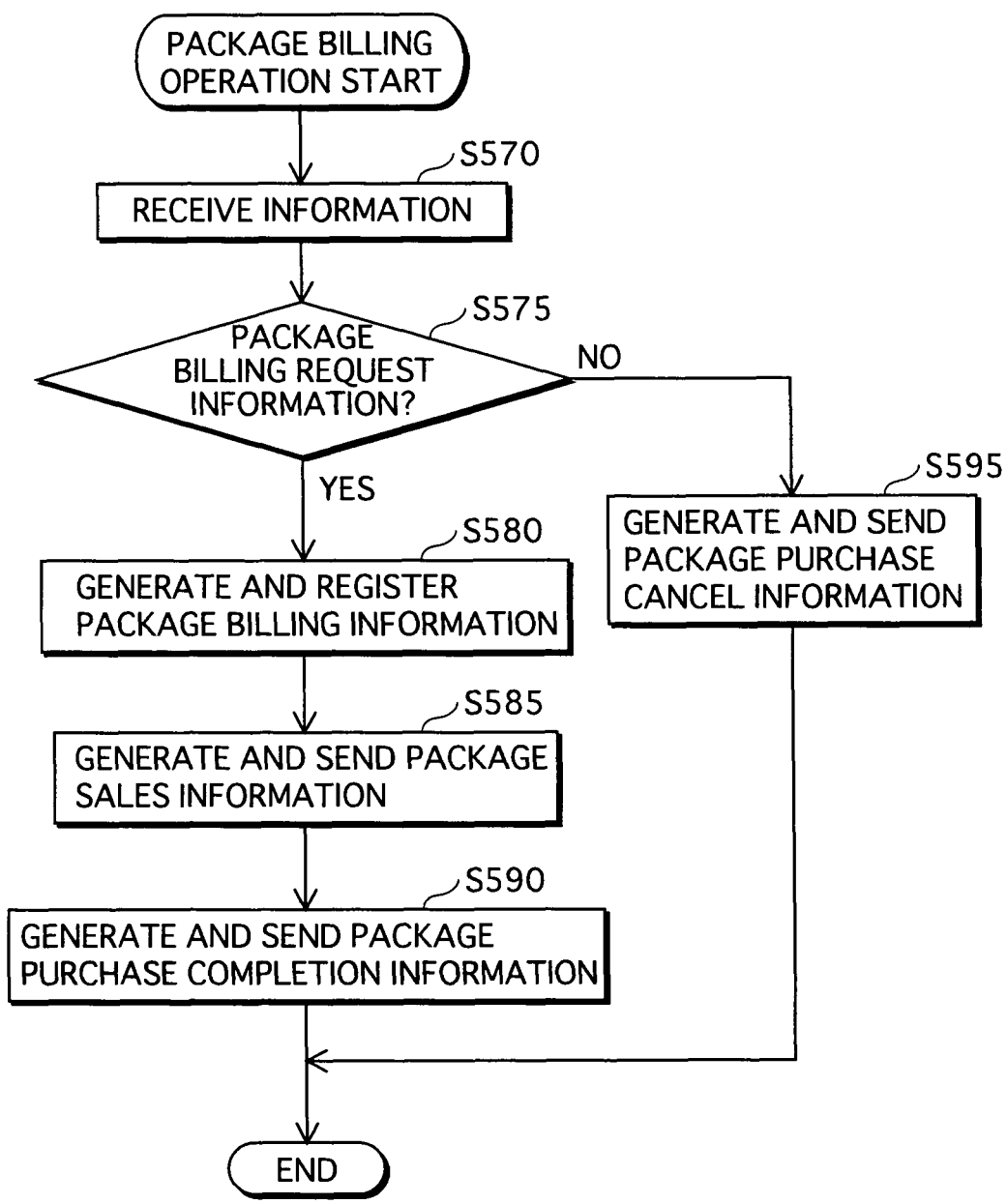
FIG. 32 is a flowchart showing a package billing operation in the e-ticket system shown in FIG. 1.

FIG. 32 is a flowchart showing a package billing operation performed by the package sales device 700*a*.

The package sales device 700*a* receives package billing request information from the communication terminal device 200 if the user decides to purchase a package. The package sales device 700*a* receives package billing cancel information from the communication terminal device 200 if the user decides not to purchase the package (S570).

The package sales device 700*a* judges whether the received information is the package billing request information or the package billing cancel information (S575).

If the received information is the package billing request information, then the package sales device 700*a* obtains package purchase confirmation information temporarily stored in a package order reception operation. The package sales device 700*a* generates package billing information using the package purchase confirmation information and the package billing request information, and writes the package billing information to the package billing table T710 (S580). The package sales device 700*a* also generates package sales information, and sends the package sales information to the movie company management device 400 (S585). The package sales device 700*a* further generates package purchase completion information, and sends the package purchase completion information to the communication terminal device 200. The package sales device 700*a* discards the temporarily-stored package purchase confirmation information (S590).

If the received information is the package billing cancel information, then the package sales device 700*a* discards the temporarily-stored package purchase confirmation information. The package sales device 700*a* generates package purchase cancel information, and sends the package purchase cancel information to the communication terminal device 200 (S595).

1.19. Package Sales Information Register Operation

Figure 33:
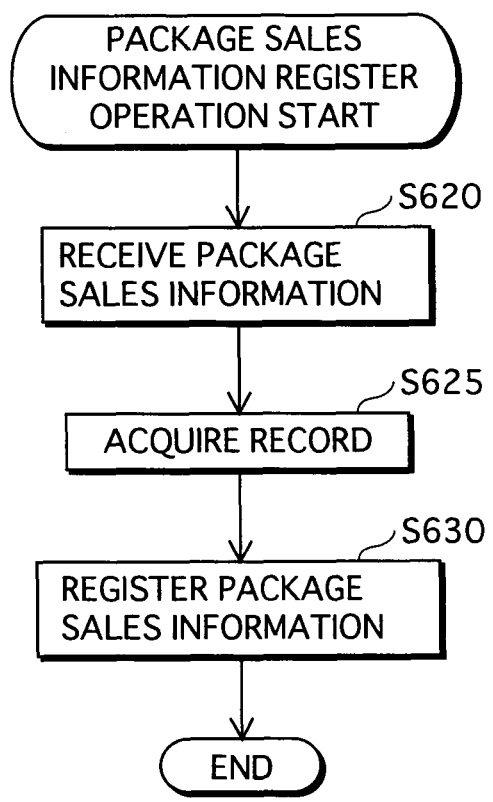
FIG. 33 is a flowchart showing a package sales information register operation in the e-ticket system shown in FIG. 1.

FIG. 33 is a flowchart showing a package sales information register operation performed by the movie company management device 400.

The movie company management device 400 receives package sales information from the package sales device 700*a* (S620).

The movie company management device 400 searches the user management table T400 for a record corresponding to a user ID and a title ID included in the package sales information (S625).

The movie company management device 400 writes a shop ID and a selling date included in the package sales information to the package purchase information field of the record, to renew the user management table T400 (S630).

1.20. Playback Operation

Figure 34:
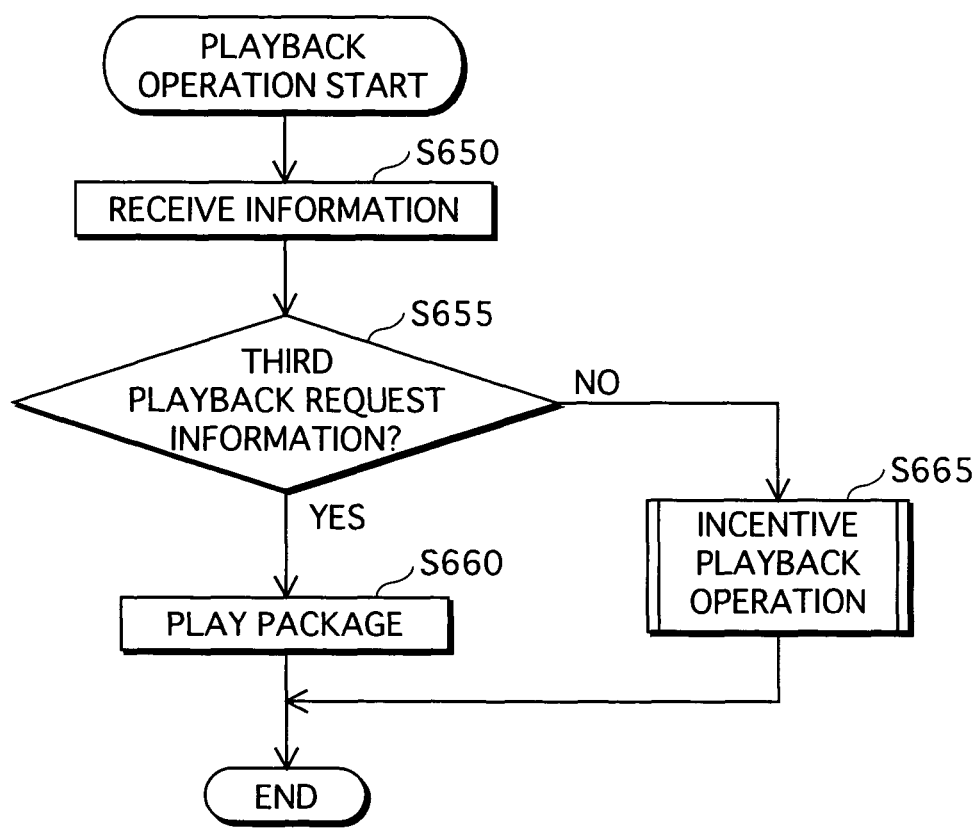
FIG. 34 is a flowchart showing a playback operation in the e-ticket system shown in FIG. 1.

FIG. 34 is a flowchart showing a playback operation performed by the playback device 300.

The playback device 300 receives first playback request information if the user wants to play back a movie trailer. The playback device 300 receives second playback request information if the user wants to play back a package trailer. The playback device 300 receives third playback request information if the user wants to play back a package (S650).

The playback device 300 judges whether the received information is the third playback request information (S655). If so, the playback device 300 reads audio data and video data from a package inserted in the playback device 300, via the second access unit 305, and plays back the audio data and the video data (S660). Otherwise, the playback device 300 performs an incentive playback operation (S665).

1.21. Incentive Playback Operation

Figure 35:
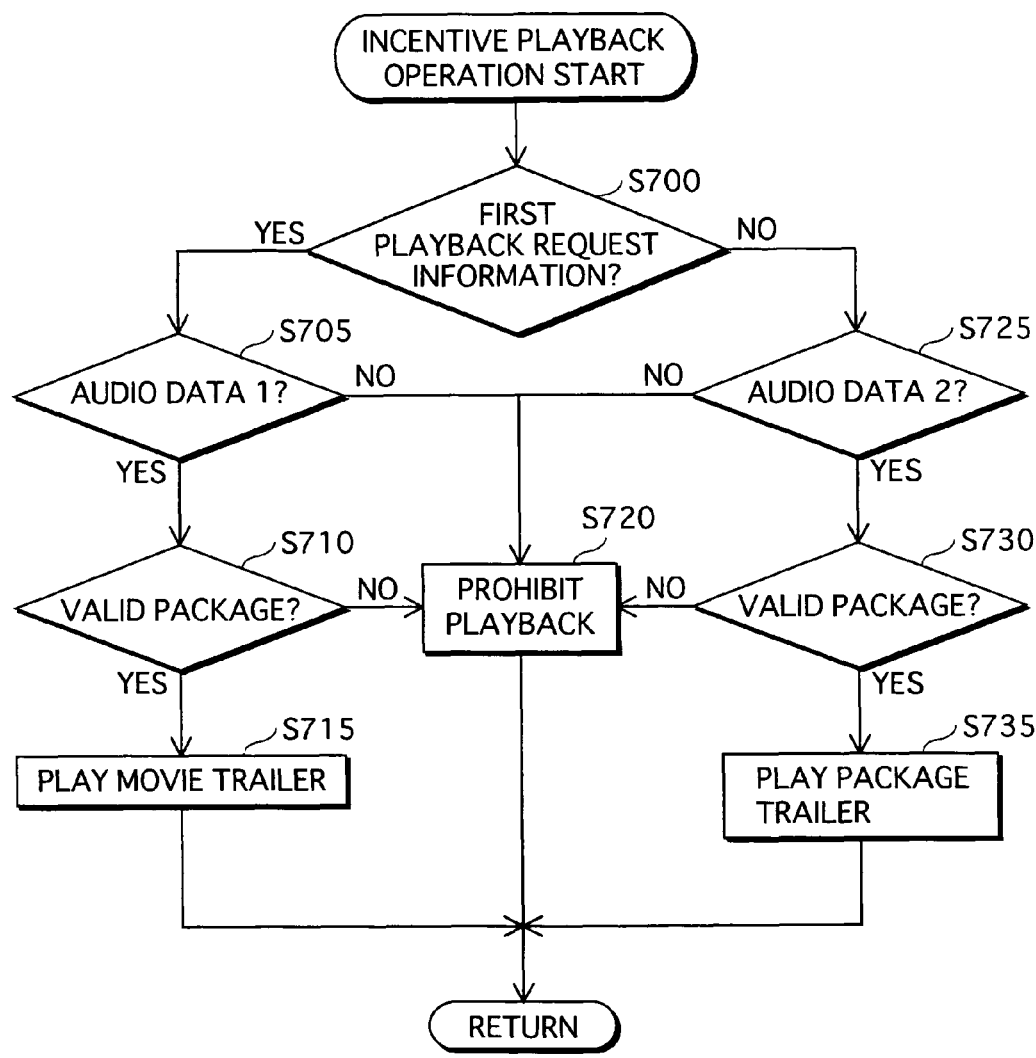
FIG. 35 is a flowchart showing an incentive playback operation in the e-ticket system shown in FIG. 1.

FIG. 35 is a flowchart showing an incentive playback operation performed by the playback device 300.

The playback device 300 judges whether the received information is the first playback request information or the second playback request information (S700).

If the received information is the first playback request information, then the playback device 300 searches the purchase incentive information table T110 in the purchase incentive information storage unit 104 in the memory card, for an audio data name of a movie trailer corresponding to a title ID included in the first playback request information (S705).

If the audio data name does not exist, then the playback device 300 generates playback prohibition information and outputs the playback prohibition information to the display device to which it is connected (S720). If the audio data name exists, then the playback device 300 judges whether the title ID in the first playback request information matches a title ID in a package inserted in the playback device 300 (S710). If they do not match, then the playback device 300 generates playback prohibition information and outputs the playback prohibition information to the display device (S720). If they match, then the playback device 300 reads audio data of the movie trailer corresponding to the audio data name, from the memory card 100 via the first access unit 304. The playback device 300 also reads video data of the movie trailer from the package via the second access unit 305. The playback device 300 plays back the audio data and the video data in sync with each other (S715).

If the received information is the second playback request information, then the playback device 300 searches the use incentive information table T120 in the use incentive information storage unit 105 in the memory card 100, for an audio data name of a package trailer corresponding to a title ID included in the second playback request information (S725).

If the audio data name does not exist, then the playback device 300 generates playback prohibition information and outputs the playback prohibition information to the display device (S720). If the audio data name exists, then the playback device 300 judges whether the title ID in the second playback request information matches a title ID in a package inserted in the playback device 300 (S730). If they do not match, the playback device 300 generates playback prohibition information and outputs the playback prohibition information to the display device (S720). If they match, the playback device 300 reads audio data of the package trailer corresponding to the audio data name, from the memory card 100 via the first access unit 304. The playback device 300 also reads video data of the package trailer from the package via the second access unit 305.

The playback device 300 plays back the audio data and the video data in sync with each other (S735).

1.22. Conclusion

As explained above, the e-ticket system of this embodiment offers incentives such as a discount to a person who wants to purchase a package, on the condition that he or she purchased and used an e-ticket. This encourages the person to purchase and use the e-ticket, and then purchase the package. Conversely, a person who purchased and used an e-ticket can get a discount on a package. This encourages the person to purchase the package. Such a system benefits both e-ticket sales and package sales.

Also, with the provision of the purchase incentive management information storage unit and the use incentive management information storage unit, various types of incentives can be provided to users.

Also, a digital signature is applied both when purchasing an e-ticket and when using the e-ticket. When using the e-ticket, a digital signature made when purchasing the e-ticket is verified to authenticate the e-ticket. When purchasing a package, a digital signature made when using the e-ticket is verified to authenticate the use of the e-ticket. This enhances security.

Also, customer information is sent to the movie company management device when an e-ticket is purchased, when the e-ticket is used, and when a package is purchased. This enables the movie company to keep track of user behavior.

Also, by employing e-tickets, a ticket sales company can widen ticket sales. Further, the provision of a dividend according to ticket sales helps increase the company's eagerness to sell.

Also, by employing e-tickets, a movie theater can collectively manage admission fees, which eases the work of the movie theater. Further, the provision of a dividend according to ticket collection helps increase the theater's eagerness to promote.

Also, by employing e-tickets, a package sales company can dominate package sales to users of e-tickets. Further, the provision of a dividend according to package sales helps increase the company's eagerness to sell.

Thus, the e-ticket system generates a synergistic effect of benefiting consumers and expanding e-ticket sales.

2. Second Embodiment

The following describes an e-ticket system 2 which is the second embodiment of the present invention, by referring to drawings. The following description will mainly focus on the differences from the first embodiment.

2.1. Construction of the E-Ticket System 2

Figure 36:
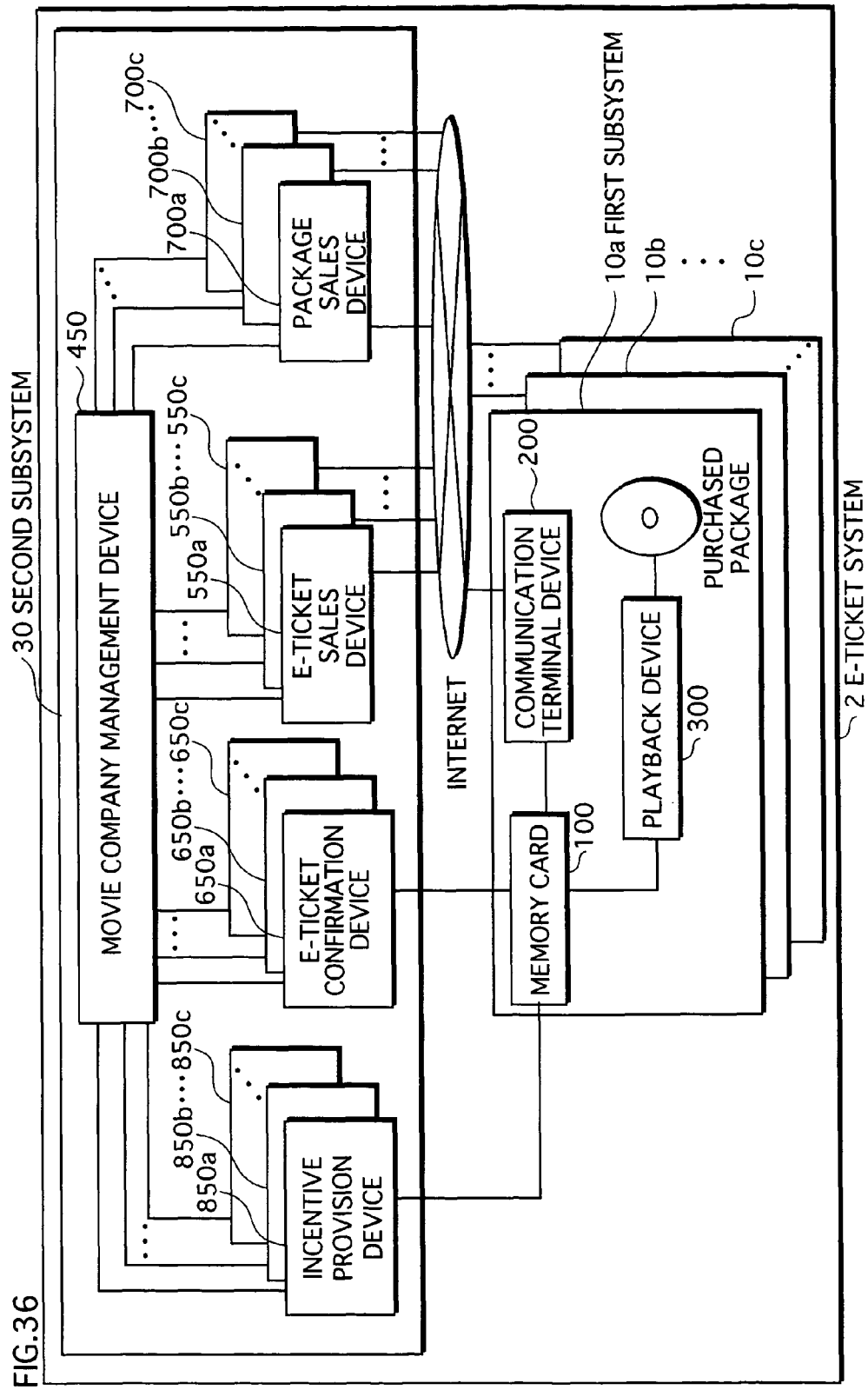
FIG. 36 is a block diagram showing a construction of an e-ticket system to which the second embodiment of the invention relates.

FIG. 36 shows a construction of the e-ticket system 2.

In the drawing, the e-ticket system 2 is roughly made up of the first subsystems 10a, 10b, . . . , 10c and a second subsystem 30. Since the first subsystems 10a, 10b, . . . , 10c are the same as those in the first embodiment, their explanation has been omitted here. The second subsystem 30 includes a movie company management device 450, e-ticket sales devices 550a, 550b, . . . , 550c, e-ticket confirmation devices 650a, 650b, . . . , 650c, the package sales devices 700a, 700b, . . . , 700c, and incentive provision devices 850a, 850b, . . . , 850c.

The e-ticket sales devices 550a, 550b, . . . , 550c and the package sales devices 700a, 700b, . . . , 700c are associated with Internet addresses, to enable the communication terminal device 200 to connect to them via the Internet. To purchase an e-ticket, the communication terminal device 200 connects to one of the e-ticket sales devices 550a, 550b, . . . , 550c, via the Internet, using an Internet address of that e-ticket sales device. To purchase a package, the communication terminal device 200 connects to one of the package sales devices 700*a*, 700*b*, . . . , 700*c*, via the Internet, using an Internet address of that package sales device. The movie company management device 450 is network-connected to the e-ticket sales devices 550*a*, 550*b*, . . . , 550*c*, the e-ticket confirmation devices 650*a*, 650*b*, . . . , 650*c*, the package sales devices 700*a*, 700*b*, . . . , 700*c*, and the incentive provision devices 850*a*, 850*b*, . . . , 850*c*, via dedicated lines. The movie company management device 450 receives information about users from the e-ticket sales devices 550*a*, 550*b*, . . . , 550*c*, the e-ticket confirmation devices 650*a*, 650*b*, . . . , 650*c*, the package sales devices 700*a*, 700*b*, . . . , 700*c*, and the incentive provision devices 850*a*, 850*b*, . . . , 850*c*, and manages the received information.

The e-ticket sales device 550*a* is managed by a movie company or a ticket sales company. The e-ticket sales device 550*a* receives information about an order for an e-ticket from the communication terminal device 200 via the Internet. The e-ticket sales device 550*a* issues the e-ticket based on the received information, and sends information about the e-ticket to the communication terminal device 200. The e-ticket sales device 550*a* also sends information about a user who purchased the e-ticket, to the movie company management device 450.

The e-ticket sales devices 550*b*, . . . 550*c* have the same construction and operation as the e-ticket sales device 550*a*, so that their explanation has been omitted.

The e-ticket confirmation device 650*a* is managed in a movie theater. When the user enters the movie theater, the memory card 100 storing the e-ticket is inserted in the e-ticket confirmation device 650*a*. The e-ticket confirmation device 650*a* writes information indicating use of the e-ticket, to the memory card 100. The e-ticket confirmation device 650*a* also sends information about the user who used the e-ticket, to the movie company management device 450.

The e-ticket confirmation devices 650*b*, . . . , 650*c* have the same construction and operation as the e-ticket confirmation device 650*a*. Thus, an explanation thereof has been omitted.

The package sales devices 700*a*, 700*b*, . . . , 700*c* are the same as those in the first embodiment Thus, an explanation thereof has been omitted.

The incentive provision device 850*a* is installed and managed in a convenience store or the like. To receive an incentive, the memory card 100 storing the e-ticket is inserted in the incentive provision device 850*a*. The incentive provision device 850*a* writes information about a purchase incentive or information about a use incentive, to the memory card 100. The incentive provision device 850*a* also sends information about the user who received the incentive, to the movie company management device 450.

The incentive provision devices 850*b*, . . . , 850*c* have the same construction and operation as the incentive provision device 850*a*. Thus, an explanation thereof has been omitted.

2.2. Construction of the Memory Card 100

The memory card 100 is the same as that in the first embodiment, and so its explanation has been omitted.

2.3. Construction of the Communication Terminal Device 200

The communication terminal device 200 differs from that of the first embodiment only in the control unit 202. Note here that the following explanation uses names and reference numerals of construction elements and tables described in the first embodiment.

2.3.1. Control Unit 202

The control unit 202 operates as follows.

(A) Authentication of the Memory Card 100

The control unit 202 operates in the same way as in the first embodiment, and thus, an explanation thereof has been omitted.

(B) Purchase of an E-Ticket

The control unit 202 receives an Internet address of one of the e-ticket sales devices 550*a*, 550*b*, . . . , 550*c* from the input unit 201. The control unit 202 network-connects to the e-ticket sales device using the Internet address, through the send/receive unit 205. Suppose here that the communication terminal device 200 is connected to the e-ticket sales device 550*a* via the Internet.

The control unit 202 receives a title ID from the input unit 201. The control unit 202 also obtains a user ID from the memory card 100. The control unit 202 sends ticket order information, which includes the user ID and the title ID, to the e-ticket sales device 550*a* via the send/receive unit 205. The control unit 202 then receives ticket purchase confirmation information, which includes the user ID, the title ID, an expiration date, and a selling price, from the e-ticket sales device 550*a* via the send/receive unit 205. The control unit 202 temporarily stores the ticket purchase confirmation information, and also outputs the ticket purchase confirmation information to the display unit 203.

The control unit 202 then receives either ticket payment information or cancel information from the input unit 201.

When receiving the ticket payment information, the control unit 202 (i) generates ticket billing request information, which includes the ticket payment information and the user ID, and (ii) sends the ticket billing request information to the e-ticket sales device 550*a* via the send/receive unit 205.

When receiving the cancel information, the control unit 202 generates ticket billing cancel information which includes the cancel information and the user ID, and sends the ticket billing cancel information to the e-ticket sales device 550*a* via the send/receive unit 205.

Next, the control unit 202 receives either ticket purchase determination information, which includes signature data information and ticket purchase completion information, or ticket purchase cancel information, from the e-ticket sales device 550*a* via the send/receive unit 205.

When receiving the ticket purchase determination information, the control unit 202 outputs the ticket purchase completion information to the display unit 203. The control unit 202 also generates purchased ticket information, which includes the title ID, the expiration date, a shop ID, and first signature data. The control unit 202 writes the title ID, the expiration date, the shop ID, and the first signature data included in the purchased ticket information, respectively to the title ID field, the expiration date field, the shop ID field, and the signature data 1 field in the e-ticket information table T100 in the memory card 100. The control unit 202 then discards the temporarily-stored ticket purchase confirmation information.

When receiving the ticket purchase cancel information, the control unit 202 outputs the ticket purchase cancel information to the display unit 203, and discards the temporarily-stored ticket purchase confirmation information.

(C) Purchase of a Package

The control unit 202 receives an Internet address of one of the package sales devices 700*a*, 700*b*, . . . , 700*c* from the input unit 201. The control unit 202 network-connects to the package sales device, via the send/receive unit 205, using the Internet address. Suppose here that the communication terminal device 200 is connected to the package sales device 700a via the Internet.

The control unit 202 receives a title ID from the input unit 201. The control unit 202 also obtains the user ID from the memory card 100. The control unit 202 searches the e-ticket information table T100 in the memory card 100 for a record corresponding to the title ID, and reads an expiration date, a theater ID, and second signature data in the record. Here, if an e-ticket for a movie identified by the title ID has not been used, then the theater ID field and the second signature data field of the record are blank. The control unit 202 then searches the purchase incentive information table T110 in the memory card 100 for a record corresponding to the title ID, and reads package discount data in the record.

The control unit 202 generates package order information in the following manner.

The control unit 202 checks whether the theater ID field and the second signature data field of the record in the e-ticket information table T100 are blank, for judging whether the e-ticket has not been used. If the e-ticket has been used, then the control unit 202 reads exclusive data 2 and additional information in a record corresponding to the title ID from the use incentive information table T120 in the memory card 100. Through the use of the title ID, the user ID, and the information read from (i) the e-ticket information table T100, (ii) the purchase incentive information table T110, and (iii) the use incentive information table T120, the control unit 202 generates package order information which includes the user ID, the title ID, the expiration date, the theater ID, the second signature data, the package discount data, the exclusive data 2, and the additional information.

If the e-ticket has not been used, the control unit 202 generates, through the use of the title ID, the user ID, and the information read from (i) the e-ticket information table T100 and (ii) the purchase incentive information table T110, package order information which includes the user ID, the title ID, the expiration date, the theater ID, the second signature data, and the package discount data.

The control unit 202 sends the generated package order information to the package sales device 700a via the send/receive unit 205.

Here, if no incentive has been provided from the incentive provision devices 850a, 850b, . . . , 850c, the control unit 202 cannot obtain any information about incentives from the memory card 100. In this case, the parts of the package order information relating to incentives such as package discount data are blank.

If the e-ticket has been used, then the control unit 202 receives package purchase confirmation, information which includes the user ID, the title ID, a package type, and a selling price, from the package sales device 700a via the send/receive unit 205. The control unit 202 outputs the package purchase confirmation information to the display unit 203. If the e-ticket has not been used, on the other hand, the control unit 202 receives package purchase confirmation information, which includes the user ID, the title ID, and a selling price, from the package sales device 700a via the send/receive unit 205. The control unit 202 outputs the package purchase confirmation information to the display unit 203.

The control unit 202 then receives either package payment information or cancel information from the input unit 201. When receiving the package payment information, the control unit 202 generates package billing request information, which includes the package payment information and the user ID, and sends the package billing request information to the package sales device 700a via the send/receive unit 205.

When receiving the cancel information, the control unit 202 generates package billing cancel information which includes the cancel information and the user ID, and sends the package billing cancel information to the package sales device 700a via the send/receive unit 205.

Following this, when receiving package purchase completion information indicating the completion of the package purchase from the package sales device 700a, via the send/receive unit 205, the control unit 202 outputs the package purchase completion information to the display unit 203. When receiving package purchase prohibition information indicating that the package cannot be purchased from the package sales device 700a, via the send/receive unit 205, the control unit 202 outputs the package purchase prohibition information to the display unit 203. When receiving package purchase cancel information indicating the completion of the cancellation of the package purchase from the package sales device 700a, via the send/receive unit 205, the control unit 202 outputs the package purchase cancel information to the display unit 203.

2.4. Construction of the Playback Device 300

The playback device 300 is the same as that in the first embodiment, and thus, an explanation thereof has been omitted.

2.5. Construction of the Movie Company Management Device 450

Figure 37:
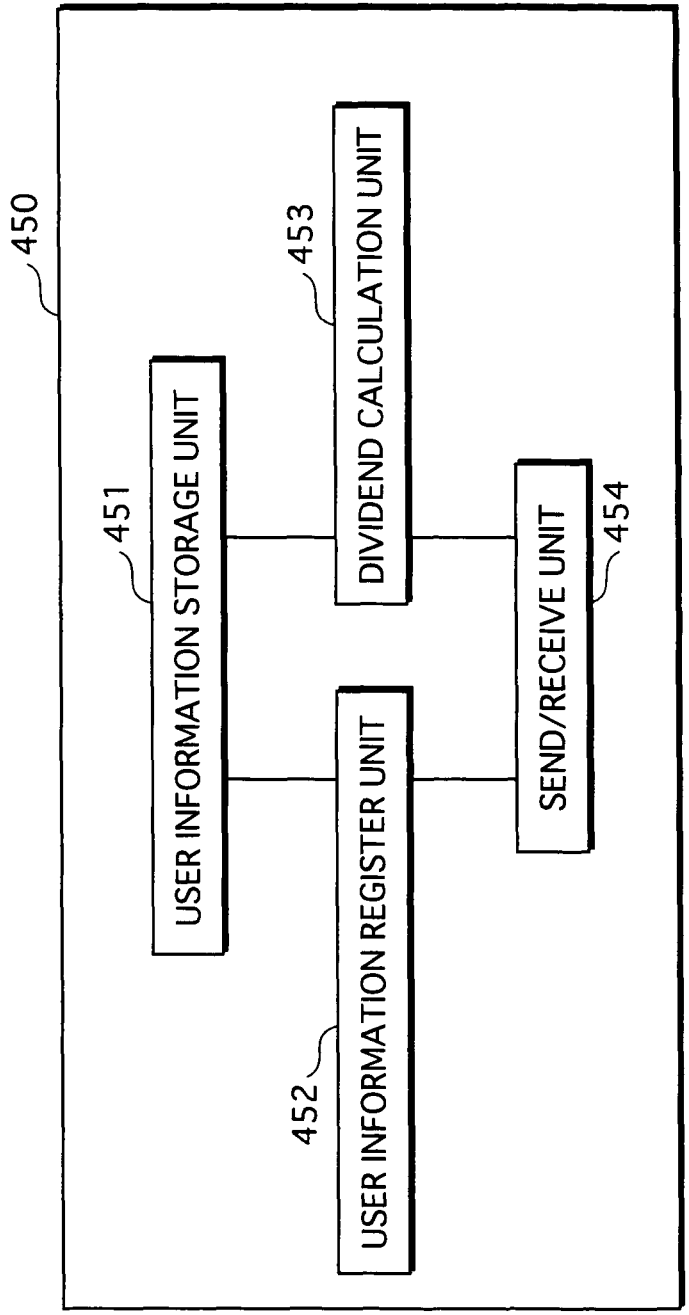
FIG. 37 is a block diagram showing a construction of a movie company management device shown in FIG. 36.

FIG. 37 shows a construction of the movie company management device 450.

In the drawing, the movie company management device 450 includes a user information storage unit 451, a user information register unit 452, a dividend calculation unit 453, and a send/receive unit 454.

The movie company management device 450 is actually realized by a computer system that includes a microprocessor, a ROM, a RAM, a hard disk unit, a display unit, a keyboard, a mouse, and a modem. The functions of the movie company management device 450 are realized by the microprocessor executing a computer program stored in the ROM or the hard disk unit.

The movie company management device 450 manages personal information associated with user IDs in a secure state. The secure state is, for example, an encrypted state.

2.5.1. User Information Storage Unit 451

The user information storage unit 451 has a user management table T450 such as the one shown in FIG. 38.

The user management table T450 has an area for storing at least one record that is made up of: a user ID; a title ID; ticket purchase information; ticket use information; package purchase information; incentive provision information 1; and incentive provision information 2.

The user ID identifies a user.

The title ID identifies a movie.

The ticket purchase information is made up of a shop ID 1 and a selling date 1. The shop ID 1 identifies a shop of an e-ticket. The selling date 1 is a date at which the e-ticket was sold.

The ticket use information is made up of a theater ID and a use date. The theater ID identifies a movie theater. The use date is a date at which the e-ticket was used.

The package purchase information is made up of a shop ID 2 and a selling date 2. The shop ID 2 identifies a shop of a package. The selling date 2 is a date at which the package was sold.

The incentive provision information 1 is made up of a provider ID 1 and a provision date 1, and is registered when providing a purchase incentive. The provider ID 1 identifies a provider of the purchase incentive. The provision date 1 is a date at which the purchase incentive was provided.

The incentive provision information 2 is made up of a provider ID 2 and a provision date 2, and is registered when providing a use incentive. The provider ID 2 identifies a provider of the use incentive. The provision date 2 is a date at which the use incentive was provided.

2.5.2. User Information Register Unit 452

The user information register unit 452 operates as follows.

(A) Purchase of an E-Ticket

The user information register unit 452 operates in the same way as in the first embodiment. Thus, an explanation thereof has been omitted.

(B) Use of an E-Ticket

The user information register unit 452 operates in the same way as in the first embodiment. Thus, an explanation thereof has been omitted.

(C) Purchase of a Package

The user information register unit 452 operates in the same way as in the first embodiment. Thus, an explanation thereof has been omitted.

(D) Provision of a Purchase Incentive

The user information register unit 452 receives purchase incentive provision information which includes a user ID, a title ID, a provider ID, and a provision date, from one of the incentive provision devices 850a, 850b, . . . , 850c via the send/receive unit 454. The user information register unit 452 searches the user management table T450 for a record corresponding to the user ID and the title ID included in the purchase incentive provision information. The user information register unit 452 writes the provider ID and the provision date included in the purchase incentive provision information, respectively to the provider ID 1 field and the provision date 1 field of the incentive provision information 1 field in the record.

(E) Provision of a Use Incentive

The user information register unit 452 receives use incentive provision information which includes a user ID, a title ID, a provider ID, and a provision date, from one of the incentive provision devices 850a, 850b, . . . , 850c via the send/receive unit 454. The user information register unit 452 searches the user management table T450 for a record corresponding to the user ID and the title ID. The user information register unit 452 writes the provider ID and the provision date, respectively to the provider ID 2 field and the provision date 2 field of the incentive provision information 2 field in the record.

2.5.3. Dividend Calculation Unit 453

The dividend calculation unit 453 calculates a dividend to be passed on to each device, based on e-ticket sales, e-ticket use, package sales, and incentive provision. The dividend calculation unit 453 sends a dividend calculation result to each device via the send/receive unit 454. After this, the dividend is paid by cash or the like.

For an e-ticket sales device, an e-ticket confirmation device, and a package sales device, the dividend calculation unit 453 calculates dividends in the same way as in the first embodiment. Thus, an explanation thereof has been omitted.

For an incentive provision device, the dividend calculation unit 453 calculates a dividend based on incentive provision of a corresponding provider shop within a dividend calculation target period, with reference to the incentive provision information 1 field and the incentive provision information 2 field of the user management table T450. The dividend calculation unit 453 sends fourth dividend information which includes a provider ID and a calculation result, to the incentive provision device via the send/receive unit 454.

2.5.4. Send/Receive Unit 454

The send/receive unit 454 outputs information received from the e-ticket sales devices 550a, 550b, . . . , 550c, the e-ticket confirmation devices 650a, 650b, . . . , 650c, the package sales devices 700a, 700b, . . . , 700c, and the incentive provision devices 850a, 850b, . . . , 850c, to the user information register unit 452. Also, the send/receive unit 454 sends first dividend information received from the dividend calculation unit 453, to an e-ticket sales device corresponding to a shop ID included in the first dividend information. The send/receive unit 454 sends second dividend information received from the dividend calculation unit 453, to an e-ticket confirmation device corresponding to a theater ID included in the second dividend information. The send/receive unit 454 sends third dividend information received from the dividend calculation unit 453, to a package sales device corresponding to a shop ID included in the third dividend information. The send/receive unit 454 sends fourth dividend information received from the dividend calculation unit 453, to an incentive provision device corresponding to a provider ID included in the fourth dividend information.

2.6. Construction of the E-Ticket Sales Device 550a

Figure 39:
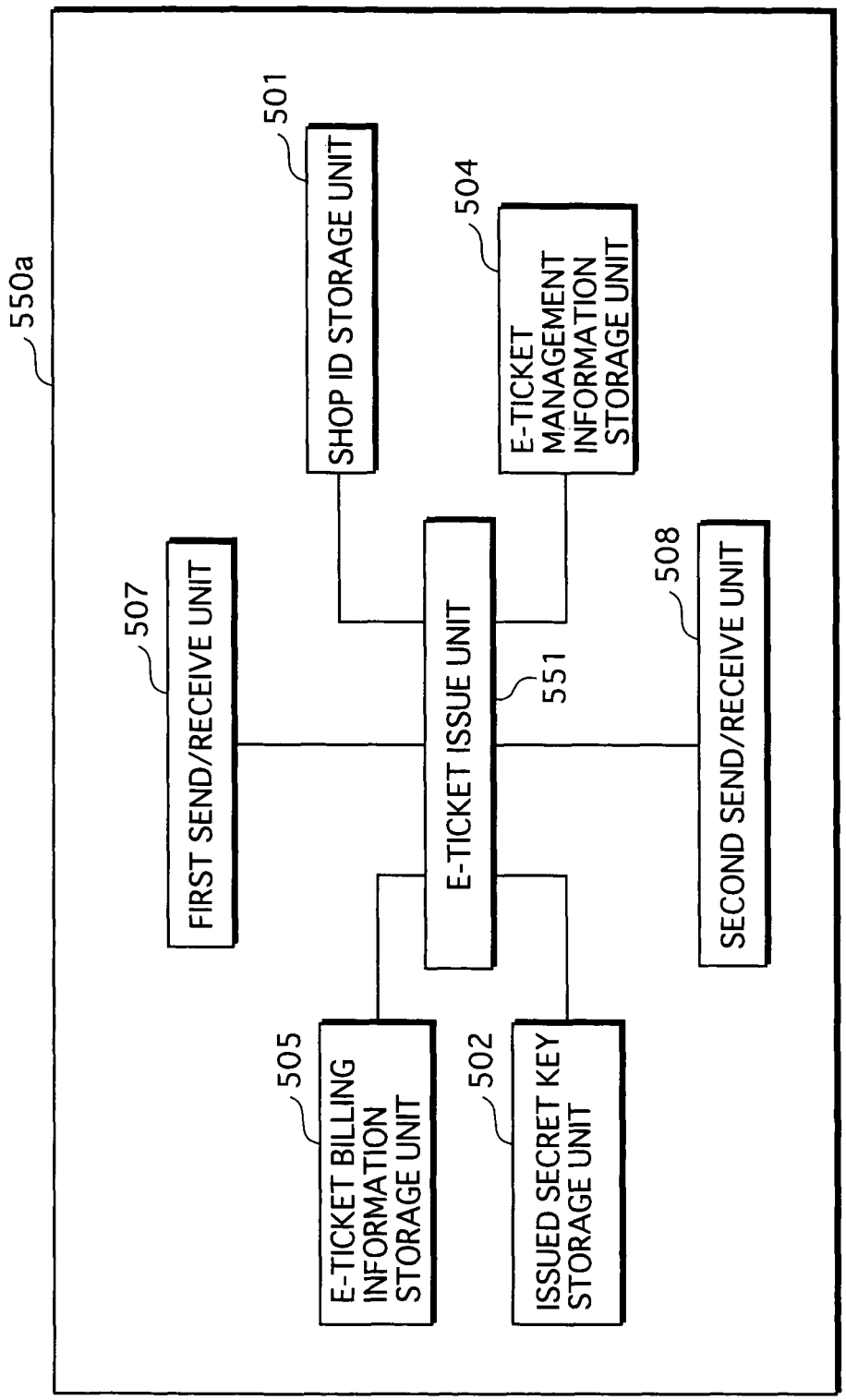
FIG. 39 is a block diagram showing a construction of an e-ticket sales device shown in FIG. 36.

FIG. 39 shows a construction of the e-ticket sales device 550a.

In the drawing, the e-ticket sales device 550a includes the shop ID storage unit 501, the issued secret key storage unit 502, the e-ticket management information storage unit 504, the e-ticket billing information storage unit 505, an e-ticket issue unit 551, the first send/receive unit 507, and the second send/receive unit 508. In FIG. 39, construction elements which are the same as those in the first embodiment shown in FIG. 10 have been given the same reference numerals and an explanation thereof has been omitted.

The e-ticket sales device 550a is actually realized by a computer system that includes a microprocessor, a ROM, a RAM, a hard disk unit, a display unit, a keyboard, a mouse, and a modem. The functions of the e-ticket sales device 550a are realized by the microprocessor executing a computer program stored in the ROM or the hard disk unit.

Upon receipt of a network connection request made from the communication terminal device 200 using an Internet address of the e-ticket sales device 550a, the e-ticket sales device 550a is connected with the communication terminal device 200 via the Internet.

2.6.1. E-Ticket Issue Unit 551

The e-ticket issue unit 551 stores selling prices of e-tickets in correspondence with title IDs of movies, beforehand.

The e-ticket issue unit 551 receives ticket order information from the communication terminal device 200 via the second send/receive unit 508. The e-ticket issue unit 551 searches the e-ticket management table T510 in the e-ticket management information storage unit 504 for a record corresponding to a title ID included in the ticket order information. The e-ticket issue unit 551 generates ticket purchase confirmation information, using a user ID included in the ticket order information, the record, and a selling price corresponding to the title ID stored beforehand. The e-ticket issue unit 551 sends the ticket purchase confirmation information to the communication terminal device 200 via the second send/receive unit 508. The e-ticket issue unit 551 also temporarily stores the ticket purchase confirmation information.

Following this, the e-ticket issue unit 551 receives either ticket billing request information or ticket billing cancel information from the communication terminal device 200 via the second send/receive unit 508.

If the e-ticket issue unit 551 receives the ticket billing request information, then the e-ticket issue unit 551 obtains the temporarily-stored ticket purchase confirmation information, using the user ID and the title ID included in the ticket billing request information. The e-ticket issue unit 551 generates ticket billing information, using the user ID, the title ID, a payment method included in the ticket billing request information, the selling price, and a selling date. The e-ticket issue unit 551 writes the ticket billing information to the e-ticket billing table T520 in the e-ticket billing information storage unit 505. Next, the e-ticket issue unit 551 generates ticket sales information, and sends the ticket sales information to the movie company management device 450 via the first send/receive unit 507. The e-ticket issue unit 551 also reads a secret key from the issued secret key storage unit 502, and digitally-signs the title ID and an expiration date included in the ticket purchase confirmation information using the secret key to generate first signature data. The e-ticket issue unit 551 generates signature data information which includes the first signature data and a shop ID stored in the shop ID storage unit 501. The e-ticket issue unit 551 also generates ticket purchase completion information. The e-ticket issue unit 551 generates ticket purchase determination information which includes the signature data information and the ticket purchase completion information, and sends the ticket purchase determination information to the communication terminal device 200 via the second send/receive unit 508. The e-ticket issue unit 551 then discards the temporarily-stored ticket purchase confirmation information.

If the e-ticket issue unit 551 receives the ticket billing cancel information, then the e-ticket issue unit 551 discards the temporarily-stored ticket purchase confirmation information using the user ID and the title ID included in the ticket billing cancel information. The e-ticket issue unit 551 also generates ticket purchase cancel information, and sends the ticket purchase cancel information to the communication terminal device 200 via the second send/receive unit 508.

2.7. Construction of the E-Ticket Confirmation Device 650a

Figure 40:
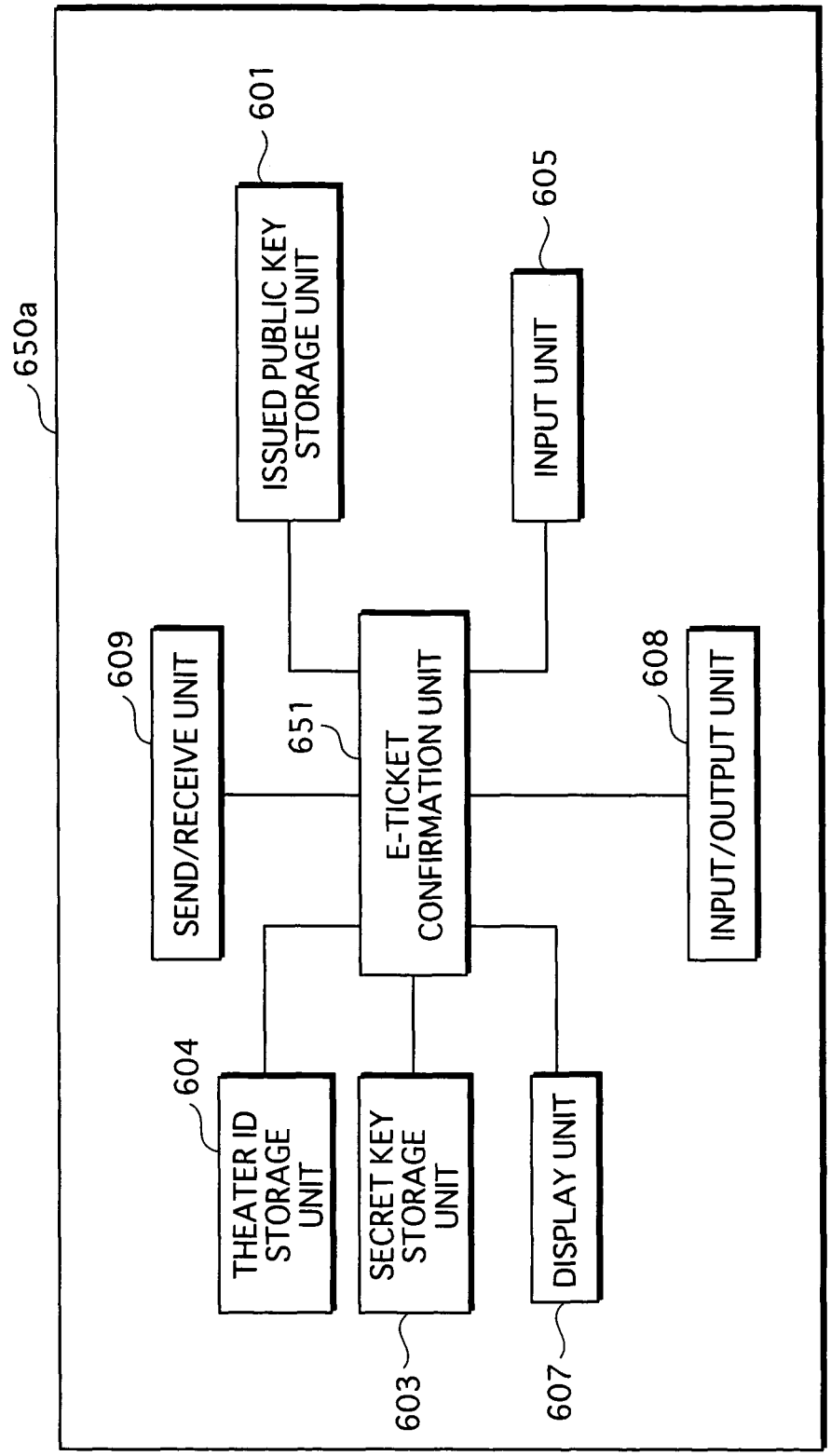
FIG. 40 is a block diagram showing a construction of an e-ticket confirmation device shown in FIG. 36.

FIG. 40 shows a construction of the e-ticket confirmation device 650a.

In the drawing, the e-ticket confirmation device 650a includes the issued public key storage unit 601, the secret key storage unit 603, the theater ID storage unit 604, the input unit 605, an e-ticket confirmation unit 651, the display unit 607, the input/output unit 608, and the send/receive unit 609. In FIG. 40, construction elements which are the same as those in the first embodiment shown in FIG. 14 have been given the same reference numerals and an explanation thereof has been omitted.

The e-ticket confirmation device 650a is actually realized by a computer system that includes a microprocessor, a ROM, a RAM, a hard disk unit, a display unit, a keyboard, a mouse, and a modem. The functions of the e-ticket confirmation device 650a are realized by the microprocessor executing a computer program stored in the ROM or the hard disk unit.

2.7.1. E-Ticket Confirmation Unit 651

The e-ticket confirmation unit 651 operates as follows.

(A) Authentication of the Memory Card 100

The e-ticket confirmation unit 651 operates in the same way as in the first embodiment, so that its explanation has been omitted.

(B) Use of an E-Ticket

The e-ticket confirmation unit 651 receives a title ID from the input unit 605. The e-ticket confirmation unit 651 searches the e-ticket information table T100 in the e-ticket information storage unit 103 in the memory card 100, for a record corresponding to the title ID. If the record does not exist, then the e-ticket confirmation unit 651 outputs use prohibition information indicating that an e-ticket cannot be used, to the display unit 607.

If the record exists, then the e-ticket confirmation unit 651 checks whether the theater ID field and the signature data 2 field of the record are blank, for judging whether the e-ticket has not been used.

If the e-ticket has already been used, then the e-ticket confirmation unit 651 outputs use prohibition information to the display unit 607. If the e-ticket has not been used, then the e-ticket confirmation unit 651 judges whether the e-ticket has expired, based on an expiration date in the record. If the e-ticket has expired, then the e-ticket confirmation unit 651 outputs use prohibition information to the display unit 607. If the e-ticket has not expired, then the e-ticket confirmation unit 651 obtains a public key corresponding to a shop ID included in the record, from the issued public key storage unit 601. The e-ticket confirmation unit 651 verifies first signature data included in the record, using the public key and the title ID and the expiration date included in the record. If the first signature data is invalid, then the e-ticket confirmation unit 651 outputs use prohibition information to the display unit 607. If the first signature data is valid, then the e-ticket confirmation unit 651 digitally-signs the title ID and the expiration date using a secret key stored in the secret key storage unit 603, to generate second signature data. The e-ticket confirmation unit 651 writes the second signature data and a theater ID stored in the theater ID storage unit 604 respectively to the theater ID field and the signature data 2 field of the record, to renew the e-ticket information table T100. The e-ticket confirmation unit 651 also obtains a user ID from the user ID storage unit 102 in the memory card 100. The e-ticket confirmation unit 651 generates ticket use information which includes the user ID, the title ID, the theater ID, and a use date. The e-ticket confirmation unit 651 sends the ticket use information to the movie company management device 450 via the send/receive unit 609.

The signature verification here uses an algorithm for verifying the first signature data generated by the digital signature at the time of selling the e-ticket. Also, the ElGamal signature scheme based on a finite field may, for example, be used to generate the second signature data. Since the ElGamal signature scheme based on a finite field is well known, its explanation has been omitted here.

2.8. Construction of the Package Sales Device 700a

The package sales device 700a is the same as that in the first embodiment, and an explanation thereof has been omitted.

Note here that if parts of package order information that relate to incentives such as package discount data are blank, the user cannot receive incentives. In this case, for example, a package is sold at a regular price without a discount.

2.9. Incentive Provision Device 850a

Figure 41:
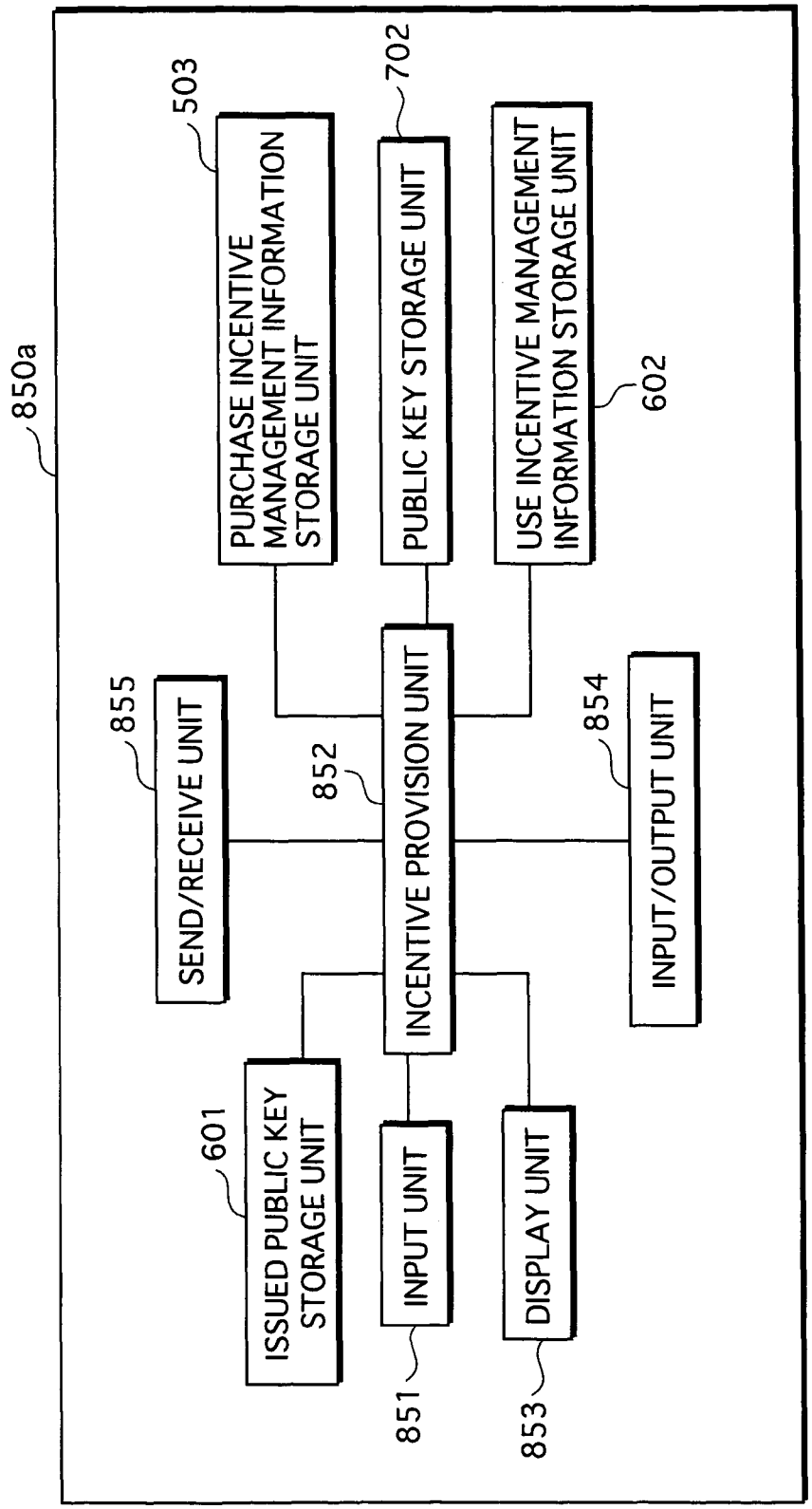
FIG. 41 is a block diagram showing a construction of an incentive provision device shown in FIG. 36.

FIG. 41 shows a construction of the incentive provision device 850a.

In the drawing, the incentive provision device 850a includes the purchase incentive management information storage unit 503, the issued public key storage unit 601, the use incentive management information storage unit 602, the public key storage unit 702, an input unit 851, an incentive provision unit 852, a display unit 853, an input/output unit 854, and a send/receive unit 855. In FIG. 41, construction elements, which are the same as those in the first embodiment shown in FIGS. 10, 14, and 17, have been given the same reference numerals and their explanation has been omitted.

The incentive provision device 850a is actually realized by a computer system that includes a microprocessor, a ROM, a RAM, a hard disk unit, a display unit, a keyboard, a mouse, and a modem. The functions of the incentive provision device 850a are realized by the microprocessor executing a computer program stored in the ROM or the hard disk unit.

2.9.1. Input Unit 851

The input unit 851 operates as follows.

(A) Authentication of the Memory Card 100

The input unit 851 receives a password for authentication and outputs the password to the incentive provision unit 852, when the memory card 100 is inserted in the incentive provision device 850a.

(B) Provision of a Purchase Incentive

The input unit 851 receives purchase incentive request information which includes a title ID and a request for a purchase incentive, and outputs the purchase incentive request information to the incentive provision unit 852.

(C) Provision of a Use Incentive

The input unit 851 receives use incentive request information which includes a title ID and a request for a use incentive, and outputs the use incentive request information to the incentive provision unit 852.

2.9.2. Incentive Provision Unit 852

The incentive provision unit 852 operates as follows.

(A) Authentication of the Memory Card 100

The incentive provision unit 852 receives a password for authentication from the input unit 851, and outputs the password to the memory card 100 via the input/output unit 854. The incentive provision unit 852 then receives access permission information or access prohibition information from the memory card 100 via the input/output unit 854 as an authentication result, and outputs the received information to the display unit 853.

(B) Provision of a Purchase Incentive

The incentive provision unit 852 receives purchase incentive request information from the input unit 851. The incentive provision unit 852 searches the e-ticket information table T100 in the e-ticket information storage unit 103 in the memory card 100, for a record corresponding to a title ID included in the purchase incentive request information.

If the record does not exist, then the incentive provision unit 852 outputs provision prohibition information indicating that a purchase incentive cannot be provided, to the display unit 853. If the record exists, then the incentive provision unit 852 obtains a public key corresponding to a shop ID included in the record from the issued public key storage unit 601. The incentive provision unit 852 verifies first signature data included in the record, using the public key and the title ID and an expiration date included in the record. If the first signature data is invalid, then the incentive provision unit 852 outputs provision prohibition information to the display unit 853. If the first signature data is valid, then the incentive provision unit 852 obtains a record corresponding to the title ID from the purchase incentive management table T500 in the purchase incentive management information storage unit 503, and writes information included in the record to the purchase incentive information table T110 in the purchase incentive information storage unit 104 in the memory card 100. The incentive provision unit 852 also obtains audio data of a movie trailer corresponding to an audio data name included in the record from the purchase incentive management information storage unit 503, and writes the audio data to the purchase incentive information storage unit 104 in the memory card 100. The incentive provision unit 852 further generates purchase incentive provision information, and sends the purchase incentive provision information to the movie company management device 450 via the send/receive unit 855.

The signature verification here uses an algorithm for verifying the first signature data generated by the digital signature at the time of selling the e-ticket (C) Provision of a Use Incentive The incentive provision unit 852 receives use incentive request information from the input unit 851, and searches the e-ticket information table T100 in the e-ticket information storage unit 103 in the memory card 100 for a record corresponding to a title ID included in the use incentive request information.

If the record does not exist, then the incentive provision unit 852 outputs provision prohibition information indicating that a use incentive cannot be provided, to the display unit 853. If the record exists, then the incentive provision unit 852 judges whether an e-ticket has been used, with reference to the record. If the e-ticket has not been used, the incentive provision unit 852 outputs provision prohibition information to the display unit 853. If the e-ticket has been used, then the incentive provision unit 852 obtains a public key corresponding to a theater ID included in the record, from the public key storage unit 702. The incentive provision unit 852 verifies second signature data included in the record, using the public key and the title ID and an expiration date in the record. If the second signature data is invalid, then the incentive provision unit 852 outputs provision prohibition information to the display unit 853. If the second signature data is valid, then the incentive provision unit 852 obtains a record corresponding to the title ID from the use incentive management table T610 in the use incentive management information storage unit 602, and writes information included in the record to the use incentive information table T120 in the memory card 100. The incentive provision unit 852 also obtains audio data of a package trailer corresponding to an audio data name included in the record, from the use incentive management information storage unit 602. The incentive provision unit 852 writes the audio data to the use incentive information storage unit 105 in the memory card 100. The incentive provision unit 852 further generates use incentive provision information, and sends the use incentive provision information to the movie company management device 450 via the send/receive unit 855.

The signature verification here uses an algorithm for verifying the second signature data generated by the digital signature at the time of using the e-ticket.

2.9.3. Display Unit 853

The display unit 853 operates as follows.

In authentication of the memory card 100, the display unit 853 receives either access permission information or access prohibition information, and displays the received information.

In provision of an incentive, when receiving provision prohibition information from the incentive provision unit 852, the display unit 853 displays the provision prohibition information.

Also, when receiving a dividend calculation result, the display unit 853 displays the dividend calculation result to notify an operator of the incentive provision device 850a.

2.9.4. Input/Output Unit 854

The input/output unit 854 outputs information received from the incentive provision unit 852, to the memory card 100. Also, the input/output unit 854 outputs information received from the memory card 100, to the incentive provision unit 852.

2.9.5. Send/Receive Unit 855

The send/receive unit 855 sends information received from the incentive provision unit 852, to the movie company management device 450. Also, the send/receive unit 855 outputs a dividend calculation result received from the movie company management device 450, to the display unit 853 via the incentive provision unit 852.

2.10. Overall Procedures of the E-Ticket System 2

Overall procedures of the e-ticket system 2 are explained below.

2.10.1. Overall Procedure of Authentication of the Memory Card 100

An overall procedure of authentication when the memory card 100 is inserted in the communication terminal device 200 is the same as that in the first embodiment shown in FIG. 20. Thus, an explanation thereof has been omitted.

Also, the same procedure is carried out when the memory card 100 is inserted in the playback device 300, the e-ticket confirmation devices 650a, 650b, ..., 650c, and the incentive provision devices 850a, 850b, ..., 850c.

2.10.2. Overall Procedure of Purchasing an E-Ticket

An overall procedure of purchasing an e-ticket is the same as that in the first embodiment shown in FIG. 21. Thus, an explanation has thereof been omitted.

2.10.3. Overall Procedure of Confirming an E-Ticket

An overall procedure of confirming an e-ticket is the same as that in the first embodiment shown in FIG. 22. Thus, an explanation thereof has been omitted.

2.10.4. Overall Procedure of Purchasing a Package

An overall procedure of purchasing a package is the same as that in the first embodiment shown in FIG. 23. Thus, an explanation thereof has been omitted.

2.10.5. Overall Procedure of Providing an Incentive

Figure 42:
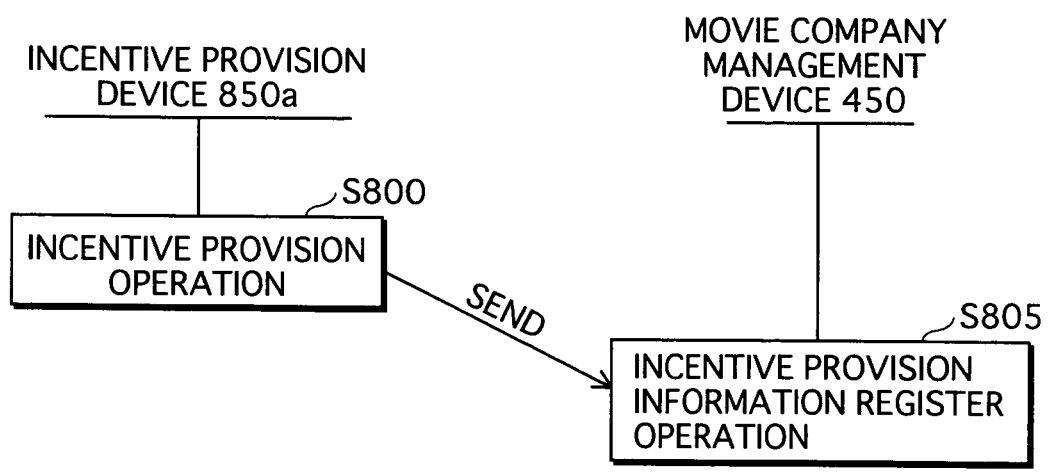
FIG. 42 is a flowchart showing a procedure of providing an incentive in the e-ticket system shown in FIG. 36.

FIG. 42 is a flowchart showing an overall procedure of providing an incentive.

The incentive provision device 850a receives purchase incentive request information or use incentive request information from the user, and performs an incentive provision operation using the received information. If purchase incentive provision information or use incentive provision information is generated in the incentive provision operation, then the incentive provision device 850a sends the generated information to the movie company management device 450 (S800).

The movie company management device 450 performs an incentive provision information register operation using the information received from the incentive provision device 850a (S805).

2.11. Authentication Operation

An authentication operation performed by the memory card 100 is the same as that in the first embodiment shown in FIG. 24, and an explanation thereof has been omitted.

2.12. Ticket Order Reception Operation

Figure 43:
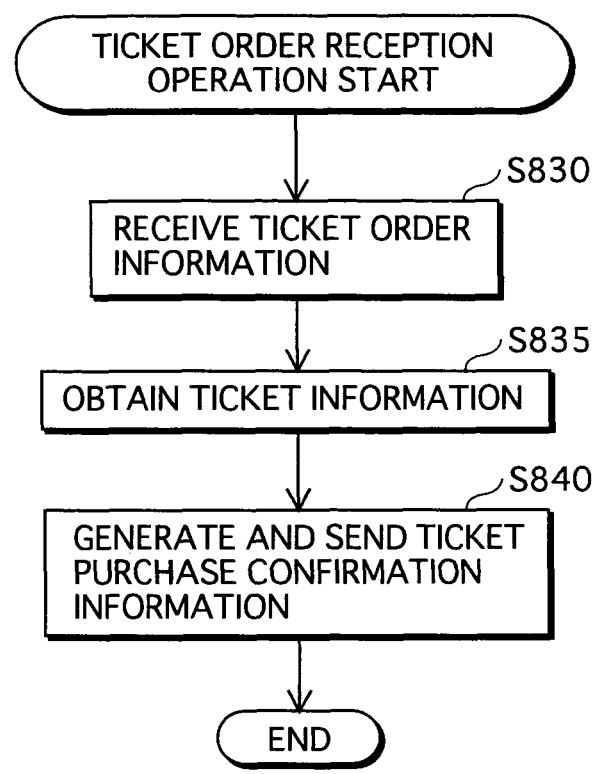
FIG. 43 is a flowchart showing a ticket order reception operation in the e-ticket system shown in FIG. 36.

FIG. 43 is a flowchart showing a ticket order reception operation performed by the e-ticket sales device 550a.

The e-ticket sales device 550a receives ticket order information from the communication terminal device 200 (S830).

The e-ticket sales device 550a obtains a record corresponding to a title ID included in the ticket order information, from the e-ticket management table T510 (S835).

The e-ticket sales device 550a generates ticket purchase confirmation information based on the record. The e-ticket sales device 550a sends the ticket purchase confirmation information to the communication terminal device 200, and also temporarily stores the ticket purchase confirmation information (S840).

2.13. Ticket Billing Operation

A ticket billing operation performed by the e-ticket sales device 550a is the same as that in the first embodiment shown in FIG. 26, except that step S280 is skipped and so step S285 is executed immediately after step S275. Accordingly, an explanation thereof has been omitted.

2.14. Ticket Sales Information Register Operation

A ticket sales information register operation performed by the movie company management device 450 is the same as that in the first embodiment shown in FIG. 27, and an explanation thereof has been omitted.

2.15. Ticket Purchase Operation

Figure 44:
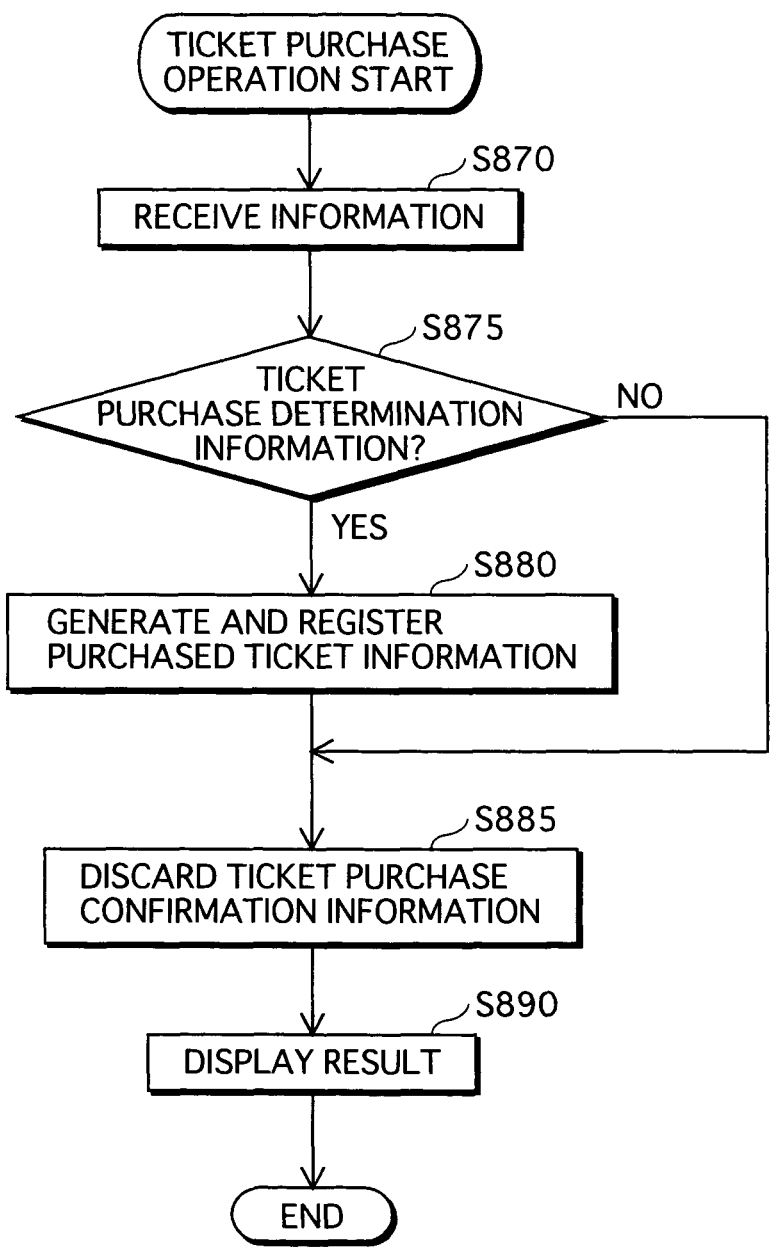
FIG. 44 is a flowchart showing a ticket purchase operation in the e-ticket system shown in FIG. 36.

FIG. 44 is a flowchart showing a ticket purchase operation performed by the communication terminal device 200.

If the communication terminal device 200 sends ticket billing request information to the e-ticket sales device 550a, the communication terminal device 200 receives ticket purchase determination information in response. If the communication terminal device 200 sends ticket billing cancel information to the e-ticket sales device 550a, the communication terminal device 200 receives ticket purchase cancel information in response (S870).

The communication terminal device 200 judges whether the received information is the ticket purchase determination information or the ticket purchase cancel information (S875).

If the received information is the ticket purchase determination information, then the communication terminal device 200 generates purchased ticket information, using signature data information included in the ticket purchase determination information and temporarily-stored ticket purchase confirmation information. The communication terminal device 200 writes the purchased ticket information to the e-ticket information table T100 in the memory card 100 (S880). The communication terminal device 200 then discards the temporarily-stored ticket purchase confirmation information (S885). The communication terminal device 200 displays a message indicating the receipt of ticket purchase completion information included in the ticket purchase determination information, to notify the user (S890).

If the received information is the ticket purchase cancel information, then the communication terminal device 200 discards the temporarily-stored ticket purchase confirmation information (S885). The communication terminal device 200 displays a message indicating the receipt of the ticket purchase cancel information to notify the user (S890).

2.16. Ticket Use Operation

Figure 45:
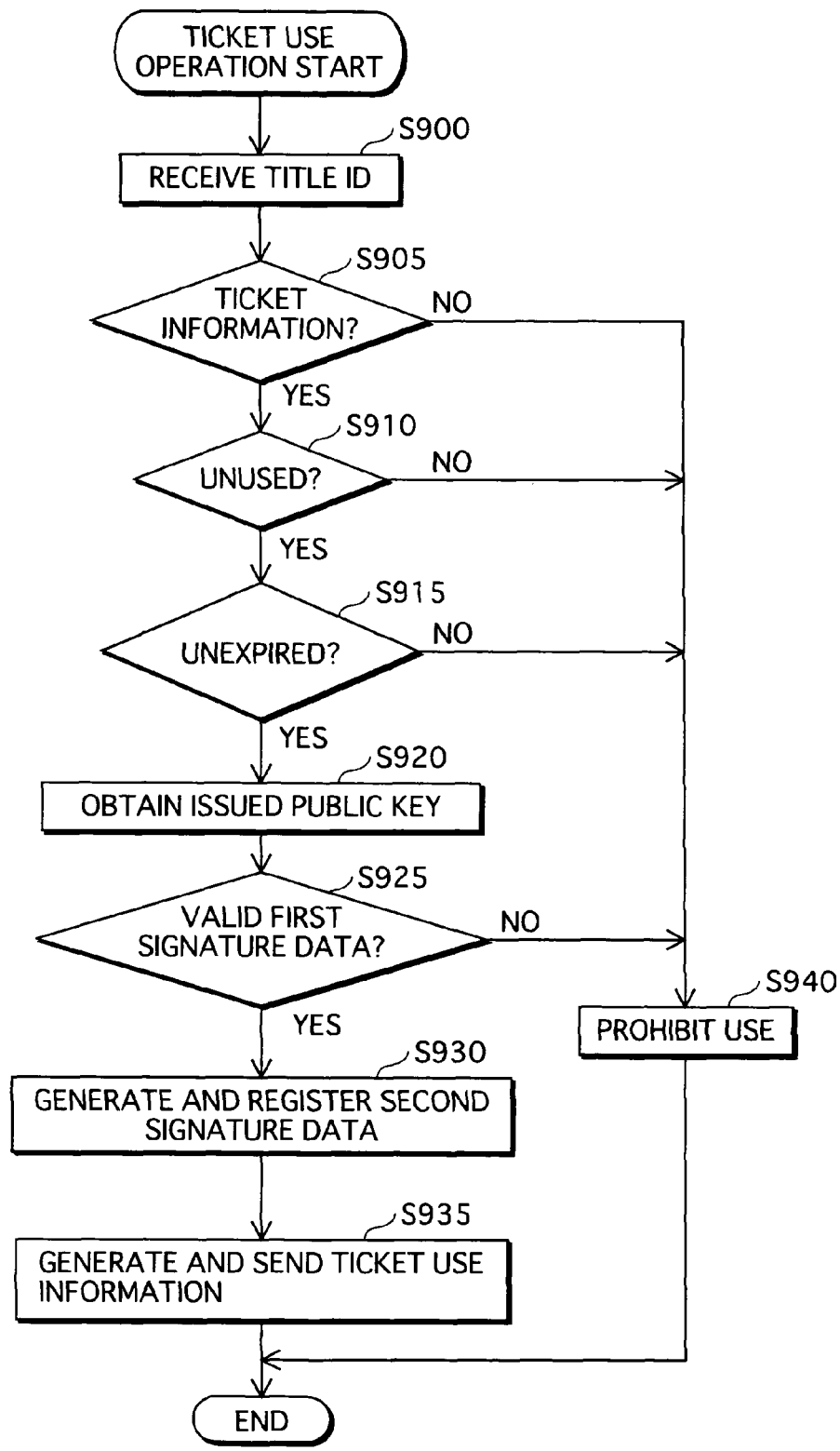
FIG. 45 is a flowchart showing a ticket use operation in the e-ticket system shown in FIG. 36.

FIG. 45 is a flowchart showing a ticket use operation performed by the e-ticket confirmation device 650a.

The e-ticket confirmation device 650a receives a title ID in the input unit 605 (S900).

The e-ticket confirmation device 650a searches the e-ticket information table T100 in the memory card 100, for a record corresponding to the title ID (S905).

If the record does not exist, then the e-ticket confirmation device 650a generates use prohibition information, and displays the use prohibition information in the display unit 607 (S940). If the record exists, then the e-ticket confirmation device 650a checks whether the theater ID field and the signature data 2 field of the record are blank, for judging whether an e-ticket has not been used (S910).

If the e-ticket has been used, then the e-ticket confirmation device 650a generates use prohibition information, and displays the use prohibition information in the display unit 607 (S940). If the e-ticket has not been used, then the e-ticket confirmation device 650a judges whether the e-ticket has expired based on an expiration date included in the record (S915).

If the e-ticket has expired, then the e-ticket confirmation device 650a generates use prohibition information and displays the use prohibition information in the display unit 607 (S940). If the e-ticket has not expired, then the e-ticket confirmation device 650a obtains a public key corresponding to a shop ID included in the record, from the issued public key storage unit 601 (S920). The e-ticket confirmation device 650a verifies first signature data included in the record, using the public key and the title ID and the expiration date included in the record (S925). If the first signature data is invalid, then the e-ticket confirmation device 650a generates use prohibition information and displays the use prohibition information in the display unit 607 (S940). If the first signature data is valid, then the e-ticket confirmation device 650a generates second signature data, and writes a theater ID and the second signature data to the theater ID field and the signature data 2 field of the record, to renew the e-ticket information table T100 (S930). The e-ticket confirmation device 650a then generates ticket use information, and sends the ticket use information to the movie company management device 450 (S935).

2.17. Ticket Use Information Register Operation

A ticket use information register operation performed by the movie company management device 450 is the same as that in the first embodiment shown in FIG. 30. Thus, an explanation thereof has been omitted.

2.18. Package Order Reception Operation

A package order reception operation performed by the package sales device 700a is the same as that in the first embodiment shown in FIG. 31. Thus, an explanation thereof has been omitted.

Note here that if a purchase incentive has not been provided, package discount data is not stored in the memory card 100. In this case, a package is sold at a regular price without a discount. Likewise, if a use incentive has not been provided, then a package is sold in a regular package type even if an e-ticket has been used.

2.19. Package Billing Operation

A package billing operation performed by the package sales device 700a is the same as that in the first embodiment shown in FIG. 32, and an explanation thereof has been omitted.

2.20. Package Sales Information Register Operation

A package sales information register operation performed by the movie company management device 450 is the same as that in the first embodiment shown in FIG. 33, and an explanation thereof has been omitted.

2.21. Incentive Provision Operation

Figure 46:
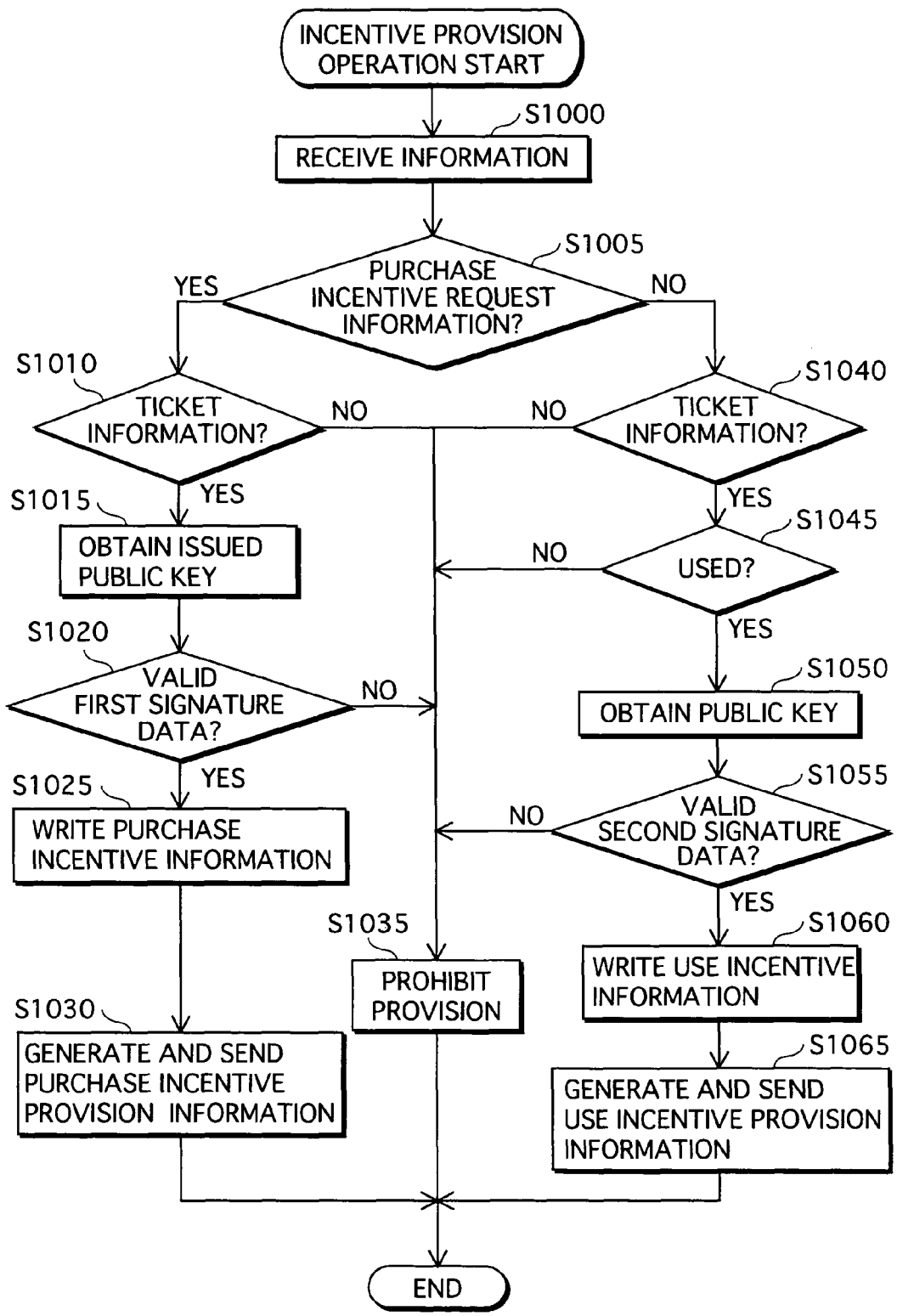
FIG. 46 is a flowchart showing an incentive provision operation in the e-ticket system shown in FIG. 36.

FIG. 46 is a flowchart showing an incentive provision operation performed by the incentive provision device 850a.

To provide a purchase incentive, the incentive provision device 850a receives purchase incentive request information. To provide a use incentive, the incentive provision device 850a receives use incentive request information (S1000).

The incentive provision device 850a judges whether the received information is the purchase incentive request information or the use incentive request information (S1005).

If the received information is the purchase incentive request information, the incentive provision device 850a searches the e-ticket information table T100 in the memory card 100, for a record corresponding to a title ID included in the purchase incentive request information (S1010). If the record does not exist, then the incentive provision device 850a generates and displays provision prohibition information (S1035). If the record exists, then the incentive provision device 850a obtains a public key corresponding to a shop ID included in the record, from the issued public key storage unit 601 (S1015). The incentive provision device 850a verifies first signature data included in the record, using the public key and the title ID and an expiration date included in the record (S1020). If the first signature data is invalid, then the incentive provision device 850a generates and displays provision prohibition information (S1035). If the first signature data is valid, then the incentive provision device 850a reads a record corresponding to the title ID from the purchase incentive management information storage unit 503, and writes information included in the record to the purchase incentive information table T110 in the memory card 100. The incentive provision device 850a also obtains audio data of a movie trailer corresponding to an audio data name included in the record, from the purchase incentive management information storage unit 503. The incentive provision device 850a writes the audio data to the purchase incentive information storage unit 104 in the memory card 100 (S1025). The incentive provision device 850a further generates purchase incentive provision information, and sends the purchase incentive provision information to the movie company management device 450 (S1030).

If the received information is the use incentive request information, then the incentive provision device 850a searches the e-ticket information table T100 in the memory card 100 for a record corresponding to a title ID included in the use incentive request information (S1040). If the record does not exist, then the incentive provision device 850a generates and displays provision prohibition information (S1035). If the record exists, then the incentive provision device 850a checks whether the theater ID field and the signature data 2 field of the record are blank, to judge whether an e-ticket has not been used (S1045). If the e-ticket has not been used, then the incentive provision device 850a generates and displays provision prohibition information (S1035). If the e-ticket has been used, then the incentive provision device 850a obtains a public key corresponding to a theater ID included in the record, from the public key storage unit 702 (S1050). The incentive provision device 850a verifies second signature data included in the record, using the public key and the title ID and an expiration date included in the record (S1055). If the second signature data is valid, then the incentive provision device 850a reads a record corresponding to the title ID from the use incentive management information storage unit 602, and writes information included in the record to the use incentive information table T120 in the memory card 100. The incentive provision device 850a also obtains audio data of a package trailer corresponding to an audio data name included in the record, from the use incentive management information storage unit 602. The incentive provision device 850a writes the audio data to the use incentive information storage unit 105 in the memory card 100 (S1060). The incentive provision device 850a then generates use incentive provision information, and sends the use incentive provision information to the movie company management device 450 (S1065). If the second signature data is invalid, on the other hand, the incentive provision device 850a generates and displays provision prohibition information (S1035).

2.22. Incentive Provision in Formation Register Operation

Figure 47:
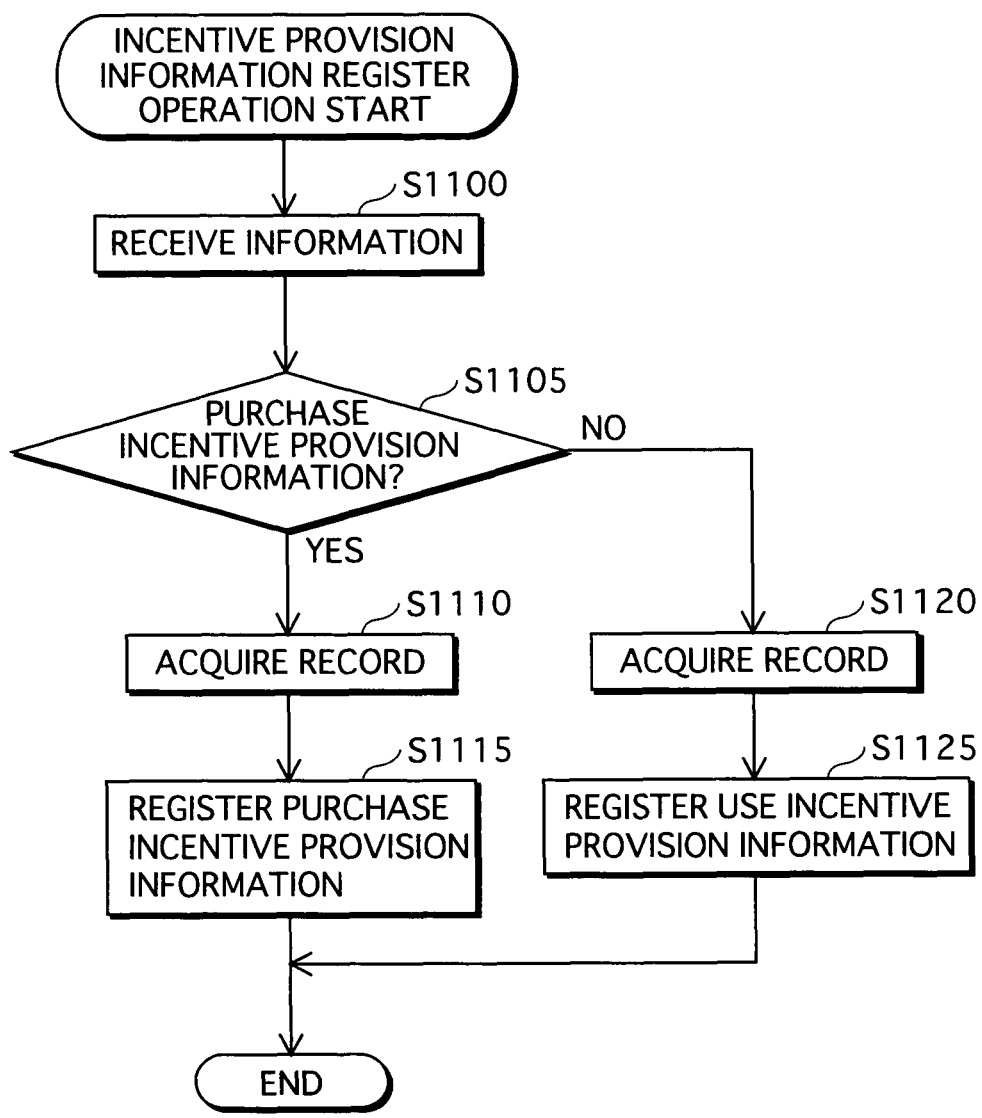
FIG. 47 is a flowchart showing an incentive provision information register operation in the e-ticket system shown in FIG. 36.

FIG. 47 is a flowchart showing an incentive provision information register operation performed by the movie company management device 450.

When the incentive provision device 850a provides a purchase incentive, the movie company management device 450 receives purchase incentive provision information from the incentive provision device 850a. When the incentive provision device 850a provides a use incentive, the movie company management device 450 receives use incentive provision information from the incentive provision device 850a (S1100).

The movie company management device 450 judges whether the received information is the purchase incentive provision information or the use incentive provision information (S1105).

If the received information is the purchase incentive provision information, then the movie company management device 450 searches the user management table T450 for a record corresponding to a user ID and a title ID included in the purchase incentive provision information (S1110). The movie company management device 450 writes a provider ID and a provision date included in the purchase incentive provision information to the incentive provision information 1 field of the record, to renew the user management table T450 (S1115).

If the received information is the use incentive provision information, then the movie company management device 450 searches the user management table T450 for a record corresponding to a user ID and a title ID included in the use incentive provision information (S1120). The movie company management device 450 writes a provider ID and a provision date included in the use incentive provision information to the incentive provision information 2 field of the record, to renew the user management table T450 (S1125).

2.23. Playback Operation

A playback operation performed by the playback device 300 is the same as that in the first embodiment shown in FIG. 34, and an explanation thereof has been omitted.

2.24. Incentive Playback Operation

An incentive playback operation performed by the playback device 300 is the same as that in the first embodiment shown in FIG. 35, and an explanation thereof has been omitted.

2.25. Conclusion

As explained above, the e-ticket system of this embodiment offers incentives such as a discount to a person who wants to purchase a package, on the condition that he or she purchased and used an e-ticket. This encourages the person to purchase and use the e-ticket, and then purchase the package. Conversely, a person who purchased and used an e-ticket can get a discount on a package. This encourages the person to purchase the package. Such a system benefits both e-ticket sales and package sales.

Also, with the provision of the purchase incentive management information storage unit and the use incentive management information storage unit, various types of incentives can be offered.

Also, a digital signature is applied both when purchasing an e-ticket and when using the e-ticket. When using the e-ticket, a digital signature made when purchasing the e-ticket is verified to authenticate the e-ticket. When purchasing a package, a digital signature made when using the e-ticket is verified to authenticate the use of the e-ticket. This enhances security.

Also, customer information is sent to the movie company management device when purchasing an e-ticket, when using the e-ticket, and when purchasing a package. This enables the movie company to keep track of user behavior.

Also, by employing e-tickets, a ticket sales company can widen ticket sales. Further, the provision of a dividend according to ticket sales helps increase the company's eagerness to sell.

Also, by employing e-tickets, a movie theater can collectively manage admission fees, which eases the work of the movie theater. Further, the provision of a dividend according to ticket collection helps increase the theater's eagerness to promote.

Also, by employing e-tickets, a package sales company can dominate package sales to users of e-tickets. Further, the provision of a dividend according to package sales helps increase the company's eagerness to sell.

Also, with the provision of the incentive provision device, the user can receive incentives according to need. Further, the provision of a dividend according to incentive provision helps increase a provider's eagerness to promote incentives.

Thus, the e-ticket system generates a synergistic effect of benefiting users and expanding e-ticket sales.

3. Modifications

The present invention has been described by way of the above embodiments, though it should be obvious that the invention is not limited to the above. Example modifications are given below.

(1) The above embodiments describe the case where the user is billed for an e-ticket or a package when placing an order, but this can be modified as follows. When the user orders an e-ticket, only a reservation is made. The user then obtains the e-ticket. Later, the user is billed when he or she uses the e-ticket. Likewise, when the user orders a package, only a reservation is made. Later, the user is billed when the package is delivered. In this case, payment for the package is made on a cash-on-delivery basis.

Figure 48:
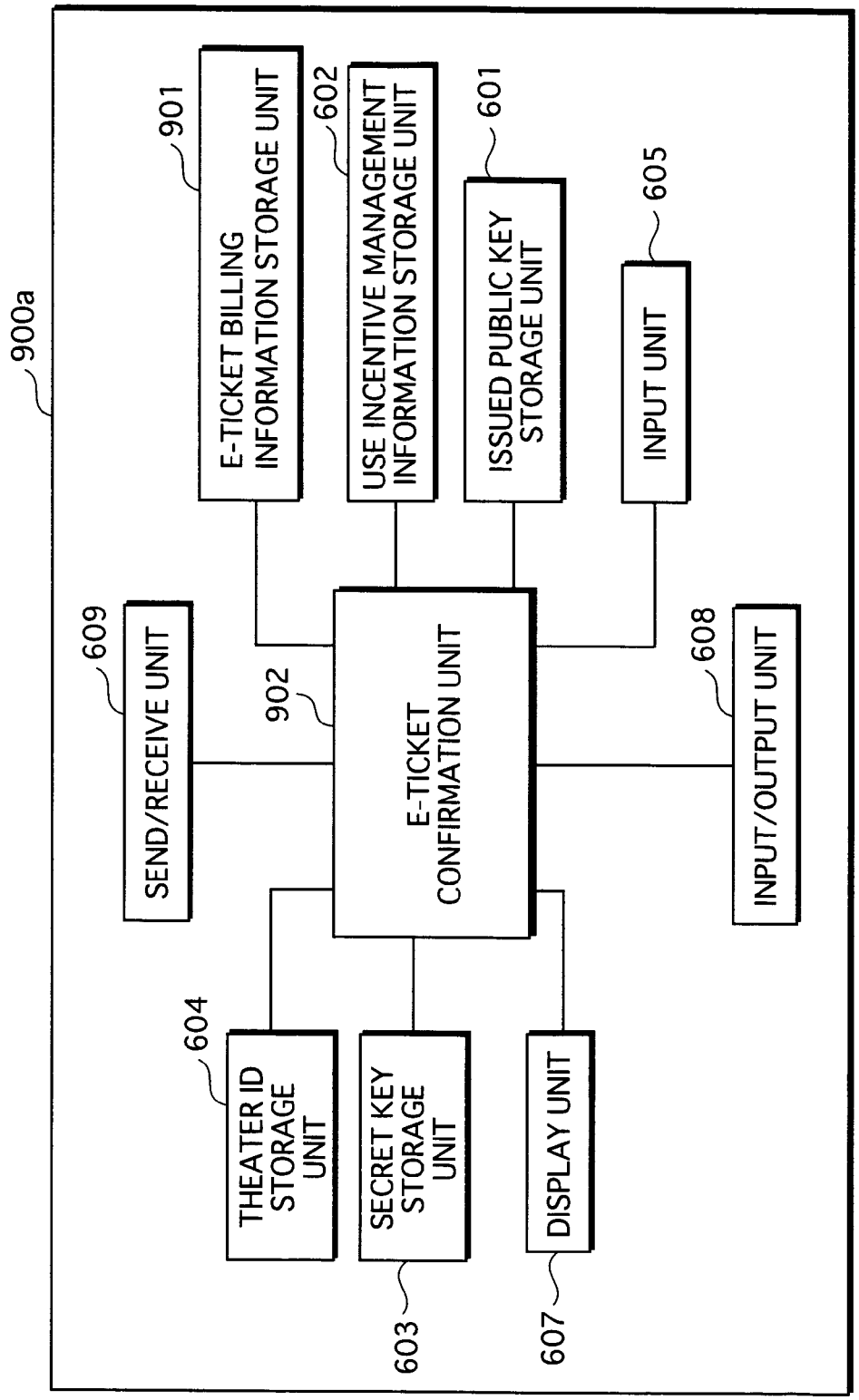
FIG. 48 is a block diagram showing a construction of an e-ticket confirmation device which is a modification to the first embodiment.

FIG. 48 shows a construction of an e-ticket confirmation device 900a according to this modification. The following focuses on the differences from the first embodiment.

In the drawing, the e-ticket confirmation device 900a includes the issued public key storage unit 601, the use incentive management information storage unit 602, the secret key storage unit 603, the theater ID storage unit 604, the input unit 605, an e-ticket confirmation unit 902, the display unit 607, the input/output unit 608, the send/receive unit 609, and an e-ticket billing information storage unit 901. In FIG. 48, construction elements which are the same as those in the first embodiment shown in FIG. 14 have been given the same reference numerals and their explanation has been omitted.

The e-ticket confirmation device 900a is actually realized by a computer system that includes a microprocessor, a ROM, a RAM, a hard disk unit, a display unit, a keyboard, a mouse, and a modem. The functions of the e-ticket confirmation device 900a are realized by the microprocessor executing a computer program stored in the ROM or the hard disk unit.

The e-ticket billing information storage unit 901 is the same as the e-ticket billing information storage unit 505 in the e-ticket sales device 500a shown in FIG. 10, and an explanation thereof has been omitted.

The e-ticket confirmation unit 902 has the functions of the e-ticket confirmation unit 606 shown in FIG. 14. In addition, the e-ticket confirmation unit 902 stores selling prices of e-tickets in correspondence with title IDs of movies, beforehand. The e-ticket confirmation unit 902 searches the e-ticket information table T100 in the memory card 100 for a record corresponding to a title ID received from the input unit 605. If the record exists, then the e-ticket confirmation unit 902 judges whether an e-ticket has been used, based on the theater ID field and the second signature data field of the record. If the e-ticket has not been used, then the e-ticket confirmation unit 902 judges whether the e-ticket has not expired, with reference to an expiration date in the record. If the e-ticket has not expired, then the e-ticket confirmation unit 902 obtains a selling price corresponding to the title ID. The e-ticket confirmation unit 902 displays the selling price in the display unit 607, and prompts the user to enter either ticket payment information or cancel information. If the user enters the ticket payment information, then the e-ticket confirmation unit 902 generates ticket billing information, using the ticket payment information, a user ID, the title ID, the selling price, and a selling date. The e-ticket confirmation unit 902 writes the ticket billing information to the e-ticket billing information storage unit 901. The e-ticket confirmation unit 902 also generates ticket sales information, and sends the ticket sales information to the movie company management device.

In this case, a ticket use operation is carried out as follows. If the e-ticket has not expired in step S415 in FIG. 29, then the e-ticket confirmation device 900a performs a ticket billing operation. After the ticket billing operation, the e-ticket confirmation device 900a performs step S420 onwards.

Meanwhile, a package sales device according to this modification has the same construction as in the first embodiment shown in FIG. 17. A difference from the first embodiment, however, lies in that the payment method 2 field in the package billing table T710 is replaced with a payment confirmation field showing whether payment has been made or not. This being so, when the user orders a package, necessary information is written to the user ID field, the title ID field, the selling date 2 field, and the price 2 field of the package billing table T710.

In this case, a package billing operation is carried out as follows.

A package shop receives information such as a name of a purchaser and a title ID, from a package deliverer. The package shop also receives payment for a package from the purchaser by cash, electronic money, or the like. The package shop obtains a user ID from personal information managed in the movie company management device, using the name of the purchaser or the like. The package shop searches the package billing table for a record corresponding to the user ID and the title ID. The package shop writes information indicating the receipt of the payment to the payment confirmation field of the record, to renew the package billing table.

(2) The above embodiments describe the case where the e-ticket sales device and the package sales device perform a ticket billing operation and a package billing operation respectively, but the invention is not limited to such. For example, a billing device may be added to the second subsystem to collectively manage billing information.

Figure 49:
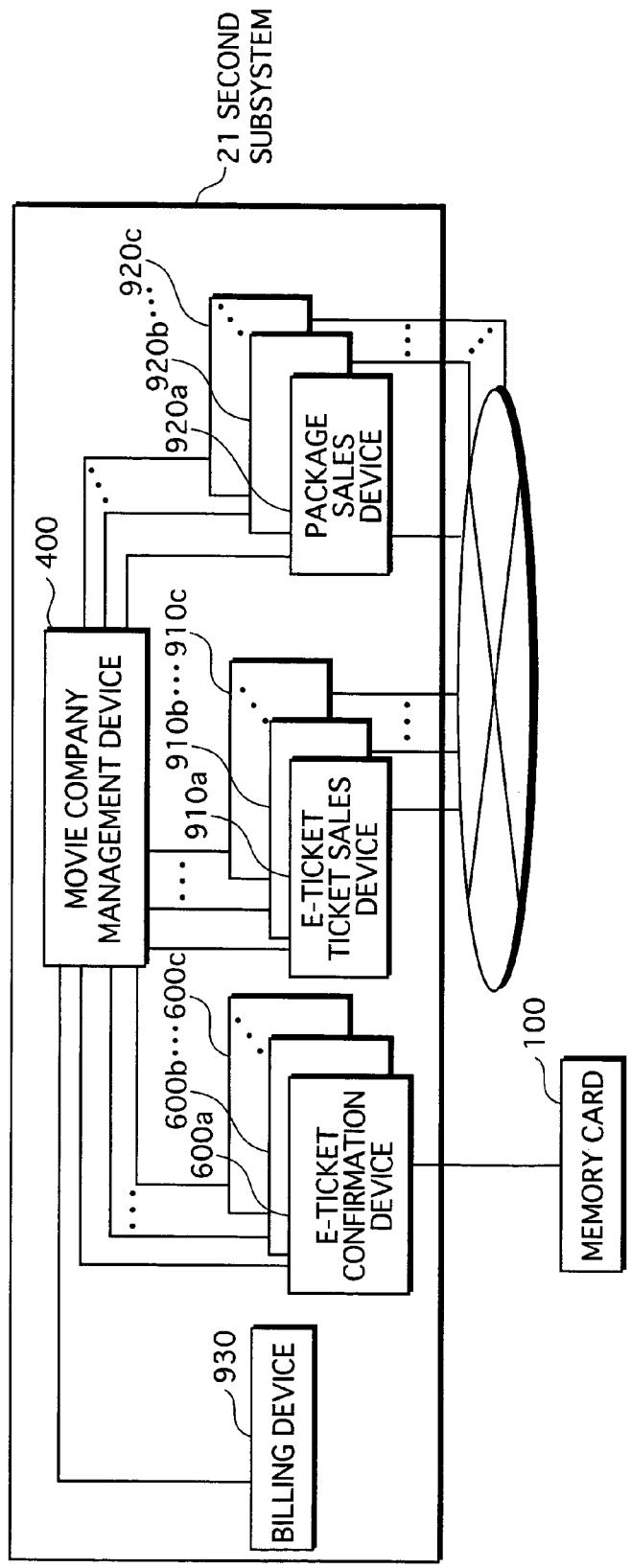
FIG. 49 is a block diagram showing a construction of a second subsystem which is a modification to the first embodiment.

FIG. 49 shows a construction of a second subsystem 21 according to this modification, in which a billing device is added to the second subsystem 20 of the first embodiment.

In the drawing, the second subsystem 21 is roughly made up of the movie company management device 400, e-ticket sales devices 910a, 910b, ..., 910c, the e-ticket confirmation devices 600a, 600b, ..., 600c, package sales devices 920a, 920b, ..., 920c, and a billing device 930. The movie company management device 400 is connected to the e-ticket sales devices 910a, 910b, ..., 910c, the e-ticket confirmation devices 600a, 600b, ..., 600c, the package sales devices 920a, 920b, ..., 920c, and the billing device 930 by dedicated lines.

The memory card 100, the movie company management device 400, and the e-ticket confirmation devices 600a, 600b, ..., 600c are the same as those in the first embodiment, and so their explanation has been omitted.

The e-ticket sales device 910a includes an e-ticket issue unit, a purchase incentive management information storage unit, an e-ticket management information storage unit, a first send/receive unit, and a second send/receive unit.

The e-ticket sales device 910a is actually realized by a computer system that includes a microprocessor, a ROM, a RAM, a hard disk unit, a display unit, a keyboard, a mouse, and a modem. The functions of the e-ticket sales device 910a are realized by the microprocessor executing a computer program stored in the ROM or the hard disk unit.

When receiving ticket billing request information from the communication terminal device, the e-ticket issue unit generates ticket billing information and sends it to the billing device 930. When receiving other information from the communication terminal device and when receiving information from the movie company management device 400, the e-ticket issue unit operates in the same way as in the first embodiment, and an explanation thereof has been omitted.

The other construction elements of the e-ticket sales device 910a are the same as those in the first embodiment, and an explanation thereof has been omitted too.

Also, the e-ticket sales devices 910b, ..., 910c have the same construction and operation as the e-ticket sales device 910a, so that their explanation has been omitted.

The package sales device 920a includes a package sales unit, a public key storage unit, a first send/receive unit, and a second send/receive unit.

The package sales device 920a is actually realized by a computer system that includes a microprocessor, a ROM, a RAM, a hard disk unit, a display unit, a keyboard, a mouse, and a modem. The functions of the package sales device 920a are realized by the microprocessor executing a computer program stored in the ROM or the hard disk unit.

When receiving package billing request information from the communication terminal device, the package sales unit generates package billing information and sends it to the billing device 930. When receiving other information from the communication terminal device and when receiving information from the movie company management device 400, the package sales unit operates in the same way as in the first embodiment, so that its explanation has been omitted.

The other construction elements of the package sales device 920a are the same as those in the first embodiment, so that their explanation has been omitted too.

Also, the package sales devices 920b, ..., 920c have the same construction and operation as the package sales device 920a, so that their explanation has been omitted.

Figure 50:
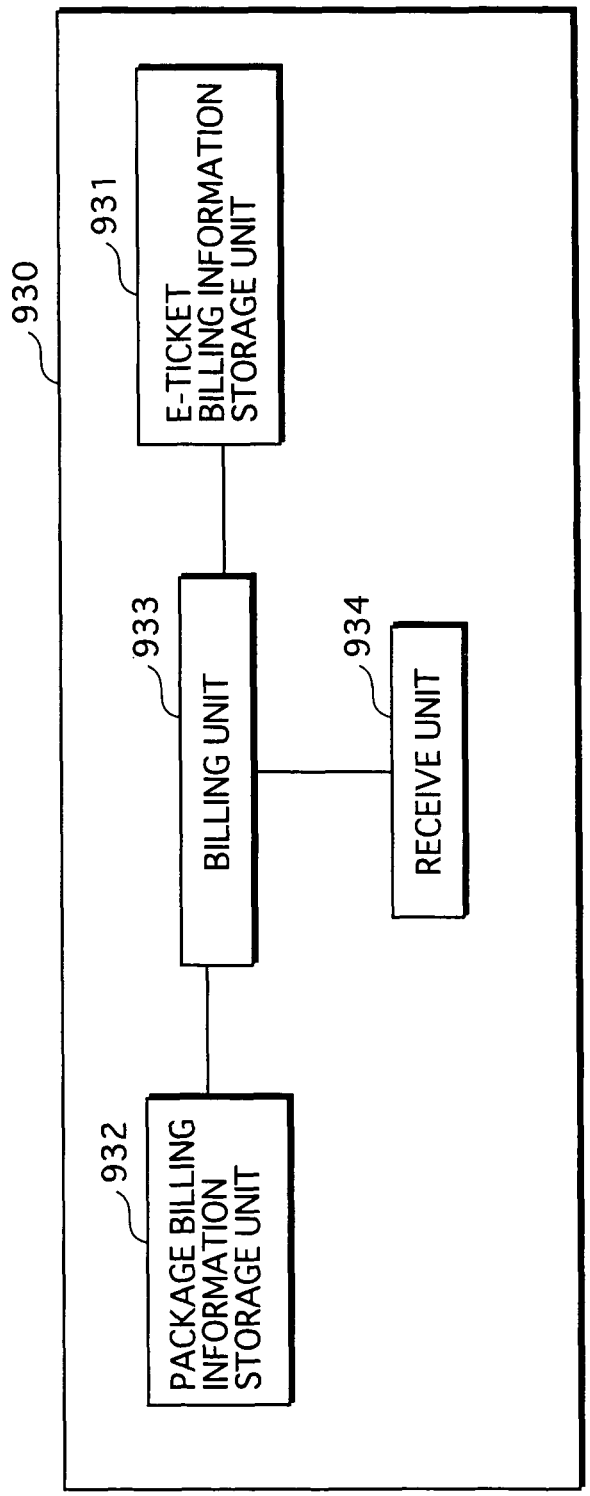
FIG. 50 is a block diagram showing a construction of a billing device shown in FIG. 49.

FIG. 50 shows a construction of the billing device 930.

In the drawing, the billing device 930 includes an e-ticket billing information storage unit 931, a package billing information storage unit 932, a billing unit 933, and a receive unit 934. The billing device 930 receives information from the e-ticket sales devices 910a, 910b, ..., 910c and the package sales devices 920a, 920b, ..., 920c, via the movie company management device 400.

The billing device 930 is actually realized by a computer system that includes a microprocessor, a ROM, a RAM, a hard disk unit, a display unit, a keyboard, a mouse, and a modem. The functions of the billing device 930 are realized by the microprocessor executing a computer program stored in the ROM or the hard disk unit.

The e-ticket billing information storage unit 931 is the same as the e-ticket billing information storage unit 505 shown in FIG. 10, and an explanation thereof has been omitted.

The package billing information storage unit 932 is the same as the package billing information storage unit 703 shown in FIG. 17, so that its explanation has been omitted.

The billing unit 933 receives ticket billing information from one of the e-ticket sales devices 910a, 910b, ..., 910c, and writes the ticket billing information to the e-ticket billing information storage unit 931. Also, the billing unit 933 receives package billing information from one of the package sales devices 920*a*, 920*b*, . . . , 920*c*, and writes the package billing information to the package billing information storage unit 932.

The receive unit 934 outputs information received from the e-ticket sales devices 910*a*, 910*b*, . . . , 910*c* and the package sales devices 920*a*, 920*b*, . . . , 920*c*, to the billing unit 933.

A ticket billing operation, a package billing operation, and a billing information register operation according to this modification are explained below, focusing on the differences from the first embodiment.

The ticket billing operation differs from that shown in FIG. 26, in that step S260 is modified to generate ticket billing information and send the ticket billing information to the billing device 930.

The package billing operation differs from that shown in FIG. 32, in that step S580 is modified to generate package billing information and send the package billing information to the billing device 930.

The billing information register operation is performed in the following manner. The billing device 930 receives ticket billing information or package billing information. The billing device 930 judges whether the received information is the ticket billing information or the package billing information. If the received information is the ticket billing information, then the billing device 930 writes the ticket billing information to the e-ticket billing information storage unit 931. If the received information is the package billing information, then the billing device 930 writes the package billing information to the package billing information storage unit 932.

Though the second subsystem 21 includes only one billing device, a plurality of billing devices may be employed to manage billing information. Also, instead of adding a billing device to the second subsystem, a billing device of a credit card company may be employed with payment for e-tickets and packages being made by credit card.

Also, though the billing device 930 receives information from the e-ticket sales devices 910*a*, 910*b*, . . . , 910*c* and the package sales devices 920*a*, 920*b*, . . . , 920*c* via the movie company management device 400 in the above example, the billing device 930 may receive information directly from the e-ticket sales devices 910*a*, 910*b*, . . . , 910*c* and the package sales devices 920*a*, 920*b*, . . . , 920*c* without involving the movie company management device 400.

(3) The above embodiments describe the case where the communication terminal device is exemplified by a PDA, though the communication terminal device may be any device such as a mobile phone or a personal computer that can be equipped with a memory card and connected to a network such as the Internet.

(4) The above embodiments describe the case where the same communication terminal device is used for e-ticket purchase and for package purchase. Instead, different kinds of communication terminal devices may be used for e-ticket purchase and for package purchase. As an example, a PDA is used for e-ticket purchase, whereas a mobile phone is used for package purchase.

(5) The above embodiments describe the case where the communication terminal device and the playback device are separate devices in the first subsystem. However, if a network-connectable playback device is employed, the communication terminal device can be omitted.

FIG. 51 shows a construction of a playback device 350 according to this modification. The following explanation focuses on the differences from the playback device 300 in the first embodiment.

In FIG. 51, the playback device 350 includes an input unit 351, a control unit 352, an output unit 353, a send/receive unit 354, a first access unit 355, and a second access unit 356.

The playback device 350 is actually realized by a computer system that includes a microprocessor, a ROM, a RAM, and a hard disk unit. The functions of the playback device 350 are realized by the microprocessor executing a computer program stored in the ROM or the hard disk unit.

The input unit 351 has the functions of the input unit 301 shown in FIG. 7. In addition, at the time of e-ticket purchase, the input unit 351 receives a title ID, ticket payment information, and cancel information. At the time of package purchase, the input unit 351 receives a title ID, package payment information, and cancel information.

The control unit 352 has the functions of the control unit 302 shown in FIG. 7. In addition, the control unit 352 has the functions of the control unit 202 in the communication terminal device 200 shown in FIG. 6 for e-ticket purchase and package purchase. The control unit 352 outputs, to the output unit 353, ticket purchase confirmation information, ticket purchase completion information, and ticket purchase cancel information received from the e-ticket sales device. The control unit 352 also outputs, to the output unit 353, package purchase confirmation information, package purchase completion information, and package purchase cancel information received from the package sales device.

The output unit 353 has the functions of the output unit 303 shown in FIG. 7. In addition, at the time of e-ticket purchase, the output unit 353 outputs a message indicating receipt of ticket purchase confirmation information, ticket purchase completion information, or ticket purchase cancel information, to a display device connected to the playback device 350. Also, at the time of package purchase, the output unit 353 outputs a message indicating receipt of package purchase confirmation information, package purchase completion information, or package purchase cancel information, to the display device.

The send/receive unit 354 has the functions of the send/receive unit 205 in the communication terminal device 200 shown in FIG. 6.

The first access unit 355 is the same as the first access unit 304 shown in FIG. 7. The second access unit 356 is the same as the second access unit 305 shown in FIG. 7. Accordingly, an explanation thereof has been omitted here.

With the provision of a network-connectable playback device, it becomes possible to purchase an e-ticket and a package using the playback device, and to store a purchase incentive in an internal memory unit. Also, information stored in a package can be received through a network without using a storage medium, and stored in the internal memory unit.

(6) The above embodiments may be modified such that the memory card further includes a package purchase history storage unit. At the time of package purchase, a list of unpurchased packages is generated with reference to the e-ticket information storage unit and the package purchase history storage unit, and displayed in a display unit. The displayed list helps the user select a package which he or she wants to purchase.

This keeps the user from purchasing the same packages by mistake.

(7) The above embodiments describe the case where personal information is registered in the movie company management device, but personal information may instead be registered in the memory card. This being so, at the time of e-ticket purchase, e-ticket use, and package purchase, necessary information is sent from the memory card to the movie company management device, via the e-ticket sales device, the e-ticket confirmation device, and the package sales device.

Alternatively, if the credit company's billing device is employed, as noted in the modification (2), necessary information may be obtained from personal information managed in the credit company at the time of e-ticket purchase, e-ticket use, and package purchase.

(8) The above embodiments describe the case where the movie company management device is connected with the e-ticket sales devices, the e-ticket confirmation devices, and the package sales devices by dedicated lines, but they may be connected by other networks such as the Internet.

(9) The second embodiment describes the case where the memory card is inserted in the incentive provision device to provide an incentive, though this is not a limit for the invention. For example, the communication terminal device and the incentive provision device may be connected by the Internet or the like so that an incentive can be sent from the incentive provision device to the communication terminal device.

The second embodiment describes the case where the incentive provision device provides a purchase incentive and a use incentive, but this is not a limit for the invention. For example, the incentive provision device and the e-ticket confirmation device may respectively provide a purchase incentive and a use incentive. Alternatively, the e-ticket sales device and the incentive provision device may respectively provide a purchase incentive and a use incentive.

(10) The above embodiments describe the case where an e-ticket is purchased using the network-connected communication terminal device, but the invention is not limited to such. For example, an e-ticket may be purchased using an e-ticket sales device that is installed in a ticket shop. Such an e-ticket sales device can have a memory card inserted. When the memory card is inserted in the e-ticket sales device, the memory card performs authentication. After this, the e-ticket sales device receives a title ID of a movie for which the user wants to purchase an e-ticket, and generates ticket purchase confirmation information based on the title ID. The e-ticket sales device displays the ticket purchase confirmation information, and also temporarily stores the ticket purchase confirmation information. The e-ticket sales device then receives ticket payment information or cancel information from the user. If the received information is the ticket payment information, the e-ticket sales device conducts the following operations based on the ticket payment information and the temporarily-stored ticket purchase confirmation information. Firstly, the e-ticket sales device performs a ticket billing operation. Secondly, the e-ticket sales device writes purchased ticket information, purchase incentive information, and audio data of a movie trailer to the memory card. Thirdly, the e-ticket sales device discards the temporarily-stored ticket purchase confirmation information. Fourthly, the e-ticket sales device generates and sends ticket sales information. If the received information is the cancel information, on the other hand, the e-ticket sales device discards the temporarily-stored ticket purchase confirmation information.

As an alternative, a ticket shop or the like may sell a memory card on which an e-ticket is stored, or provide such a memory card as a supplement to a book or a magazine. In this case, the memory card stores a card ID for identifying the memory card, instead of a user ID. The movie company management device manages user information based on card IDs.

(11) The above embodiments describe the case where audio data of a movie trailer is provided as an incentive of purchasing an e-ticket, but the invention is not limited to such. For example, video data of the movie trailer may be provided as a purchase incentive. In this case, the audio data of the movie trailer is stored in a package. To play back the movie trailer, the playback device reads the video data from the memory card via the first access unit, and reads the audio data from the package via the second access unit. The playback device plays back the video data and the audio data in sync with each other in the control unit.

Alternatively, the audio data and video data of the movie trailer may both be provided as a purchase incentive. In such a case, the movie trailer is played back from the memory card alone.

Also, a purchase incentive is not limited to a movie trailer. For instance, a behind-the-scenes featurette or cast information, or a combination of these may be provided as a purchase incentive. Information used here may be one or both of audio data and video data. When providing only audio data, video data is stored in a package. When providing only video data, audio data is stored in a package.

An example playback operation when audio data and video data of a behind-the-scenes featurette are stored respectively in a memory card and a package is explained below.

The playback device receives a title ID and a request to playback a behind-the-scene featurette. The playback device judges whether an audio data name of the behind-the-scenes featurette corresponding to the title ID exists in the memory card. If not, the playback device outputs playback prohibition information. Otherwise, the playback device judges whether the title ID matches a title ID in the package. If they do not match, the playback device outputs playback prohibition information. If they match, the playback device plays back the behind-the-scenes featurette. To play back the featurette, the playback device reads the audio data of the featurette corresponding to the audio data name from the memory card and the video data of the featurette from the package, and outputs the audio data and the video data in sync with each other to a display device of a television or the like to which the playback device is connected.

(12) The above embodiments describe the case where a discount is made on a package. However, a discount may also be made on an e-ticket. Further, a discount may be made on simultaneous purchase of an e-ticket and a package.

An example operation of making a discount on an e-ticket is explained below. Suppose the user is billed when ordering the e-ticket. Upon receipt of ticket order information, the e-ticket sales device calculates a selling price of the e-ticket based on ticket discount data, and generates ticket purchase confirmation information which includes the selling price. Suppose, on the other hand, only a reservation is made when ordering the e-ticket. In this case, when the user uses the e-ticket, the e-ticket confirmation device calculates the selling price of the e-ticket based on the ticket discount data, and notifies the user of the selling price.

An example operation of making a discount on simultaneous purchase of an e-ticket and a package is explained below. The user sends ticket and package order information to the e-ticket sales device using the communication terminal device. The e-ticket sales device calculates a selling price of the e-ticket based on ticket and package discount data, and generates ticket purchase confirmation information which includes the selling price and the ticket and package discount data. The e-ticket sales device sends the ticket purchase confirmation information to the communication terminal device. When purchasing the package, the package sales device calculates a selling price of the package based on the ticket and package discount data.

In this example, the selling price of the e-ticket and the selling price of the package are separately calculated. Instead, the e-ticket sales device and the package sales device may be incorporated to notify the user of a total selling price of the e-ticket and the package when the user purchases the e-ticket.

Here, both a purchase incentive and a use incentive may be provided as an incentive of simultaneously purchasing the e-ticket and the package.

(13) The above embodiments describe the case where audio data of a package trailer is provided as an incentive of using an e-ticket, but the invention is not limited to such. For example, video data of the package trailer may be provided as a use incentive. In this case, the audio data of the package trailer is stored in a package. This being so, the playback device reads the video data from the memory card via, the first access unit, reads the audio data from the package, via the second access unit, and plays back the video data and the audio data in sync with each other in the control unit.

Alternatively, the audio data and video data of the package trailer may both be provided as a use incentive. In such a case, the playback device plays back the package trailer from the memory card alone.

Also, a use incentive is not limited to a package trailer. For example, a behind-the-scenes featurette or a combination of the package trailer and the featurette may be provided as a use incentive. Information used here may be one or both of audio data and video data. When providing only audio data, video data is stored in a package. When providing only video data, audio data is stored in the package.

An example playback operation when audio data and video data of a behind-the-scenes featurette are respectively stored in a memory card and a package is explained below.

The playback device receives a title ID and a request to play back a behind-the-scenes featurette. The playback device judges whether an audio data name of the behind-the-scenes featurette corresponding to the title ID exists in the memory card. If not, the playback device outputs playback prohibition information. Otherwise, the playback device judges whether the title ID matches a title ID in the package. If they do not match, the playback device outputs playback prohibition information. If they match, the playback device plays back the behind-the-scenes featurette. To play back the featurette, the playback device reads the audio data of the featurette corresponding to the audio data name from the memory card, reads the video data of the featurette from the package, and outputs the audio data and the video data in sync with each other to a display device of a television or the like to which the playback device is connected.

(14) As an incentive of purchasing an e-ticket or an incentive of using the e-ticket, a discount may be made on an e-ticket or package of another movie made by the same movie company. In this case, the memory card further includes a discount information storage unit for storing such discount information. This discount information storage unit has an area for storing at least one record that is made up of: a title ID; ticket discount data; and package discount data. The title ID identifies a movie. The ticket discount data shows a discount on an e-ticket of the movie. The package discount data shows a discount on a package of the movie.

When purchasing an e-ticket, the communication terminal device judges whether ticket discount data corresponding to a received title ID exists in the discount information storage unit. If so, the communication terminal device generates ticket order information which includes the ticket discount data, and sends the ticket order information to the e-ticket sales device. The e-ticket sales device calculates a selling price of the e-ticket using the ticket discount data. The e-ticket sales device generates ticket purchase confirmation information and sends it to the communication terminal device. The e-ticket sales device registers the calculated selling price in a ticket billing operation which follows.

When purchasing a package, the communication terminal device judges whether ticket information corresponding to a received title ID exists in the e-ticket information storage unit, and whether package discount data corresponding to the title ID exists in the discount information storage unit. If the ticket information does not exist while the package discount data exists, then the communication terminal device (i) generates package order information, which includes a user ID, the title ID, and the package discount data, and (ii) sends the package order information to the package sales device. The package sales device calculates a selling price of the package using the package discount data. The package sales device generates package purchase confirmation information and sends it to the communication terminal device. The package sales device registers the calculated selling price in a package billing operation which follows.

In the above example, the package discount data in the discount information storage unit is not used if the ticket information exists. However, this can be modified to use the package discount data in the discount information storage unit even when the ticket information exists.

(15) The above embodiments describe the case where an incentive of using an e-ticket is provided by writing use incentive information to the memory card on which the e-ticket is stored. However, the invention should not be limited to this. For example, a memory card on which use incentive information is stored may be given to every visitor in a movie theater.

In so doing, users of paper tickets can enjoy the incentive too, with it being possible to expand package sales.

(16) The above embodiments describe the case where a package is purchased through the network-connected communication terminal device, though the invention should not be limited to such. For example, a package may be purchased using a package sales device which is installed in a package shop. This modification is explained below, focusing on the differences from the package sales device 700a in the first embodiment.

A package sales device according to this modification includes a shop ID storage unit, a public key storage unit, a package billing information storage unit, a package sales unit, an input unit, a display unit, an input/output unit, and a first send/receive unit.

This package sales device is actually realized by a computer system that includes a microprocessor, a ROM, a RAM, a hard disk unit, a display unit, a keyboard, a mouse, and a modem. The functions of the package sales device are realized by the microprocessor executing a computer program stored in the ROM or the hard disk unit.

The input unit receives a password for authentication and outputs it to the package sales unit, when the memory card is inserted in the package sales device. When purchasing a package, the input unit receives a title ID and outputs it to the package sales unit. Also, the input unit receives package payment information or cancel information, and outputs the received information to the package sales unit.

The package sales unit outputs a received password to the memory card via the input/output unit, in authentication of the memory card. The package sales unit then receives an authentication result from the memory card, and outputs the authentication result to the display unit. When purchasing a package, the package sales unit generates package purchase confirmation information based on information stored in the memory card, and outputs the package purchase confirmation information to the display unit. The package sales unit then receives either package payment information or cancel information. When receiving the package payment information, the package sales unit generates package billing information, and writes the package billing information to the package billing information storage unit. The package sales unit also generates package sales information, and sends the package sales information to the movie company management device via the first send/receive unit. The package sales unit further generates package purchase completion information and outputs it to the display unit. When receiving the cancel information, on the other hand, the package sales unit discards the package purchase confirmation information, generates package purchase cancel information, and outputs it to the display unit.

The display unit displays information received from the package sales unit.

The input/output unit outputs information received from the package sales unit, to the memory card. Also, the input/output unit outputs information received from the memory card, to the package sales unit.

The other construction elements are the same as those in the package sales device 700a in the first embodiment, so that their explanation has been omitted.

An operation of this package sales device installed in the package shop is explained below.

In authentication of the memory card, the package sales device operates in the same way as in the first embodiment, so that its explanation has been omitted.

The package sales device receives a title ID, and searches the e-ticket information table in the memory card for a record corresponding to the title ID. If the record does not exist, the package sales device outputs purchase prohibition information. If the record exists, the package sales device judges whether an e-ticket has been used based on the theater ID field and the second signature data field of the record. If the e-ticket has not been used, then the package sales device conducts step S535 onwards in the package order reception operation shown in FIG. 31. If the e-ticket has been used, then the package sales device conducts step S510 onwards in the package order reception operation shown in FIG. 31. Here, the package order reception operation shown in FIG. 31 is modified to display generated package purchase confirmation information in the display unit.

Following this, the package sales device receives package payment information or cancel information. Based on the received information, the package sales device generates package billing request information or package billing cancel information, and conducts step S575 onwards in the package billing operation shown in FIG. 32. Here, the package billing operation shown in FIG. 32 is modified to display generated package purchase completion information or package purchase cancel information in the display unit.

(17) The second embodiment describes the case where no discount is made on a package if the user has not been provided with an incentive, but the invention is not limited to such. If the user has used an e-ticket, the user may be regarded as being entitled to the incentive, and accordingly receive a package discount. If the user has not used the e-ticket, the user may receive a package discount corresponding to the ticket-unused case.

(18) The above embodiments describe the case where the communication terminal device receives an Internet address in the input unit to connect to the e-ticket sales device or the package sales device via the Internet. However, the invention is not limited to this. For example, the communication terminal device may store Internet addresses of the e-ticket sales device and the package sales device beforehand.

In this case, upon receiving a request to connect to the e-ticket sales device in the input unit, the communication terminal device connects to the e-ticket sales device, via the Internet, using the Internet address of the e-ticket sales device stored beforehand. Also, upon receiving a request to connect to the package sales device in the input unit, the communication terminal device connects to the package sales device, via the Internet, using the Internet address of the package sales device stored beforehand.

(19) The above embodiments describe the case where package discount data is provided when purchasing an e-ticket, but the invention is not limited to such. For example, the package discount data may be provided when using the e-ticket. In this case, if the user purchases a package without using the e-ticket, then the communication terminal device sends package order information which includes null package discount data to the package sales device. The package sales device stores package discount data corresponding to the ticket-unused case beforehand, and calculates a selling price of the package using this package discount data.

As an alternative, the package discount data corresponding to the ticket-unused case is provided when purchasing the e-ticket, and the package discount data corresponding to the ticket-used case described in the above embodiments is provided when using the e-ticket. When purchasing a package, the communication terminal device sends package order information which includes both package discount data. The package sales device calculates a selling price of the package, based on pertinent package discount data. Alternatively, the communication terminal device may send package order information which includes only pertinent package discount data, so that the package sales device calculates the selling price of the package using the received package discount data.

(20) The above embodiments describe a situation where, if an e-ticket has not been used at the time of package purchase, then the package sales device does not judge whether the e-ticket has expired. However, the package sales device may perform the judgment. If the e-ticket has expired, then the package sales device uses package discount data corresponding to the ticket-unused case. If the e-ticket has not expired, the package sales device notifies the communication terminal device that the e-ticket has not expired, to inquire of the user whether he or she wants to purchase the package. If the package sales device receives a request to purchase the package, then the package sales device uses the package discount data corresponding to the ticket-unused case. If the package sales device receives a request to cancel the purchase, then the package sales device cancels the purchase.

This allows the user to avoid purchasing the package without using the e-ticket and thereby failing to enjoy an incentive.

(21) The procedure of e-ticket purchase and the procedure of package purchase are not limited to the above embodiments. For instance, at the time of e-ticket purchase the communication terminal device may send ticket order information including a payment method to the e-ticket sales device, so that the e-ticket sales device conducts all operations concerning the e-ticket purchase such as a ticket billing operation at a time. Also, at the time of package purchase the communication terminal device may send package order information including a payment method to the package sales device, so that the package sales device conducts all operations concerning the package purchase such as a package billing operation at a time.

In this case, upon receiving the ticket order information including the payment method, the e-ticket sales device performs the ticket billing operation. The e-ticket sales device generates ticket sales information and sends it to the movie company management device. The e-ticket sales device further generates ticket purchase confirmation information and ticket purchase determination information, and sends them to the communication terminal device. Upon receiving the ticket purchase confirmation information and the ticket purchase determination information, the communication terminal device generates purchased ticket information and purchase incentive information using the received information. The communication terminal device registers the purchased ticket information and the purchase incentive information respectively to the e-ticket information table and the purchase incentive information table. The communication terminal device also displays the ticket purchase confirmation information and ticket purchase completion information which is included in the ticket purchase determination information.

Likewise, upon receiving the package order information including the payment method, the package sales device performs the package billing operation. The package sales device generates package sales information and sends it to the movie company management device. The package sales device further generates package purchase confirmation information and package purchase completion information, and sends them to the communication terminal device. Upon receiving the package purchase confirmation information and the package purchase completion information, the communication terminal device displays the package purchase confirmation information and the package purchase completion information.

(22) The above embodiments describe the case where the memory card stores the e-ticket information table, the purchase incentive information table, and the use incentive information table separately, but the invention is not limited to this. For instance, the three tables may be integrated as one table, or two out of the three tables may be integrated as one table.

(23) The above embodiments describe the case where once an e-ticket has been used, a theater ID and second signature data indicating the use of the e-ticket is added to purchased ticket information in the e-ticket information table. However, the invention is not limited to this. Once the e-ticket has been used, the purchased ticket information may be replaced with used ticket information which is made up of: a title ID; an expiration date; a theater ID; and second signature data.

(24) The above embodiments describe the case where at the time of package purchase the communication terminal device sends package discount data, exclusive data, and additional information to the package sales device to receive incentives such as a discount. However, the invention is not limited to such. For instance, the package sales device may store the package discount data, the exclusive data, and the additional information beforehand. This being so, when receiving package order information including a user ID, a title ID, an expiration date, a theater ID, and second signature data from the communication terminal device, the package sales device judges whether an e-ticket has been used. If the e-ticket has been used, the package sales device determines a selling price and type of the package based on the stored information.

(25) Next-generation optical disc recording and playback devices (hereafter referred to as "BD recorders") that can be connected to a network are expected to come into widespread use in near future. Meanwhile, movie companies commonly employ maximum profit strategies (hereafter "media mix strategies") by combining promotional activities before release of a movie, showing of the movie at movie theaters, and subsequent sales of package media of the movie. Conventional e-ticket systems, however, do not support such media mix strategies. Therefore, the movie ticket sales and the package sales remain independent of each other. Accordingly, even if a person watched a movie in a movie theater, he or she cannot get a discount on a package of the movie. Though credit cards offer points and coupons, they cannot be used specifically to get a discount on a package of a movie which a person saw in a movie theater.

In view of this, the above embodiments may be modified to form an e-ticket system suitable for media mix strategies, by constituting the first subsystem of a network-connectable BD recorder and a portable storage medium. As one example, the portable storage medium is a memory card having IC card functions.

An e-ticket can be purchased by receiving the e-ticket and information about an incentive such as package discount data through the network-connectable BD recorder, as in the above embodiments. At the time of e-ticket purchase, movie-related information such as an exclusive Web message board, a movie memorabilia purchase right, a latest behind-the-scenes featurette, and a latest movie trailer is added to the e-ticket as purchase incentives to allow the user to use such movie-related information before movie release. By storing such an e-ticket and movie-related information on the portable storage medium, the user can not only use the movie-related information using the BD recorder and but also take the e-ticket to the movie theater.

When the user uses the e-ticket in the movie theater, information indicating the use of the e-ticket is added to the e-ticket, as in the above embodiments. This enables the user to later purchase BD package software at a discount price.

In this way, the user can use various movie-related information using the BD recorder before movie release. Also, once the user has seen the movie in the movie theater, he or she can purchase BD package software of the movie at a discount price.

Also, the movie company can apply this e-ticket system to its media mix strategies. Further, the movie company can directly sell e-tickets and BD packages without involving middlemen, which benefits marketing.

(26) The above embodiments may be modified to use a network-connectable playback device. Such a playback device may be used to purchase electrical package data from the package sales device or the movie company management device via a network such as the Internet. The received package data may then be recorded on a disk or the like.

Alternatively, the network-connectable BD recorder described in the modification (25) may be used to purchase electrical package data from the package sales device or the movie company management device via a network such as the Internet. The received package data may then be recorded on a disk or the like.

(27) The above embodiments describe the case where the memory card performs authentication, but such authentication may be omitted. Also, if authentication is unnecessary, then a memory card without IC card functions may be used. Alternatively, a recording medium such as an optical disc may be used instead of a memory card.

(28) The method of providing a package is not limited to the above embodiments. For instance, a package may be sold in a movie theater. In this case, the e-ticket confirmation device has a package sales function.

For example, the package sales function is the following. The e-ticket confirmation device receives package discount data and information indicating use of an e-ticket for a movie corresponding to the package, from the memory card inserted in the e-ticket confirmation device. The e-ticket confirmation device then conducts a process of selling the package based on the received information and package discount data.

As a result, once the user has seen the movie in the movie theater, he or she can immediately purchase the package in the movie theater using the used e-ticket. The playback of the purchased package becomes possible after a predetermined time period. An example of this modification is given below.

The playback device has a date and time clock. Also, the package stores playback permission information showing a date (and a time) at which the playback of the package becomes possible. The playback device compares the playback permission information with the clock, to judge whether the playback of the package is possible. If so, the playback device plays back the package.

This makes it possible to realize new package provision.

(29) The functions of the e-ticket confirmation device are not limited to those in the above embodiments. For example, the e-ticket confirmation device may have a function of offering or selling exclusive content (hereafter "premium content") that can be viewed only by those who have used e-tickets.

In this case, when the memory card is inserted, the e-ticket confirmation device judges whether an e-ticket for a movie corresponding to premium content has been used. If the e-ticket has been used, then the e-ticket confirmation device performs a process of offering or selling the premium content.

Here, the playback of the premium content may be permitted at once, or after a predetermined time period as in the modification (28).

Also, the e-ticket confirmation device may offer or sell not only premium content but also movie-related services or goods such as a toy.

(30) The above embodiments describe the case where an incentive is provided at the time of e-ticket purchase and at the time of e-ticket use, but the invention is not limited to such. For instance, an incentive may be provided at the time of package purchase, too. Examples of such an incentive include premium content, a right to purchase premium content, a right to purchase movie memorabilia such as a toy, an address of a network service, and a login name and password for receiving such a network service.

(31) The above embodiments describe the case where video data of a movie trailer and video data of a package trailer are stored in a purchased package, but this is not a limit for the invention. Apart from provision of audio data of the movie trailer, a package which stores a title ID and the video data of the movie trailer may be provided before movie release. Likewise, apart from provision of audio data of the package trailer, a package which stores a title ID and the video data of the package trailer may be provided before package release. For example, a package which stores the title ID and the video data of the movie trailer, a package which stores the title ID and the video data of the package trailer, or a package which stores the title ID, the video data of the movie trailer, and the video data of the package trailer may be provided as a supplement to a book or a magazine.

(32) The above embodiments describe the case where an incentive of purchasing an e-ticket is provided once, but the invention is not limited to such. For example, if the incentive provision device of the second embodiment is network-connected with the communication terminal device, purchase incentive information corresponding to the same title ID can be provided a plurality of times. In this case, an operator of the incentive provision device updates purchase incentive information stored in the purchase incentive management table. The user network-connects the communication terminal device in which the memory card is inserted, to the incentive provision device via the Internet. The communication terminal device receives purchase incentive request information from the user. The communication terminal device searches the e-ticket information table for a record corresponding to a title ID included in the purchase incentive request information. The communication terminal device sends the purchase incentive request information and an expiration date, first signature data, and a shop ID included in the record, to the incentive provision device. The incentive provision device obtains a public key corresponding to the shop ID, and verifies the first signature data using the public key. If the first signature data is valid, then the incentive provision device searches the purchase incentive management table for a record corresponding to the title ID, and sends information included in the record to the communication terminal device. The communication terminal device replaces purchase incentive information stored therein, with the received information.

Here, a network-connectable playback device may be used instead of the communication terminal device.

In the above example, the incentive is obtained according to the instruction from the user. Alternatively, a program for obtaining the incentive may be stored in the memory card in advance. In this case, when the memory card is inserted in the network-connectable playback device to use an incentive stored in the memory card, the program is activated to obtain a new incentive from the incentive provision device.

In the same manner, an incentive of using an e-ticket may be updated. In this case, the communication terminal device sends use incentive request information and an expiration date, second signature data, and a theater ID corresponding to a title ID included in the use incentive request information, to the incentive provision device. The incentive provision device verifies the second signature data. If the second signature data is valid, then the incentive provision device provides a new incentive.

Here, the incentive provision device and the movie company management device may be integrated as one device.

(33) The movie company management device, the e-ticket sales device, the e-ticket confirmation device, and the package sales device may be integrated as one device.

(34) An additional incentive may be provided when purchasing a package. For instance, if the package is in series, information about the next movie may be added as an incentive. Also, information about another movie may be added as an incentive.

(35) The above embodiments describe the case where e-ticket purchase, e-ticket use (i.e., see a movie in a movie theater), and package purchase come in this order, but this may be reordered to e-ticket purchase, package purchase, and e-ticket use. In this case, an incentive such as information about another movie is added at the time of package purchase.

(36) The above embodiments describe a situation where, if the user has not used an e-ticket, a selling price of a package corresponding to the ticket-unused case is calculated based on the package discount data, but the invention is not limited to this. If the user has not used the e-ticket, then the selling price of the package may be set by subtracting a selling price of the e-ticket from a regular price of the package.

(37) An e-ticket purchased from the e-ticket sales device may be used not only for seeing a movie but also for obtaining a package.

For example, this modification applies to a case where the user simultaneously purchases the e-ticket and the package. In this case, actually the package is not yet purchased but a reservation for later purchase is made. Such simultaneous purchase is already explained in the modification (12). When the user makes simultaneous purchase, both purchase incentive information and use incentive information may be provided to the user. When receiving package order information, the package sales device determines a selling price of the package using ticket and package discount data included in the package order information. Here, if the e-ticket has not been used for seeing the movie, then the selling price of the package may be set by subtracting a selling price of the e-ticket from a regular price of the package. Here, second signature data and a theater ID included in the package order information are used to judge whether the e-ticket has been used for seeing the movie, as in the above embodiments.

As another example, the e-ticket may store information indicating that the e-ticket can be used for both seeing the movie and obtaining the package. Through the use of this e-ticket, the user can purchase the package and then see the movie.

Conventionally, there is no e-ticket that can be used for both seeing a movie and obtaining a package. The e-ticket according to this modification, however, can be used for both purposes. Also, a different discount can be made on a package depending on the contents of the e-ticket, such as a discount described in the above embodiments, a discount for simultaneous purchase, or a discount equivalent to a selling price of the e-ticket in a case where the e-ticket has not been used for seeing the movie. This enhances user convenience.

(38) The communication terminal device may send package order information which further includes a shop ID and first signature data included in a record in the e-ticket information table corresponding to a received title ID. This being the case, the package sales device performs the following operation if an e-ticket has not been used. The package sales device stores shop IDs of ticket shops and public keys given from the ticket shops, in correspondence with each other. The package sales device obtains a public key corresponding the shop ID included in the package order information, and verifies the first signature data in the package order information using the public key to judge whether the e-ticket is valid. If the e-ticket is valid, the package sales device determines a selling price of the package corresponding to the ticket-unused case. If the e-ticket is invalid, the package sales device generates package purchase prohibition information and sends it to the communication terminal device.

(39) The invention also applies to the methods used by the devices described above. These methods may be realized by a computer program that is executed by a computer. Such a computer program may be distributed as a digital signal.

The invention may be realized by a computer-readable storage medium, such as a flexible disk, a hard disk, a CD-ROM, an MO, a DVD, a DVD-ROM, a DVD-RAM, a BD, or a semiconductor memory, on which a computer program and/or digital signal mentioned above is recorded. Conversely, the invention may also be realized by a computer program and/or digital signal that is recorded on a storage medium.

A computer program or digital signal that achieves the invention may also be transmitted via a network, such as an electronic communications network, a wired or wireless communications network, or the Internet.

The invention can also be realized by a computer system that includes a microprocessor and a memory. In this case, a computer program can be stored in the memory, with the microprocessor operating in accordance with this computer program.

The computer program and/or digital signal may be provided to an independent computer system by distributing a storage medium on which the computer program and/or digital signal is recorded, or by transmitting the computer program and/or digital signal via a network. The independent computer system may then execute the computer program and/or digital signal to function as the invention.

(40) The above embodiments and the modifications may be freely combined.

Although the present invention has been fully described by way of examples with reference to the accompanying drawings, it is to be noted that various changes and modifications will be apparent to those skilled in the art.

Therefore, unless such changes and modifications depart from the scope of the present invention, they should be construed as being included therein.

What is claimed is:

1. A method used by an electronic ticket system comprising a first subsystem including a communication terminal device and a playback device, and comprising a second subsystem including an e-ticket sales device, wherein the communication terminal device executes:
a purchase requesting step of transmitting, to the e-ticket sales device, a purchase request to purchase an e-ticket to be used for seeing a movie;
a receiving step of receiving, in accordance with the purchase request, the e-ticket and audio data related to the movie without receiving video data related to the movie, the e-ticket and the audio data related to the movie being received from the e-ticket sales device after the purchase requesting step transmits the purchase request to purchase the e-ticket; and
a first recording step of (i) recording, onto a memory card attached to the communication terminal device, the e-ticket and the audio data received in the receiving step, and (ii) recording, onto the memory card attached to the communication terminal device, a table storing an audio data name of the received audio data and a title ID identifying the movie in correspondence with each other, wherein the e-ticket sales device executes:
a sending step of, upon receiving the purchase request from the communication terminal device, sending the e-ticket and the audio data to the communication terminal device, and wherein the playback device executes:
an instruction receiving step of receiving playback request information that includes (i) a request to play back the audio data and the video data related to a requested movie in sync with each other and (ii) a title ID identifying the requested movie;
a first judging step of judging whether a table recorded in a memory card attached to the playback device stores the audio data name of the audio data related to the requested movie that corresponds to the title ID included in the playback request information;
a second judging step of judging whether the title ID included in the playback request information matches the title ID of a movie recorded in a package purchased at a different timing from a timing of the purchase of the e-ticket;
a first accessing step of acquiring, when the first judging step judges that the table stores the audio data name that corresponds to the title ID included in the playback request information, the audio data indicated by the audio data name stored in the table recorded in the memory card attached to the playback device, the audio data acquired by the first accessing step being acquired from the memory card attached to the playback device;

a second accessing step of acquiring, when the second judging step judges that the title ID included in the playback request information matches the title ID of the movie recorded in the package, the video data related to the movie recorded in the package, the video data being acquired by the second accessing step from the package; and a playback step of playing back the audio data acquired in the first accessing step and the video data acquired in the second accessing step in synchronization with each other.

2. The method of claim 1, wherein the second subsystem further includes an e-ticket confirmation device, wherein the e-ticket confirmation device executes:

a judging step of judging whether the e-ticket included in the memory card attached to the e-ticket confirmation device is valid; and a second recording step of recording, when the judging step judges affirmatively, the audio data related to the movie recorded in the purchased package onto the memory card attached to the e-ticket confirmation device, and wherein the playback device further executes a step of acquiring the audio data related to the movie recorded in the purchased package from the memory card attached to the playback device, acquiring the video data related to the movie recorded in the purchased package from the purchased package, and playing back the audio data related to the movie recorded in the purchased package and the video data related to the movie recorded in the purchased package in synchronization with each other.

3. The method of claim 2, wherein the second subsystem further includes a package sales device for selling the purchased package, and wherein the package sales device executes a price deciding step of deciding a sales price of the purchased package after discounting the sales price when an unused e-ticket or a used e-ticket has been recorded in the memory card attached to the e-ticket confirmation device.

4. A method used by a first subsystem including a communication terminal device and a playback device, wherein the communication terminal device executes:

a purchase requesting step of transmitting, to an e-ticket sales device included in a second subsystem that is a subsystem other than the first subsystem, a purchase request to purchase an e-ticket to be used for seeing a movie;

a receiving step of receiving, in accordance with the purchase request, the e-ticket and audio data related to the movie without receiving video data related to the movie, the e-ticket and the audio data related to the movie being received from the e-ticket sales device after the purchase requesting step transmits the purchase request to purchase the e-ticket; and a first recording step of recording, onto a memory card attached to the communication terminal device, the e-ticket and the audio data received in the receiving step, and wherein the playback device executes:

an instruction receiving step of receiving playback request information that includes (i) a request to play back the audio data and the video data related to a requested movie in sync with each other and (ii) a title ID identifying the requested movie;

a first judging step of judging whether a table recorded in a memory card attached to the playback device stores the audio data name of the audio data related to the requested movie that corresponds to the title ID included in the playback request information;

a second judging step of judging whether the title ID included in the playback request information matches the title ID of a movie recorded in a package purchased at a different timing from a timing of the purchase of the e-ticket;

a first accessing step of acquiring, when the first judging step judges that the table stores the audio data name that corresponds to the title ID included in the playback request information, the audio data indicated by the audio data name stored in the table recorded in the memory card attached to the playback device, the audio data acquired by the first accessing step being acquired from the memory card attached to the playback device;

a second accessing step of acquiring, when the second judging step judges that the title ID included in the playback request information matches the title ID of the movie recorded in the package, the video data related to the movie recorded in the package, the video data being acquired by the second accessing step from the package; and a playback step of playing back the audio data acquired in the first accessing step and the video data acquired in the second accessing step in synchronization with each other.

5. The method of claim 4, wherein the memory card is attached to an e-ticket confirmation device included in the second subsystem, wherein the e-ticket confirmation device executes a second recording step of recording the audio data related to the movie recorded in the purchased package onto the memory card attached to the e-ticket confirmation device when the e-ticket confirmation device judges that the e-ticket included in the memory card attached to the e-ticket confirmation device is valid, and wherein the playback device further executes a step of acquiring the audio data related to the movie recorded in the purchased package from the memory card attached to the playback device, acquiring the video data related to the movie recorded in the purchased package from the purchased package, and playing back the audio data related to the movie recorded in the purchased package and the video data related to the movie recorded in the purchased package in synchronization with each other.

6. A method used by a second subsystem including an e-ticket sales device for selling e-tickets of movies, wherein the e-ticket sales device executes a sending step of, upon receiving a purchase request to purchase an e-ticket of a movie from a communication terminal device that exists outside of the second subsystem, sending the e-ticket and audio data related to the movie without sending video data related to the movie, the e-ticket and the audio data related to the movie being sent to the communication terminal device after the purchase request to purchase the e-ticket is received, wherein the e-ticket and the audio data are recorded on a memory card by the communication terminal device, a table storing an audio data name of the audio data and a title ID identifying the movie in correspondence with each other is recorded on the memory card by the communication terminal device, and in the playback device:
playback request information is received, the playback request information including (i) a request to play back the audio data and the video data related to a requested movie in sync with each other, and (ii) the title ID identifying the requested movie;
a first judgment is made as to whether the table recorded in the memory card attached to the playback device stores the audio data name of the audio data related to the requested movie that corresponds to the title ID included in the playback request information;
a second judgment is made as to whether the title ID included in the playback request information matches the title ID of a movie recorded in a package purchased at a different timing from a timing of the purchase of the e-ticket;
when the first judgment judges that the table stores the audio data name that corresponds to the title ID included in the playback request information, the audio data indicated by the audio data name stored in the table recorded in the memory card attached to the playback device is acquired from the memory card attached to the playback device;
when the second judgment judges that the title ID included in the playback request information matches the title ID of the movie recorded in the package, the video data related to the movie recorded in the package is acquired from the package; and
the audio data acquired from the memory card attached to the playback device and the video data acquired from the package are played back in synchronization with each other.

7. The method of claim 6,
wherein the second subsystem further includes an e-ticket confirmation device,
wherein the e-ticket confirmation device executes:
a judging step of judging whether the e-ticket included in the memory card attached to the e-ticket confirmation device is valid; and
a recording step of recording, when the judging step judges affirmatively, the audio data related to the movie recorded in the purchased package onto the memory card attached to the e-ticket confirmation device, and
wherein the audio data related to the movie recorded in the purchased package is played back in synchronization with the video data related to the movie recorded in the purchased package.

8. The method of claim 7,
wherein the second subsystem further includes a package sales device for selling the purchased package, and
wherein the package sales device executes a price deciding step of deciding a sales price of the purchased package after discounting the sales price when an unused e-ticket or a used e-ticket has been recorded in the memory card attached to the e-ticket confirmation device.

9. An electronic ticket system comprising a first subsystem including a communication terminal device and a playback device and comprising a second subsystem including an e-ticket sales device,
wherein the communication terminal device includes:
a purchase request unit operable to transmit, to the e-ticket sales device, a purchase request to purchase an e-ticket to be used for seeing a movie;
a receiving unit operable to receive, in accordance with the purchase request, the e-ticket and audio data related to the movie without receiving video data related to the movie, the e-ticket and the audio data related to the movie being received from the e-ticket sales device after the purchase request unit transmits the purchase request to purchase the e-ticket; and
a first recording unit operable to (i) record, onto a memory card attached to the communication terminal device, the e-ticket and the audio data received by the receiving unit, and (ii) record, onto the memory card attached to the communication terminal device, a table storing an audio data name of the received audio data and a title ID identifying the movie in correspondence with each other,
wherein the e-ticket sales device includes:
a sending unit operable to, upon receiving the purchase request from the communication terminal device, send the e-ticket and the audio data to the communication terminal device, and
wherein the playback device includes:
an instruction receiving unit operable to receive playback request information that includes (i) a request to play back the audio data and the video data related to a requested movie in sync with each other and (ii) the title ID identifying the requested movie;
a first judging unit operable to judge whether a table recorded in a memory card attached to the playback device stores the audio data name of the audio data related to the requested movie that corresponds to the title ID included in the playback request information;
a second judging unit operable to judge whether the title ID included in the playback request information matches the title ID of a movie recorded in a package purchased at a different timing from a timing of the purchase of the e-ticket;
a first access unit operable to acquire, when the first judging unit judges that the table stores the audio data name that corresponds to the title ID included in the playback request information, the audio data indicated by the audio data name stored in the table recorded in the memory card attached to the playback device, the audio data acquired by the first access unit being acquired from the memory card attached to the playback device;
a second access unit operable to acquire, when the second judging unit judges that the title ID included in the playback request information matches the title ID of the movie recorded in the package, the video data related to the movie recorded in the package, the video data being acquired by the second access unit from the package; and
a playback unit operable to play back the audio data acquired by the first access unit and the video data acquired by the second access unit in synchronization with each other.

10. The electronic ticket system of claim 9,
wherein the second subsystem further includes an e-ticket confirmation device,
wherein the e-ticket confirmation device includes:
a judging unit operable to judge whether the e-ticket included in the memory card attached to the e-ticket confirmation device is valid; and
a second recording unit operable, when the judging unit judges affirmatively, to record, onto the memory card attached to the e-ticket confirmation device, the audio data related to the movie recorded in the purchased package, wherein the first access unit further acquires the audio data related to the movie recorded in the purchased package from the memory card attached to the playback device, wherein the second access unit further acquires the video data related to the movie recorded in the purchased package from the purchased package, and wherein the playback unit further plays back the audio data related to the movie recorded in the purchased package and the video data related to the movie recorded in the purchased package in synchronization with each other.

11. The electronic ticket system of claim 10, wherein the second subsystem further includes a package sales device for selling the purchased package, and wherein the package sales device includes a price decision unit operable to decide a sales price of the purchased package after discounting the sales price when an unused e-ticket or a used e-ticket has been recorded in the memory card attached to the e-ticket confirmation device.

12. A first subsystem comprising a communication terminal device and a playback device, wherein the communication terminal device includes:
 a purchase request unit operable to transmit, to an e-ticket sales device included in a second subsystem that is a subsystem other than the first subsystem, a purchase request to purchase an e-ticket to be used for seeing a movie;
 a receiving unit operable to receive, in accordance with the purchase request, the e-ticket and audio data related to the movie without receiving video data related to the movie, the e-ticket and the audio data related to the movie being received from the e-ticket sales device after the purchase request unit transmits the purchase request to purchase the e-ticket; and
 a first recording unit operable to (i) record, onto a memory card attached to the communication terminal device, the e-ticket and the audio data received by the receiving unit, and (ii) record, onto the memory card attached to the communication terminal device, a table storing an audio data name of the received audio data and a title ID identifying the movie in correspondence with each other, and wherein the playback device includes:
 an instruction receiving unit operable to receive playback request information that includes (i) a request to play back the audio data and the video data related to a requested movie in sync with each other and (ii) the title ID identifying the requested movie;
 a first judging unit operable to judge whether a table recorded in a memory card attached to the playback device stores the audio data name of the audio data related to the requested movie that corresponds to the title ID included in the playback request information;
 a second judging unit operable to judge whether the title ID included in the playback request information matches the title ID of a movie recorded in a package purchased at a different timing from a timing of the purchase of the e-ticket;
 a first access unit operable to acquire, when the first judging unit judges that the table stores the audio data name that corresponds to the title ID included in the playback request information, the audio data indicated by the audio data name stored in the table recorded in the memory card attached to the playback device, the audio data acquired by the first access unit being acquired from the memory card attached to the playback device;
 a second access unit operable to acquire, when the second judging unit judges that the title ID included in the playback request information matches the title ID of the movie recorded in the package, the video data related to the movie recorded in the package, the video data being acquired by the second access unit from the package; and
 a playback unit operable to play back the audio data acquired by the first access unit and the video data acquired by the second access unit in synchronization with each other.

13. The first subsystem of claim 12, wherein the memory card is attached to an e-ticket confirmation device included in the second subsystem, wherein the e-ticket confirmation device records, onto the memory card attached to the e-ticket confirmation device, the audio data related to the movie recorded in the purchased package when the e-ticket confirmation device judges that the e-ticket included in the memory card attached to the e-ticket confirmation device is valid, wherein the first access unit further acquires the audio data related to the movie recorded in the purchased package from the memory card attached to the playback device, wherein the second access unit further acquires the video data related to the movie recorded in the purchased package from the purchased package, and wherein the playback unit further plays back the audio data related to the movie recorded in the purchased package and the video data related to the movie recorded in the purchased package in synchronization with each other.

14. A subsystem comprising an e-ticket sales device for selling e-tickets of movies, wherein the e-ticket sales device includes a sending unit operable to, upon receiving a purchase request to purchase an e-ticket of a movie from a communication terminal device that exists outside of the subsystem, send the e-ticket and video data related to the movie without sending image data related to the movie, the e-ticket and the audio data related to the movie being sent to the communication terminal device after the purchase request to purchase the e-ticket is received, wherein the e-ticket and the audio data are recorded on a memory by the communication terminal device, wherein a table storing an audio data name of the received audio data and a title ID identifying the movie in correspondence with each other is recorded on the memory card by the communication terminal device, and wherein, in the playback device:
 playback request information is received, the playback request information including (i) a request to play back the audio data and the video data related to a requested movie in sync with each other, and (ii) the title ID identifying the requested movie;
 a first judgment is made as to whether the table recorded into the memory card attached to the playback device stores the audio data name of the audio data related to the requested movie that corresponds to the title ID included in the playback request information;
 a second judgment is made as to whether the title ID included in the playback request information matches the title ID of a movie recorded in a package purchased at a different timing from a timing of the purchase of the e-ticket;

when the first judgment judges that the table stores the audio data name that corresponds to the title ID included in the playback request information, the audio data indicated by the audio data name stored in the table recorded in the memory card attached to the playback device is acquired from the memory card attached to the playback device;

when the second judgment judges that the title ID included in the playback request information matches the title ID of the movie recorded in the package, the video data related to the movie recorded in the package is acquired from the package; and the audio data acquired from the memory card attached to the playback device and the video data acquired from the package of the movie are played back in synchronization with each other.

15. The subsystem of claim 14 further comprising an e-ticket confirmation device, wherein the e-ticket confirmation device includes:
- a judging unit operable to judge whether the e-ticket included in the memory card attached to the e-ticket confirmation device is valid; and
- a recording unit operable to, when the judging unit judges affirmatively, record, onto the memory card attached to the e-ticket confirmation device, the audio data related to the movie recorded in the purchased package, and wherein the audio data related to the movie recorded in the purchased package is played back in synchronization with the video data related to the movie recorded in the purchased package.

16. The subsystem of claim 15, further comprising a package sales device for selling the purchased package, wherein the package sales device includes a price decision unit operable to decide a sales price of the purchased package after discounting the sales price when an unused e-ticket or a used e-ticket has been recorded in the memory card attached to the e-ticket confirmation device.

17. The method of claim 1, wherein the video data related to the movie is video data of a trailer of the movie and the audio data related to the movie is audio data of the trailer of the movie.

18. The method of claim 4, wherein the video data related to the movie is video data of a trailer of the movie and the audio data related to the movie is audio data of the trailer of the movie.

19. The method of claim 6, wherein the video data related to the movie is video data of a trailer of the movie and the audio data related to the movie is audio data of the trailer of the movie.

20. The electronic ticket system of claim 9, wherein the video data related to the movie is video data of a trailer of the movie and the audio data related to the movie is audio data of the trailer of the movie.

21. The first subsystem of claim 12, wherein the video data related to the movie is video data of a trailer of the movie and the audio data related to the movie is audio data of the trailer of the movie.

22. The subsystem of claim 14, wherein the video data related to the movie is video data of a trailer of the movie and the audio data related to the movie is audio data of the trailer of the movie.

* * * * *